US010747089B2

(12) United States Patent
Shibata et al.

(10) Patent No.: US 10,747,089 B2
(45) Date of Patent: Aug. 18, 2020

(54) IMAGING APPARATUS AND CONTROL METHOD OF THE SAME

(71) Applicant: CANON KABUSHIKI KAISHA, Tokyo (JP)

(72) Inventors: Nobuhiro Shibata, Inagi (JP); Hiroaki Kurisu, Tokyo (JP); Teruhiko Ueyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/136,115

(22) Filed: Sep. 19, 2018

(65) Prior Publication Data

US 2019/0094656 A1 Mar. 28, 2019

(30) Foreign Application Priority Data

Sep. 28, 2017 (JP) ................................ 2017-188936
Sep. 28, 2017 (JP) ................................ 2017-188937

(51) Int. Cl.

| | |
|---|---|
| ***G03B 13/36*** | (2006.01) |
| ***G02B 7/28*** | (2006.01) |
| ***H04N 5/232*** | (2006.01) |
| ***G02B 7/36*** | (2006.01) |
| *G03B 15/00* | (2006.01) |

(52) U.S. Cl.
CPC ............... *G03B 13/36* (2013.01); *G02B 7/28* (2013.01); *G02B 7/36* (2013.01); *H04N 5/23296* (2013.01); *H04N 5/232122* (2018.08); *H04N 5/232127* (2018.08); *G03B 15/00* (2013.01)

(58) Field of Classification Search
CPC .......... G03B 13/36; G02B 7/28; G02B 7/285; H04N 5/23212; H04N 5/232122; H04N 5/232125
See application file for complete search history.

(56) References Cited

U.S. PATENT DOCUMENTS

2007/0269197 A1* 11/2007 Ide .......................... G02B 7/34 396/125
2011/0157425 A1* 6/2011 Nakayama ......... H04N 5/23245 348/234
2012/0195580 A1* 8/2012 Itoh ......................... G01C 3/08 396/111

FOREIGN PATENT DOCUMENTS

JP 2010-243899 A 10/2010

* cited by examiner

*Primary Examiner* — Clayton E. LaBalle
*Assistant Examiner* — Leon W Rhodes, Jr.
(74) *Attorney, Agent, or Firm* — Canon U.S.A., Inc. IP Division

(57) ABSTRACT

An imaging apparatus includes a storage unit configured to store beforehand a focus position serving as a reference for a predetermined subject, and a unit configured to drive a focus lens at a position away by a predetermined depth from the focus position serving as a reference that is stored, and calculate a defocus amount.

13 Claims, 46 Drawing Sheets

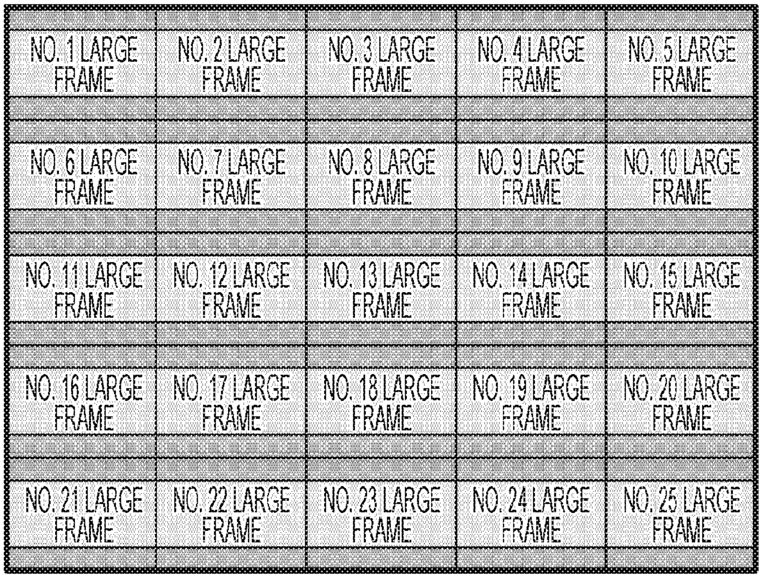

FIG. 25A

| NO. 1 LARGE FRAME | NO. 2 LARGE FRAME | NO. 3 LARGE FRAME | NO. 4 LARGE FRAME | NO. 5 LARGE FRAME |
|---|---|---|---|---|
| NO. 6 LARGE FRAME | NO. 7 LARGE FRAME | NO. 8 LARGE FRAME | NO. 9 LARGE FRAME | NO. 10 LARGE FRAME |
| NO. 11 LARGE FRAME | NO. 12 LARGE FRAME | NO. 13 LARGE FRAME | NO. 14 LARGE FRAME | NO. 15 LARGE FRAME |
| NO. 16 LARGE FRAME | NO. 17 LARGE FRAME | NO. 18 LARGE FRAME | NO. 19 LARGE FRAME | NO. 20 LARGE FRAME |
| NO. 21 LARGE FRAME | NO. 22 LARGE FRAME | NO. 23 LARGE FRAME | NO. 24 LARGE FRAME | NO. 25 LARGE FRAME |

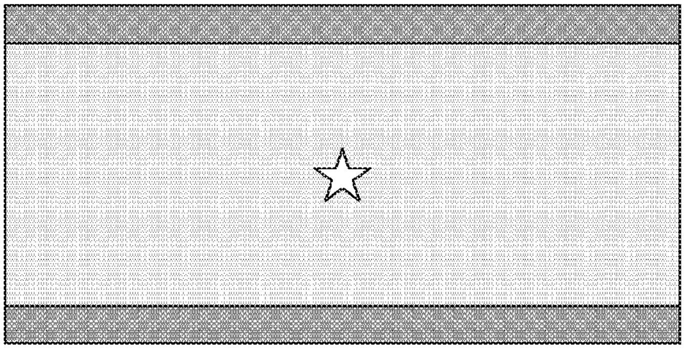

FIG. 25B

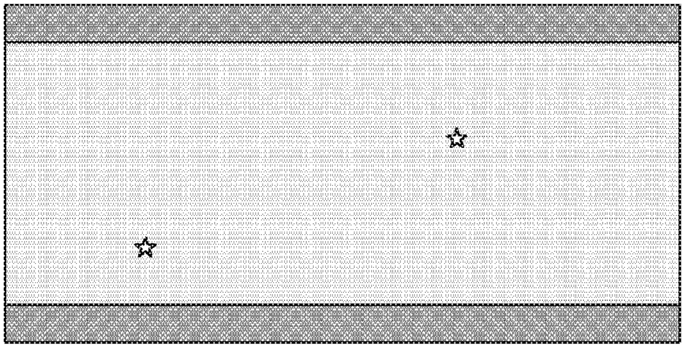

FIG. 25C

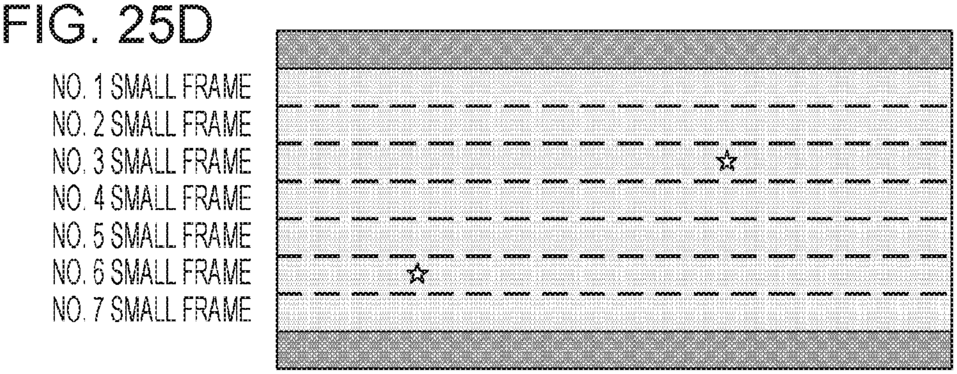

FIG. 25D

NO. 1 SMALL FRAME
NO. 2 SMALL FRAME
NO. 3 SMALL FRAME
NO. 4 SMALL FRAME
NO. 5 SMALL FRAME
NO. 6 SMALL FRAME
NO. 7 SMALL FRAME

FIG. 26A

| LARGE FRAME | A-IMAGE LUMINANCE PEAK-TO-BOTTOM DIFFERENCE | B-IMAGE LUMINANCE PEAK-TO-BOTTOM DIFFERENCE | DEFOCUS AMOUNT |
|---|---|---|---|
| NO. 1 SMALL FRAME | 348 | 351 | 8.543 |

FIG. 26B

| LARGE FRAME | A-IMAGE LUMINANCE PEAK-TO-BOTTOM DIFFERENCE | B-IMAGE LUMINANCE PEAK-TO-BOTTOM DIFFERENCE | DEFOCUS AMOUNT |
|---|---|---|---|
| NO. 1 SMALL FRAME | 234 | 256 | 8.987 |
| NO. 2 SMALL FRAME | 278 | 290 | 7.123 |
| NO. 3 SMALL FRAME | 555 | 589 | 1.02 |
| NO. 4 SMALL FRAME | 321 | 288 | 9.456 |
| NO. 5 SMALL FRAME | 201 | 187 | 8.009 |
| NO. 6 SMALL FRAME | 608 | 635 | 0.98 |
| NO. 7 SMALL FRAME | 243 | 212 | 7.567 |

FIG. 35A
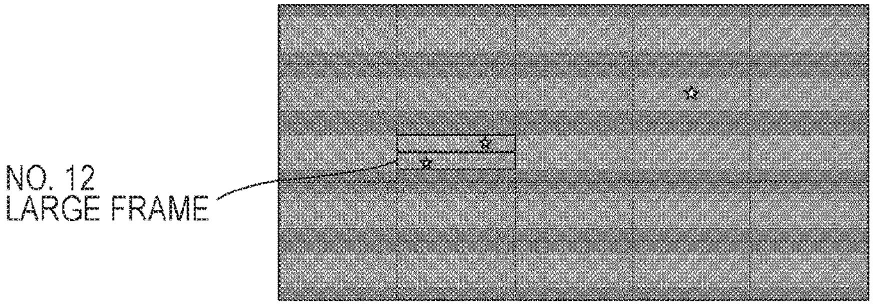
FIG. 35B
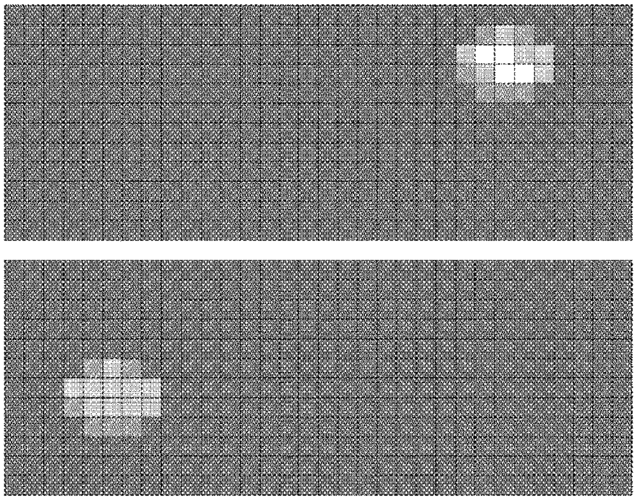
FIG. 35C
| LARGE FRAME | A-IMAGE LUMINANCE PEAK-TO-BOTTOM DIFFERENCE | B-IMAGE LUMINANCE PEAK-TO-BOTTOM DIFFERENCE | DEVIATION PERCENTAGE |
|---|---|---|---|
| UPPER PORTION SMALL FRAME | 2264 | 4015 | 27.9% |
| LOWER PORTION SMALL FRAME | 1536 | 1794 | 7.7% |

FIG. 36A

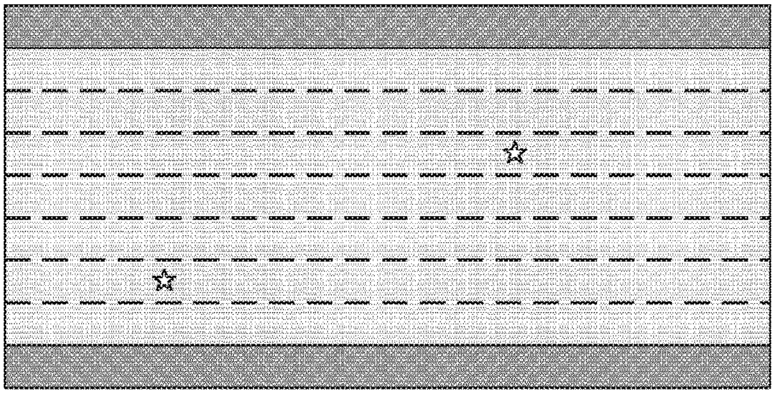

| LARGE FRAME | A-IMAGE LUMINANCE PEAK-TO-BOTTOM DIFFERENCE | B-IMAGE LUMINANCE PEAK-TO-BOTTOM DIFFERENCE | DEVIATION PERCENTAGE |
|---|---|---|---|
| NO. 1 SMALL FRAME | 234 | 276 | 8.2 |
| NO. 2 SMALL FRAME | 278 | 323 | 7.5 |
| NO. 3 SMALL FRAME | 1658 | 1205 | 15.8 |
| NO. 4 SMALL FRAME | 321 | 288 | 5.4 |
| NO. 5 SMALL FRAME | 201 | 187 | 3.6 |
| NO. 6 SMALL FRAME | 1379 | 1763 | 12.2 |
| NO. 7 SMALL FRAME | 243 | 212 | 6.8 |

FIG. 36B

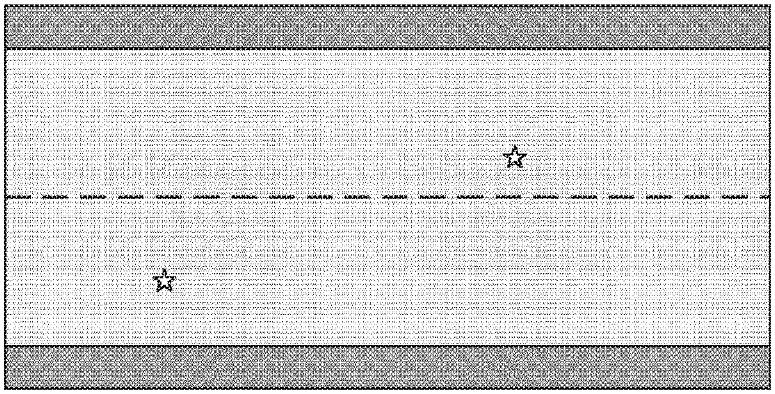

| LARGE FRAME | A-IMAGE LUMINANCE PEAK-TO-BOTTOM DIFFERENCE | B-IMAGE LUMINANCE PEAK-TO-BOTTOM DIFFERENCE | DEVIATION PERCENTAGE |
|---|---|---|---|
| UPPER PORTION SMALL FRAME | 583 | 487 | 9.0 |
| LOWER PORTION SMALL FRAME | 496 | 577 | 7.5 |

FIG. 37A

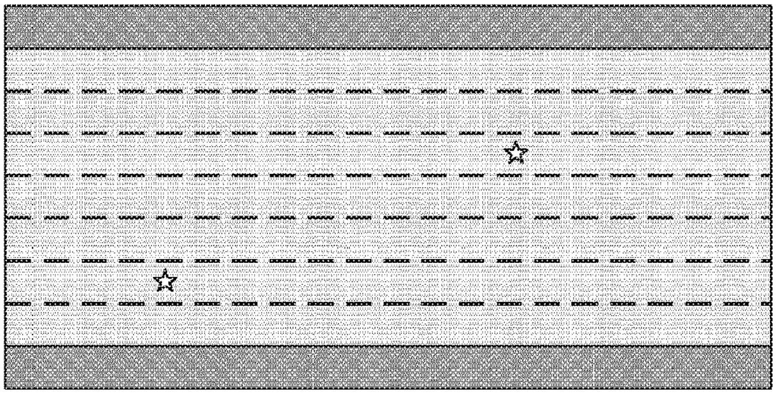

| LARGE FRAME | A-IMAGE LUMINANCE PEAK-TO-BOTTOM DIFFERENCE | B-IMAGE LUMINANCE PEAK-TO-BOTTOM DIFFERENCE | DEVIATION PERCENTAGE |
|---|---|---|---|
| NO. 1 SMALL FRAME | 234 | 276 | 8.2 |
| NO. 2 SMALL FRAME | 278 | 323 | 7.5 |
| NO. 3 SMALL FRAME | 1658 | 1205 | 15.8 |
| NO. 4 SMALL FRAME | 321 | 288 | 5.4 |
| NO. 5 SMALL FRAME | 201 | 187 | 3.6 |
| NO. 6 SMALL FRAME | 1379 | 1763 | 12.2 |
| NO. 7 SMALL FRAME | 243 | 212 | 6.8 |

FIG. 37B

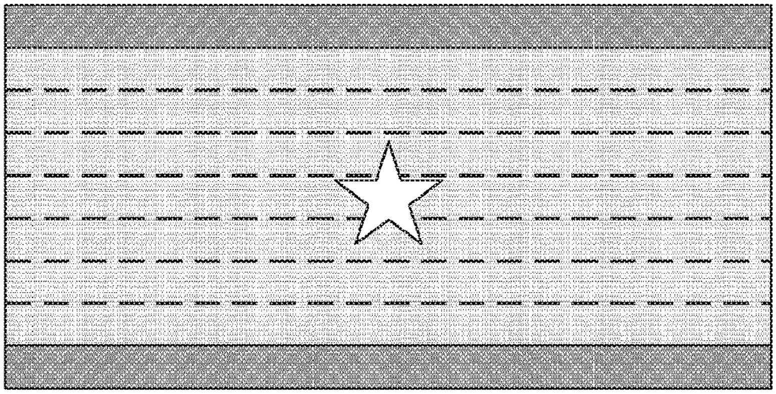

| LARGE FRAME | A-IMAGE LUMINANCE PEAK-TO-BOTTOM DIFFERENCE | B-IMAGE LUMINANCE PEAK-TO-BOTTOM DIFFERENCE | DEVIATION PERCENTAGE |
|---|---|---|---|
| NO. 1 SMALL FRAME | 255 | 267 | 2.3 |
| NO. 2 SMALL FRAME | 246 | 291 | 8.4 |
| NO. 3 SMALL FRAME | 3156 | 3432 | 4.2 |
| NO. 4 SMALL FRAME | 2078 | 4013 | 31.8 |
| NO. 5 SMALL FRAME | 2416 | 3479 | 18.0 |
| NO. 6 SMALL FRAME | 346 | 312 | 5.2 |
| NO. 7 SMALL FRAME | 278 | 253 | 4.7 |

IMAGING APPARATUS AND CONTROL METHOD OF THE SAME

BACKGROUND

Field of the Disclosure

The present disclosure relates to an imaging apparatus that has a focus adjustment function.

Description of the Related Art

Imaging apparatuses such as still cameras, video cameras, and so forth, have come to have high pixel resolution. Accordingly, being out of focus even slightly becomes conspicuous, and there has been demand for more highly accurate focus adjustment. This demand has also been made regarding shooting stars in a night sky, where stars are taken as being minute point light sources, and focus adjustment is performed so that the area of high-luminance signals is strictly the smallest. Note that when shooting a night sky, the stars to be shot are restricted to subjects situated at an approximately infinite distance, and there are exposure setting unique for night skies, so there is a mode independent from other scene modes (hereinafter referred to as "night sky mode").

Normally, a focus position where a subject situated at an approximately infinite distance is a position uniquely determined in infinite focus adjustment performed for each individual imaging apparatus. However, difference in temperature between the temperature when adjusting and the temperature of the imaging apparatus when actually shooting the night sky, or difference in attitude, can result in being out of focus when shooting. Accordingly, there is a need to frequently adjust the focus, even though shooting stars regarding which the distance to the imaging apparatus is approximately unchanged during shooting.

Also, when shooting a night sky, lights of buildings can also be taken to be point light sources, in the same way as stars, but city lights are at a finite distance whereas stars are at an approximately infinite distance, so the focal position slightly differs between stars and city lights. There is demand for the night sky mode to have more highly accurate focus adjustment, as described above, so there is need to correct even slight difference in focus, such as between stars and city lights, which looks almost the same to the eye.

Contrast auto-focus (AF) and phase difference AF are representative ways of performing focus adjustment. Contrast AF performs automatic focus adjustment using evaluation values of a particular frequency component extracted by filtering from luminance signals obtained from an imaging device. Phase difference AF performs automatic focus adjustment by focusing, on a pair of sensors, light fluxes from a subject that have passed through different exit pupil regions from each other in the imaging optical system, and calculating the amount of defocus of the imaging optical system from phase difference between the pair of image signals obtained from the pair of sensors. Generally, phase difference AF has an advantage that the time for automatic focus adjustment is shorter as compared to contrast AF.

However, minute point light sources such as stars are smaller in area the more in focus, so clear phase difference is not readily found, and focus accuracy may become poorer. Accordingly, scenes where there are minute point light sources is considered to be one of scenes that phase difference AF does not handle well. Accordingly, there has been proposed a technique to improve detection accuracy of subjects within a screen in a case where there is a point light source and another subject within the same focus detection region, by dividing into multiple regions and judge luminance level (Japanese Patent Laid-Open No. 2010-243899).

However, Japanese Patent Laid-Open No. 2010-243899 is callable of improving detection accuracy of subjects other than point light sources in cases where there are point light sources and other subjects in the screen, by minimizing the effects of the point light sources, this does not raise the detection accuracy of the point light sources themselves. Clear phase difference is not readily found with minute point light sources as described above, so detection variance in the amount of defocus (hereinafter referred to as "reliability") at an in-focus position with phase difference AF tends to be greater (reliability tends to be lower).

It has been found desirable to provide an imaging apparatus that can focus on minute point light sources with high accuracy.

SUMMARY

A technical feature of the present disclosure is a control method of an imaging apparatus having multiple pixels capable of performing photoelectric conversion of light fluxes that have passed through different pupil regions of an imaging optical system including a focus lens, and outputting a pair of image signals. The control method includes calculating, which involves obtaining the image signals, performing phase-difference focus detection computation, and calculating a defocus amount; and controlling driving of the focus lens and performing focus control, based on the calculation results of the calculating unit. In the calculating, focus detection computation is performed in a state where the focus lens is at a position away by a predetermined depth from a focus position serving as a reference that is stored beforehand.

Further features of the present invention will become apparent from the following description of exemplary embodiments with reference to the attached drawings.

BRIEF DESCRIPTION OF THE DRAWINGS

FIGS. 25A through 25D are diagrams illustrating focus detection regions according to a forth embodiment.

FIGS. 26A and 26B are diagrams illustrating peak-to-bottom differences of an A-image and B-image in a small frame, and defocus amount in a largest frame thereof.

FIG. 30-1 is a flowchart illustrating focus detection region settings in a case of always performing segmentation of focus detection regions.

FIG. 30-2 is a flowchart illustrating focus detection region settings in a case of performing segmentation of focus detection regions in a case where the photometric value of a scene is a predetermined value or higher.

FIG. 30-3 is a flowchart illustrating focus detection region settings in a case of performing segmentation of focus detection regions in a case where the focal distance of a zoom lens is below a predetermined value.

FIG. 30-4 is a flowchart illustrating focus detection region settings in a case of performing segmentation of focus detection regions in a case where the attitude of the imaging apparatus is near the horizontal direction.

FIG. 30-5 is a flowchart illustrating focus detection region settings in a case of changing the number of segments between the middle portion and peripheral portions of the field angle of the focus detection region.

FIG. 30-6 is a flowchart illustrating focus detection region settings in a case of performing segmentation of focus detection regions in a case where the F-number, which is one of optical information of a replacement lens, is a predetermined value or higher.

FIG. 34-1 is a flowchart illustrating focus adjustment processing in a case where focus detection region movement is always performed when in night sky shooting mode, according to the fifth embodiment.

FIG. 34-2 is a flowchart illustrating focus adjustment processing in a case of switching between whether to perform second round or not, in accordance with the photometric value of the scene, according to the fifth embodiment.

FIG. 34-3 is a flowchart illustrating focus adjustment processing in a case where the direction of shifting the focus detection region is changed, in accordance with the attitude of the imaging apparatus, according to the fifth embodiment.

FIGS. 35A through 35C are diagrams illustrating luminance information in focus detection regions and deviation percentage (part 1), according to a sixth embodiment.

FIGS. 36A and 36B are diagrams illustrating luminance information in focus detection regions and deviation percentage (part 2), according to the sixth embodiment.

FIGS. 37A and 37B are diagrams illustrating luminance information in focus detection regions and deviation percentage (part 3), according to the sixth embodiment.

DESCRIPTION OF THE EMBODIMENTS

Embodiments of the present invention will be described below in detail, with reference to the attached drawings.

First Embodiment

Figure 1:
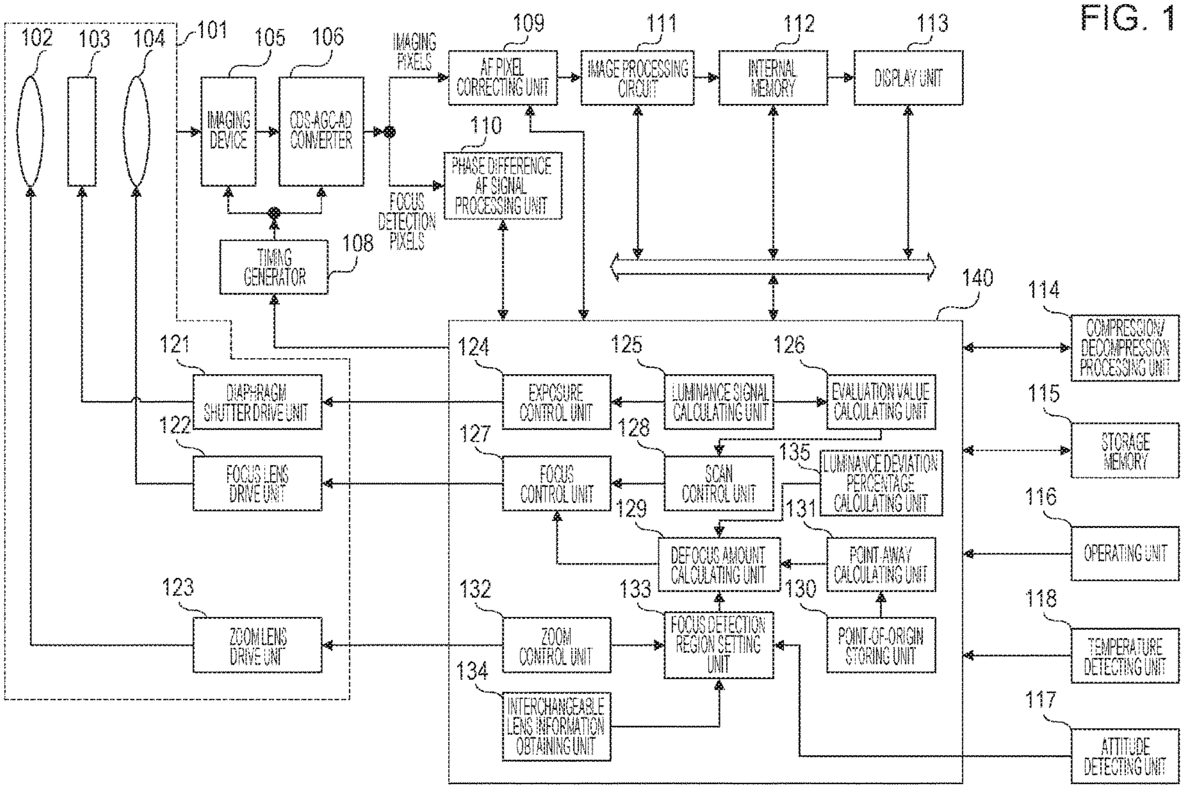
FIG. 1 is a block diagram of a digital camera.

FIG. 1 is a block diagram illustrating a configuration example of a digital camera. A barrel 101 has a lens group within, and performs lens driving. The barrel 101 according to the present embodiment will be described as being an interchangeable lens unit, but may be configured as a fixed lens unit. A zoom lens 102 optically changes the field angle by adjusting the focal length. A diaphragm-shutter 103 is used for exposure control where the quantity of light is adjusted. A focus lens 104 adjusts in-focus position (focus adjustment). The zoom lens 102, diaphragm-shutter 103, and focus lens 104 make up an imaging optical system.

Light that has passed through the barrel 101 is received at an imaging device 105 using a charge-coupled device (CCD) or complementary metal-oxide semiconductor (CMOS) sensor or the like, and photoelectric conversion from light signals to electric signals is performed. A correlated double sampling (CDS)-automatic gain control (AGC)-AD converter 106 subjects image signals read out from the imaging device 105 to noise reduction processing, gain adjustment, and digitizing. The CDS-AGC-AD converter 106 outputs image signals to the AF pixel correcting unit 109, and imaging plane phase difference AF signals to a phase difference AF signal processing unit 110. The phase difference AF signal processing unit 110 performs correlation computation regarding two images for imaging plane phase difference AF, obtained from optical fluxes passing through different pupil regions of the imaging optical system, due to being phase difference focus adjustment processing. Details of processing for calculating the amount of image displacement at the phase difference AF signal processing unit 110 will be described later.

A timing generator 108 controls conversion timing into electric signals at the imaging device 105 and output timing at the CDS-AGC-AD converter 106, in accordance with commands from a camera control unit 140. An image processing circuit 111 subjects output from the AF pixel correcting unit 109 to pixel interpolation processing, color conversion processing and so forth, and sends to internal memory 112 as image data. A display unit 113 displays shooting information and so forth, along with image data stored in the internal memory 112. A compression/decompression processing unit 114 performs compression/decompression of data saved in the internal memory 112, in accordance with an image format.

Storage memory 115 stores various data, such as parameters and so forth. An operating unit 116 is an interface for performing various types of menu operations and mode switching operations. An attitude detecting unit 117 detects the attitude of the imaging apparatus. A temperature detecting unit 118 detects the current temperature of the imaging apparatus.

The camera control unit 140 is made up of a processor (central processing unit (CPU), microprocessor unit (MPU), or the like), and executes various types of control programs stored in the internal memory 112 in accordance with user operations at the operating unit 116, for example, programs to carry out automatic exposure control, zoom control, autofocus control, and so forth.

A diaphragm shutter drive unit 121 drives the diaphragm-shutter 103. A luminance signal calculating unit 125 calculates signals, after output from the imaging device 105, passing through the CDS-AGC-AD converter 106 and AF pixel correcting unit 109 as luminance of the subject and scene. An exposure control unit 124 controls exposure values (aperture value and shutter speed) based on luminance information obtained from the luminance signal calculating unit 125, and notifies the diaphragm shutter drive unit 121 of the results of the computation. Thus, automatic exposure (AE) control is performed.

A zoom lens drive unit 123 drives the zoom lens 102. A zoom control unit 132 controls the position of the zoom lens in accordance with zoom operation instructions by the operating unit 116. A focus lens drive unit 122 drives the focus lens 104. A defocus amount calculating unit 129 calculates defocus amount based on the image displacement amount calculated at the phase difference AF signal processing unit 110. A focus control unit 127 controls the driving direction and driving amount of the focus lens from the output results of the defocus amount calculating unit 129. An evaluation value calculating unit 126 extracts a frequency component from luminance information obtained from the luminance signal calculating unit 125, and thereafter performs calculation thereof as a contrast evaluation value.

A scan control unit 128 simultaneously commands the focus control unit 127 to drive a predetermined range by a predetermined driving amount, and calculates a shape of contrast by obtaining evaluation values that are the calculation results from the evaluation value calculating unit 126 at a predetermined focus position. A focus position where the contrast shape calculated by the scan control unit 128 peaks is the in-focus position.

Driving to the focus position calculated by the defocus amount calculating unit 129, or driving to the in-focus position calculated by the scan control unit 128, thereby focusing light fluxes on the imaging device 105, realizes autofocus (AF) control. An interchangeable lens information obtaining unit 134 obtains information such as focal length, F-number, etc., that is optical properties information, for each lens unit.

The point-of-origin storing unit 130 stores a focus lens position where an infinity-distance subject is in focus. Generally, there is variance among individual imaging apparatuses regarding the focus lens position for infinity-distance subjects, so the focus lens position is adjusted for each individual imaging apparatus with regard to infinity-distance subjects. This adjusted position will be referred to as "point-of-origin" hereinafter. However, the adjusted focus lens position may shift due to change in temperature, change in attitude, and change over time. The members making up the barrel 101 may shrink due to change in temperature, so the unit including the focus lens 104 inside is also affected by change in temperature. Also, when the attitude of the imaging apparatus changes, the unit including the focus lens 104 may move in a direction where fitting looseness closes off under its own weight. Further, changing include grease at moving parts changing over time, repeated focus lens driving leading to wear, and so forth, can occur with passage of time. Phenomena where sharpness of focus is lost with regard to infinity-distance subjects occurs due to the effect of such changes. The point-away calculating unit 131 calculates the amount of deviation of the in-focus position from the point-of-origin stored in the point-of-origin storing unit 130 due to the effects of temperature change, attitude change, and change over time (hereinafter referred to as "point-away"). The defocus amount calculating unit 129 calculates the defocus amount by computing correlation at the point-of-origin or the point-away calculated by the point-away calculating unit 131. A focus detection region setting unit 133 sets the number and size of regions regarding which calculation of the amount of image displacement is to be performed. (hereinafter referred to as "focus detection regions"). A luminance deviation percentage calculating unit 135 calculates, with regard to peak-to-bottom difference of luminance of image signals (A-image and B-image), a deviation percentage indicating the degree of deviation of luminance of the A-image and B-image.

Figure 3:
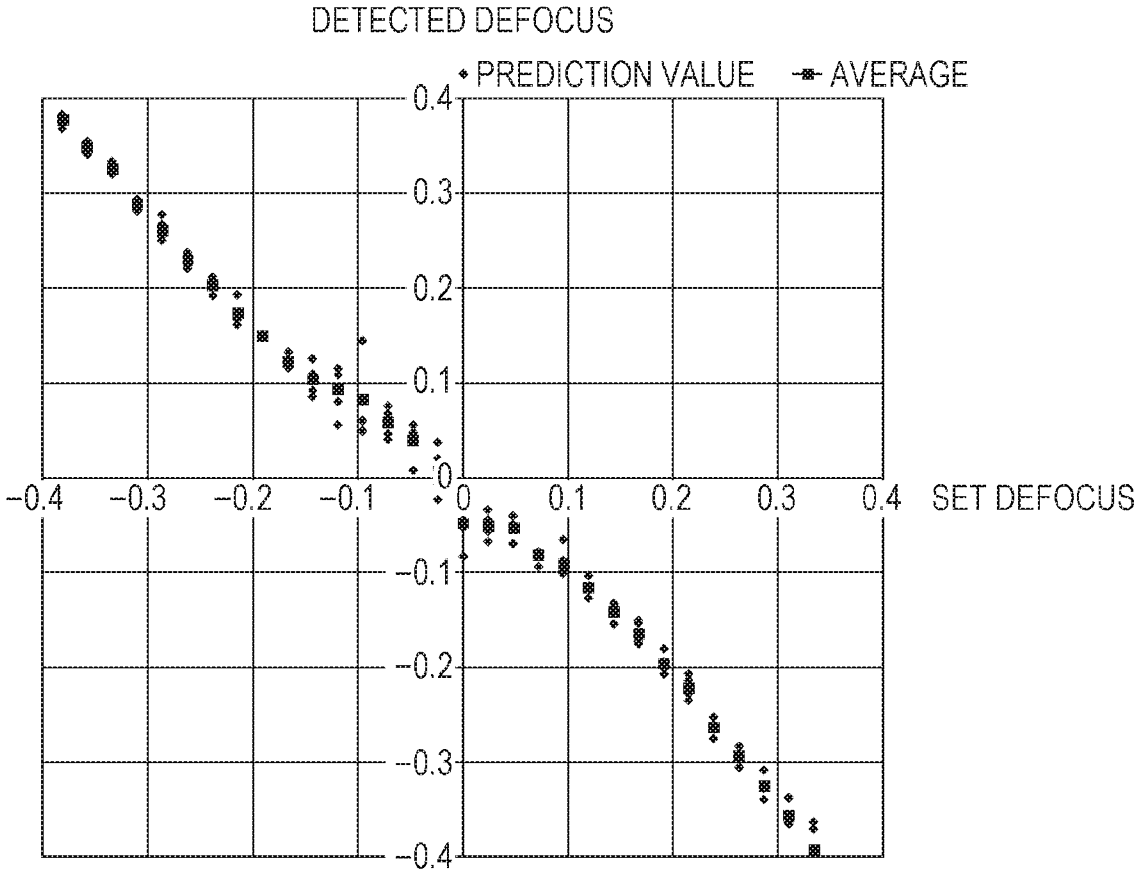
FIG. 3 is a graph representing the degree of reliability in phase difference AF in a case where a minute point light source is a subject.

FIG. 3 is a graph illustrating the degree of reliability of phase difference AF in a case where a minute point light source is the subject. The X axis is difference in the optical direction at the imaging plate position that can be calculated from the difference between the focus lens position where a subject at an optional position is most in focus, and the current focus lens position (hereinafter referred to as "set defocus"). The Y axis is the defocus amount that can be obtained regarding a subject at an optional position (hereinafter referred to as "detected defocus"). The increments are both millimeters, indicating the amount of defocus.

The set defocus on the X axis is obtained by computing correlation multiple times, at each smallest increment (one depth) where an imaged image appears to be in focus. One depth can be calculated by multiplying the aperture value at the diaphragm-shutter 103 and allowance scattering circle. The circles are results of execution, and the squares are averages of multiple times.

The zero point on the X axis indicates the in-focus position, and where the breadth of variance in detected defocus amount is great, the average value also is deviated from the zero point on the Y axis representing in-focus. That is to say, the reliability of the zero point on the X axis is low. The detected focus corresponding to the set defocus correspond at ±1.5 mm to ±0.3 mm away from the zero point on the X axis, and the breadth of variance of the detected defocus amount is small. Accordingly, the reliability of points away from the zero point on the X axis can be said to be high. Thus, with subjects where the area becomes smaller the further in focus, as with minute point light sources, clear phase difference is not readily obtained, so reliability tends to be low near the in-focus position (near the zero point on the X axis), and reliability tends to be high at positions away from the in-focus position.

Figure 4:
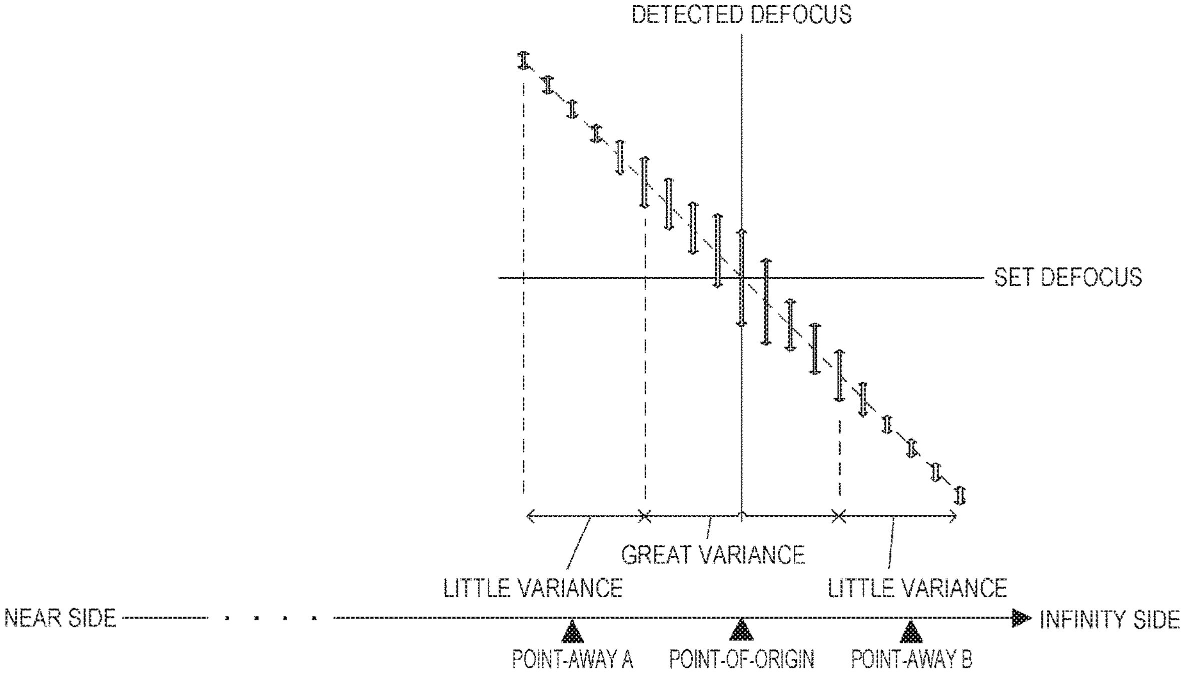
FIG. 4 is a diagram illustrating the degree of reliability at point-of-origin and point-away.

FIG. 4 is a conceptual diagram representing the degree of reliability at the point-of-origin and point-away. Calculating correlation at an adjusted point-of-origin with regard to an infinity-distance subject such as a star results in low reliability, as described above. Accordingly, computing correlation at a point distanced from the point-of-origin by a predetermined depth of focus (hereinafter referred to as "point-away") raises reliability.

Figure 5:
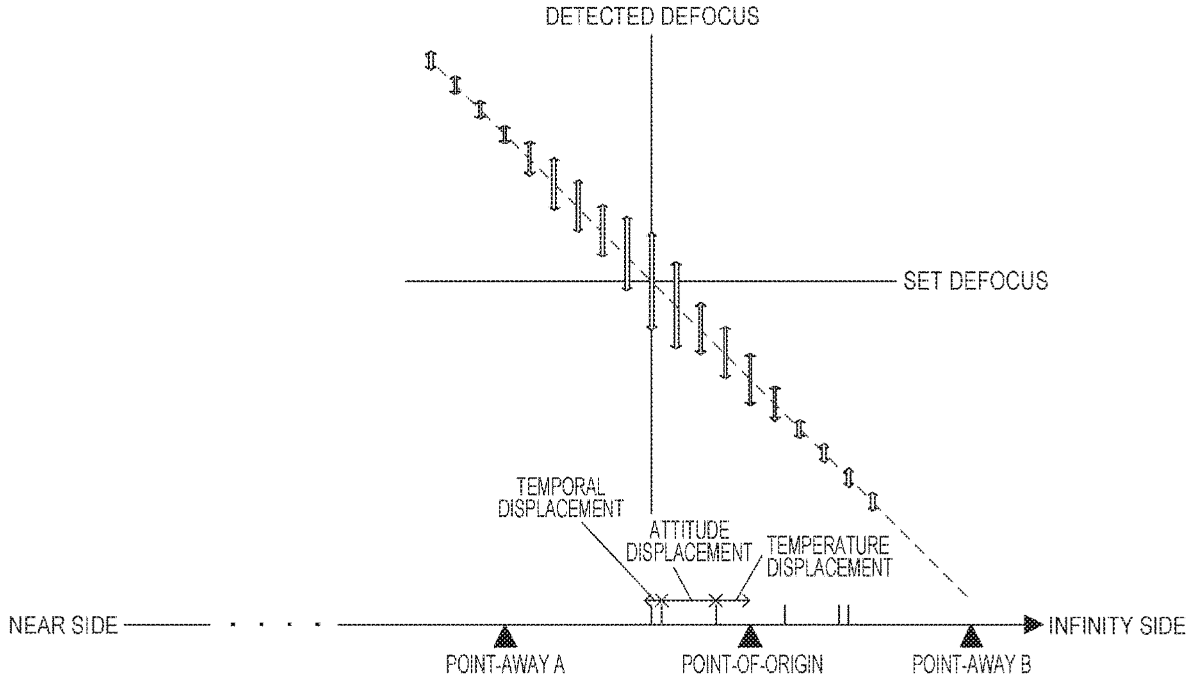
FIG. 5 is a conceptual drawing representing the degree of reliability at point-of-origin and point-away in a case where temperature change, attitude change, and change over time, have occurred.

FIG. 5 is a conceptual diagram representing the degree of reliability at the point-of-origin and point-away in a case where temperature change, attitude change, and change over time, have occurred. As described above, there are cases where focus may not be sharp at the point-of-origin due to effects of temperature change, attitude change, and change over time. FIG. 5 illustrates cases where the in-focus point has shifted to the near side. Computing correlation at a point that has shifted due to the effects of temperature change, attitude change, or change over time, results in lower reliability, as described with reference to FIG. 4. Accordingly, computing correlation at a point shifted by at least twice the amount of shifting from the point-of-origin due to the effects of temperature change, attitude change, and change over time (point-away A) raises reliability. Although an example of shifting toward the near side has been given in FIG. 5, this is the same in a case of shifting toward the infinity side, and in this case, calculating correlation at point-away B raises reliability.

As described above, the point-away calculating unit 131 performs calculation of a point-away taking into consideration the in-focus position that shifts from the point-of-origin stored in the point-of-origin storing unit 130 due to the effects of temperature change, attitude change, and change over time. The defocus amount calculating unit 129 calculates defocus amount by computing correlation at the point calculated at the point-away calculating unit 131. Details of the calculation processing for image displacement amount performed at the phase difference AF signal processing unit 110 will be described with reference to FIGS. 2 and 6A through 8B.

Figure 2:
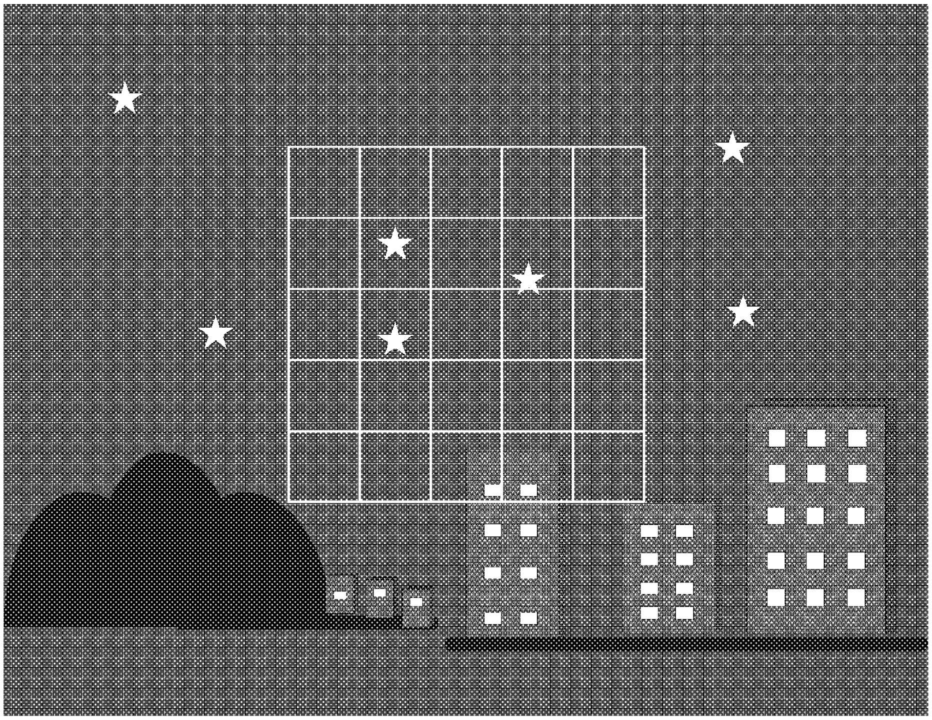
FIG. 2 is a diagram illustrating focus detection regions.

FIG. 2 illustrates an example of 25 frames (5×5 frames) being set as regions for calculating image displacement amount (hereinafter referred to as "focus detection regions"). One pair of image signals (called A-image and B-image) for focus detection are obtained from the imaging device 105, with regard to an optional frame out of the set frames. The obtained pair of signals are subjected to row averaging in the vertical direction, to reduce the effects of signal noise.

Next, filtering processing to extract signal components of a predefined frequency range from the vertically-averaged signals is performed. Next, the correlation is computed between image signals subjected to filtering processing (also called correlation computation). The correlation computation is performed regarding each line after row-averaging in the vertical direction.

Figure 6A:
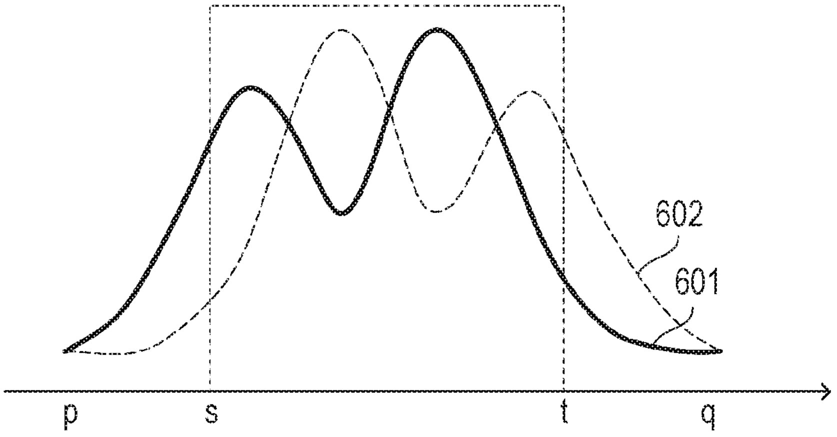
FIGS. 6A through 6C are diagrams illustrating image signals obtained from focus detection regions.
Figure 6B:
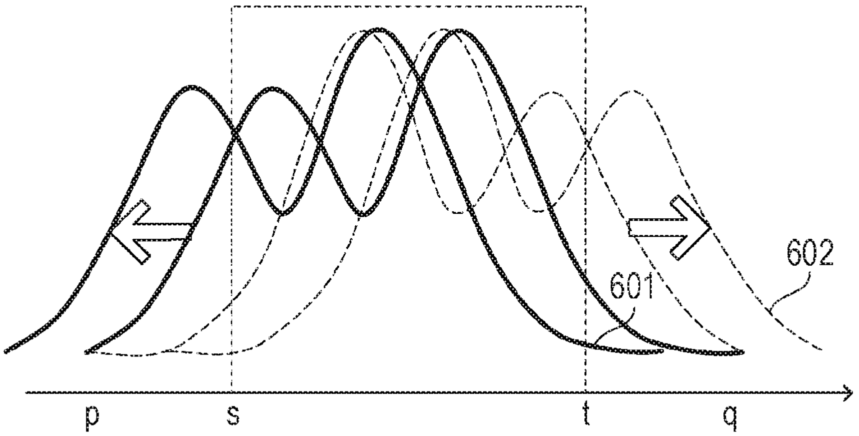
Figure 6C:
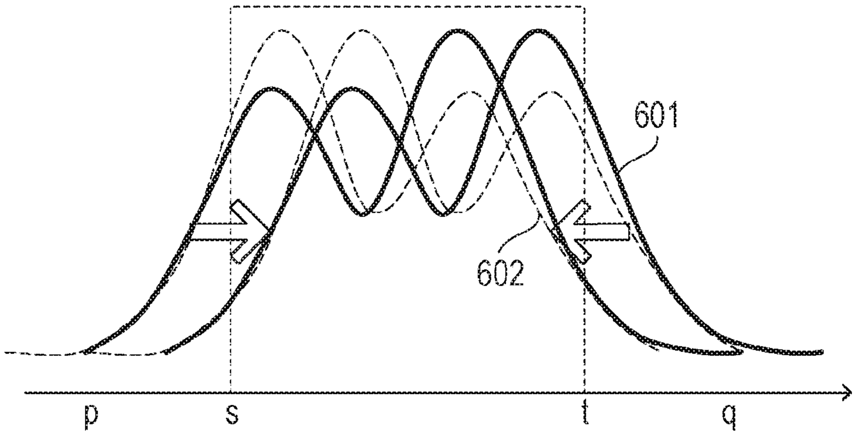

In FIGS. 6A through 6C, each of p, q, s, and t represent coordinates in the horizontal direction (X axis direction), with p and q respectively representing the start point and end point of a pixel region, and s and t representing the start point and end point of a focus detection region. A solid line 601 represents one image signal A for focus detection, that has been subjected to filtering processing, and a dotted line 602 represents the other image signal B. FIG. 6A shows the image signals A and B before shifting, FIG. 6B illustrates the image signals A and B shifted in the positive direction, while FIG. 6C illustrates the image signals A and B shifted in the negative direction. In a case of calculating correlation of the pair of image signals A 601 and B 602, both the image signals A 601 and B 602 are shifted in the direction of the arrows by an optional set number of bits. The sum of absolute values of difference between the image signals A 601 and B 602 after shifting is calculated.

In order to simplify description, the bit width for shifting here is 1. The correlation (hereinafter written as "COR") can be calculated by Expression (1)

$$COR[i]=\sum_{k=x}^{y}|A[k+i]-B[k-i]| \quad (1)$$

where i represents the shift amount, p−s represents the greatest shift amount in the negative direction, q−t represents the greatest shift amount in the positive direction, x represents the starting coordinate of the focus detection region 602, y represents the ending coordinate thereof, and the range of the shift amount i is p−s<i<q−t.

Figure 7A:
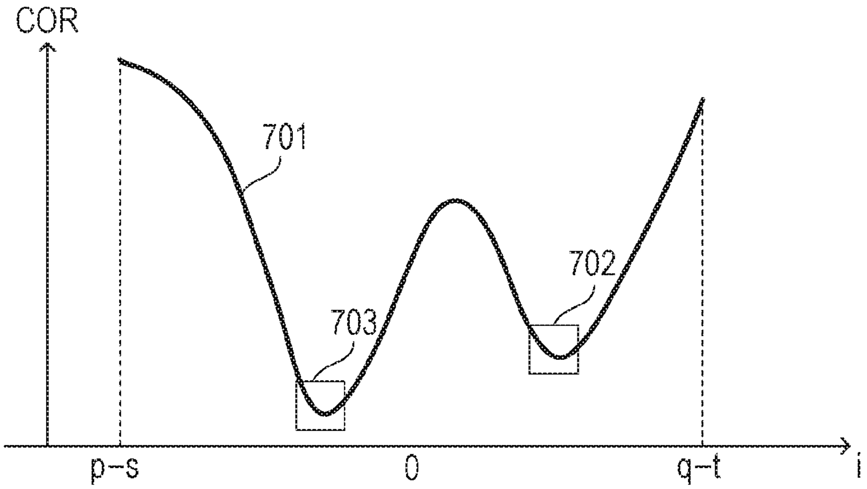
FIGS. 7A and 7B are diagrams illustrating correlation waveforms.
Figure 7B:
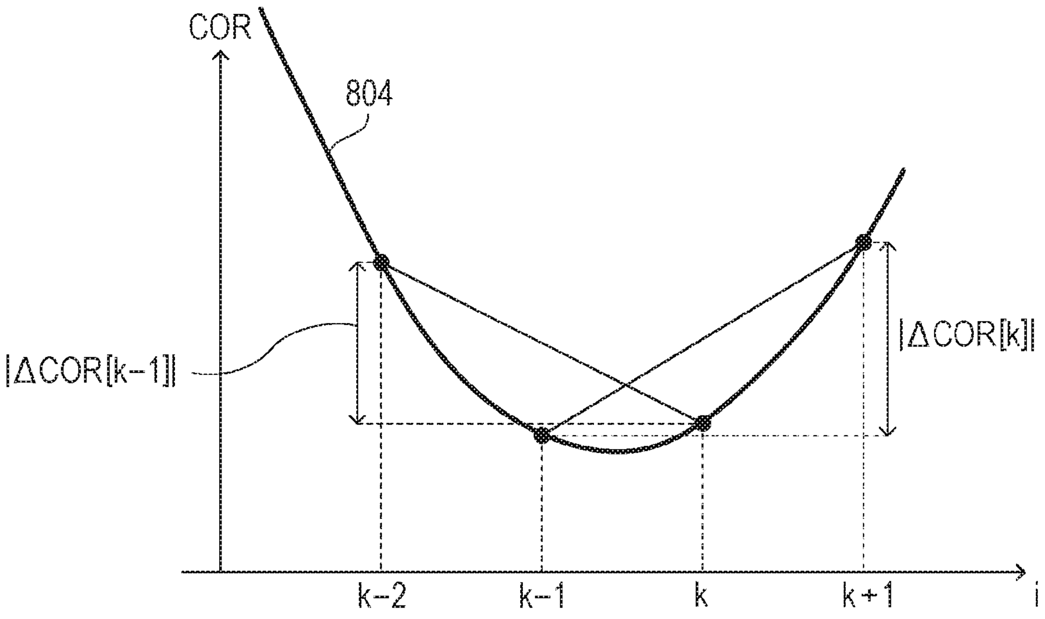

FIGS. 7A and 7B are examples of the relation between shift amount and COR. The horizontal axis represents the amount of shift, and the vertical axis represents COR. In FIG. 7A, extreme values 702 and 703 are seen to exist in a COR waveform 701 that changes in accordance with the amount of shift. The coincidence of the pair of image signals A and B is highest at the shift amount corresponding to the smallest COR of these extreme values.

In FIG. 7B, difference in correlation every other shift at the extreme value 703 of the COR waveform 701 is calculated as amount of change of correlation. The amount of change of correlation ΔCOR can be calculated by Expression (2)

$$\Delta\text{—}COR[i]=COR[i-1]-COR[i+1] \quad (2)$$

where i represents the shift amount, p−s represents the greatest shift amount in the negative direction, q−t represents the greatest shift amount in the positive direction, the relation of p−s+1<q−t−1 holds, and the range of the shift amount i is p−s<i<q−t.

Figure 8A:
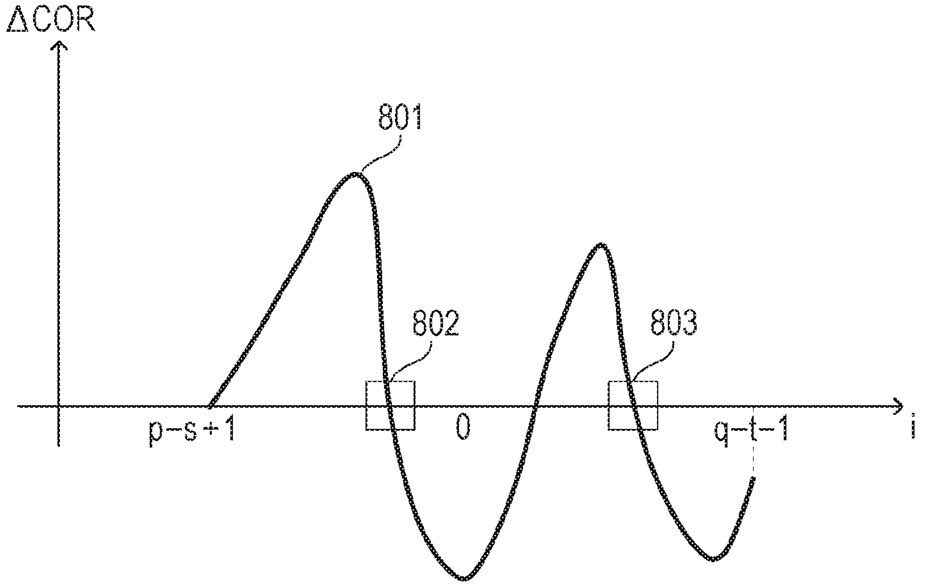
FIGS. 8A and 8B are diagrams illustrating amount of change in correlation.
Figure 8B:
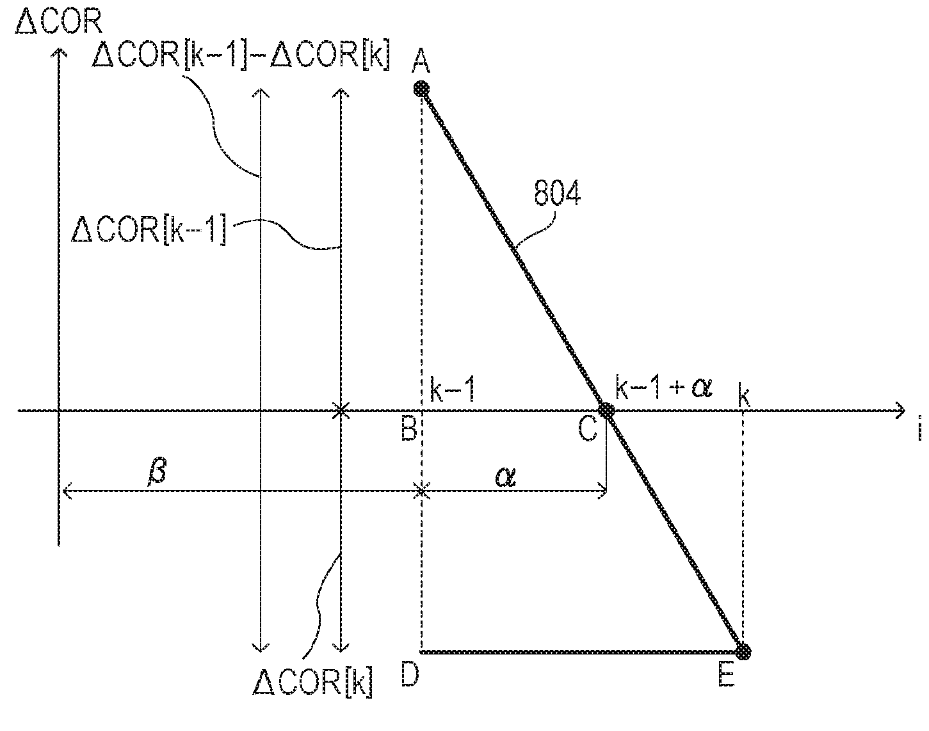

FIGS. 8A and 8B are examples of the relation between shift amount and the amount of change of correlation ΔCOR. The horizontal axis represents the shift amount, and the vertical axis represents the amount of change of correlation ΔCOR. In FIG. 8A, a ΔCOR waveform 801 that changes in accordance with this shift amount changes from the positive side to the negative side at portions 802 and 803. A state where the amount of change of correlation becomes zero is called zero-cross, and the coincidence with the pair of image signals A and B is the highest. Accordingly, the amount of shift that yields zero-cross is the amount of image displacement.

FIG. 8B is an enlarged display of 802 in FIG. 8A. 804 represents part of the ΔCOR waveform 801. The shift amount (k−1+α) that yields zero-cross can be divided into an integer part β (i.e., k−1) and a decimal part α. Based on the similarity relation of triangle ABC and triangle ADE in FIG. 8B, the decimal part α can be calculated from Expression (3) below.

$$AB{:}AD = BC{:}\,DE \tag{3}$$

$$\Delta COR[k-1]{:}\Delta COR[k-1] - \Delta COR[k] = \alpha{:}k-(k-1)$$

$$\alpha = \frac{\Delta COR[k-1]}{\Delta COR[k-1] - \Delta COR[k]}$$

The integer part β can be calculated from Expression (4)

$$\beta = k-1 \tag{4}$$

and the amount of image displacement can be calculated from the sum of α and β here.

In a case where there are multiple occurrences of zero-cross of the amount of change of correlation ΔCOR as illustrated in FIG. 8A, the one of which the maximum derivative (MaxDer) is greatest in the vicinity is taken as the first zero-cross. MaxDer is an indicator indicating the ease of focus detection, and a great value indicates a point where accurate focus detection can be easily performed. MaxDer can be calculated from the following Expression (5).

$$\text{MaxDer} = |\Delta COR[k-1]| + |\Delta COR[k]| \tag{5}$$

Figure 9:
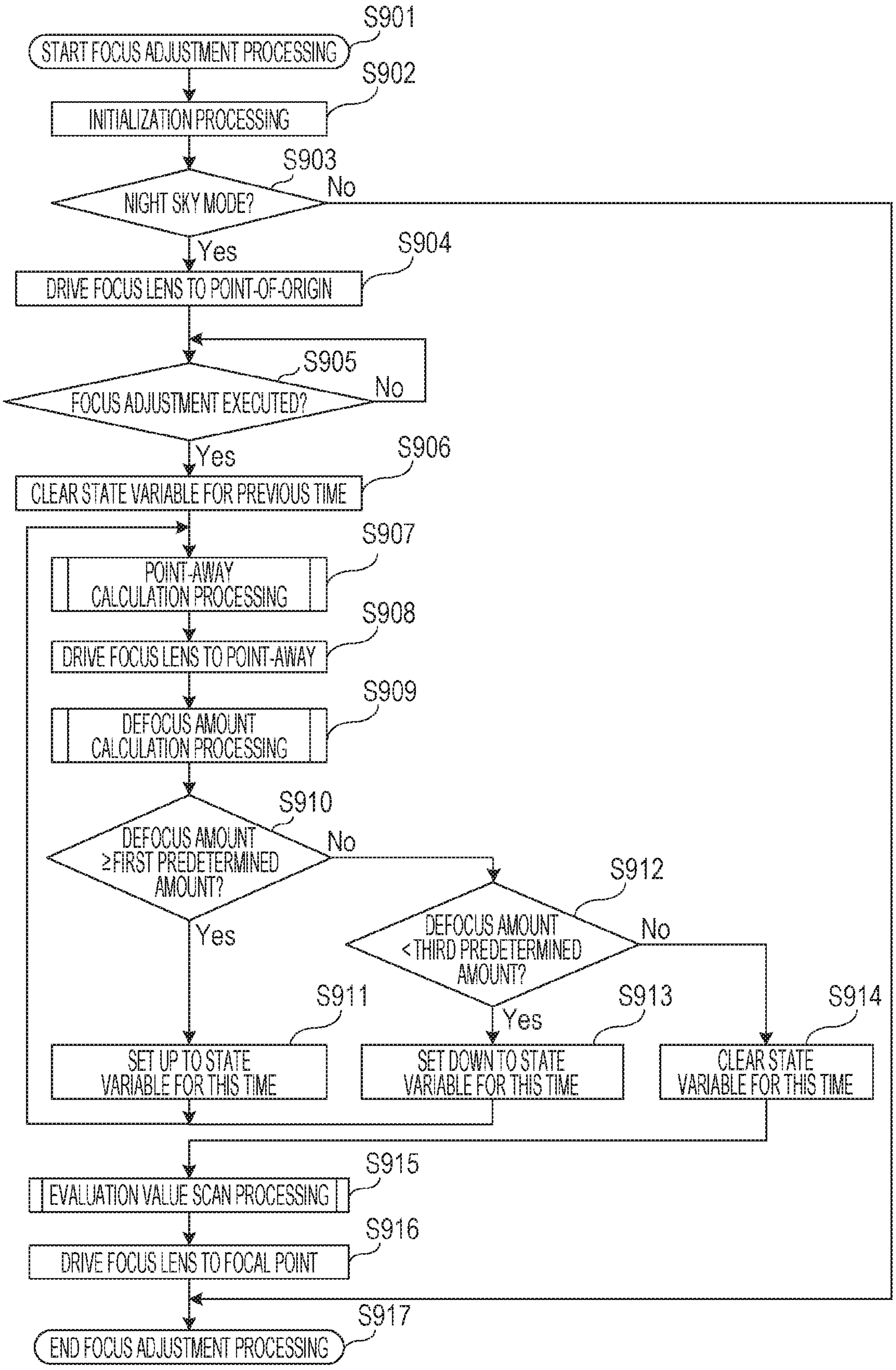
FIG. 9 is a flowchart illustrating focus adjustment processing.

In the following embodiment, in a case where there are multiple occurrences of zero-cross of the amount of change of correlation ΔCOR, a first zero-cross is decided by the MaxDer thereof, and the shift amount yielding this first zero-cross is taken as the amount of image displacement. FIG. 9 is a flowchart describing focus adjustment processing.

In step S901, starting of focus adjustment processing is declared. Step S902 is initialization processing, and overall initialization processing such as initialization of variables to be used by the imaging apparatus and so forth is performed. Step S903 is determination of whether or not in night sky mode. In a case where the user has selected the night sky mode as the shooting mode from the operating unit 116, the flow advances to the subsequent step S904, and drives the focus lens 104 to the position for focusing on an infinity-distance subject, stored in the point-of-origin storing unit 130.

In step S905, determination is made regarding whether or not the user has performed focus adjustment in the night sky mode from the operating unit 116. The point-of-origin that has been adjusted for each individual imaging apparatus may have shifted due to temperature change, attitude change, or change over time, as described earlier. Accordingly, the user may execute focus adjustment every now and then while shooting stars, that are at an almost unchanged distance from the imaging apparatus.

In a case where focus adjustment is not performed, monitoring is performed until focus adjustment is performed. In a case where focus adjustment is performed, the state variables from the previous time are cleared in the subsequent step S906. A state variable is a variable storing a state of whether a defocus amount calculated at a later-described point-away is larger or smaller as compared with a predetermined value. A state variable from the previous time is, in a case of having narrowed the defocus amount to a desired amount, storing the previous state of the state variable, in order to use the state from the previous time.

In step S907, the point-away calculating unit 131 performs point-away calculation processing. Details of the point-away calculation processing will be described with reference to the flowchart in FIG. 10.

In step S1001, starting of point-away calculation processing is declared. In step S1002, the attitude detecting unit 117 obtains the current attitude of the imaging apparatus. When the attitude of the imaging apparatus changes, the unit including the focus lens 104 may move in a direction where fitting looseness closes off under its own weight, and accordingly the in-focus position regarding infinity-distance subjects may also change.

In step S1003, the temperature detecting unit 118 obtains the current temperature of the imaging apparatus. The members making up the barrel 101 may shrink due to change in temperature, so the unit including the focus lens 104 inside is also affected by change in temperature, and accordingly the in-focus position regarding infinity-distance subjects may also change due to the effects of temperature change.

Note that in a case where the configuration does not have the attitude detecting unit 117 and temperature detecting unit 118, a value obtained by adding a margin to the greatest depth regarding which the position for focusing on infinity-distance subjects will shift due to attitude change and temperature change may be stored in the internal memory 112 beforehand. For example, a value that is twice this greatest depth may be taken as the point-away.

In steps S1004 and S1006, determination is made regarding which value the state variable this time is set to, out of the values "UP", "DOWN", or otherwise (the defocus amount calculated at the point-away has not been compared with the predetermined value even once). In a case where this is calculation of the defocus amount at the initial point-away, the flow advances to step S1014 and calculates the initial point-away.

Note that an arrangement may be made where the attitude and temperature detected as described above are each converted into depth shifted, and a value obtained by integrating the sum of these with a weighting coefficient presuming the amount of change over time is taken as the point-away. Alternatively, an arrangement may be made where conversion is made into the greatest depth of shifting due to attitude and temperature, and a value obtained by integrating the sum of these with a weighting coefficient presuming the amount of change over time is taken as the point-away.

Using the point-away detected by the attitude detecting unit 117 and temperature detecting unit 118 results in narrowing down the desired defocus amount quicker (alternatively, there may be cases where this is already narrowed down). Narrowing down to the desired defocus amount can be realized by using the greatest depth of shifting, even if there is no attitude detecting unit 117 or temperature detecting unit 118. The point-away calculation processing ends in step S1015.

Returning to FIG. 9, the focus lens 104 in step S908 is driven to the point-away calculated in step S907. Step S909 is defocus amount calculation processing.

Details of the defocus amount calculation processing will be described with reference to the flowchart in FIG. 11. In step S1101, the start of defocus amount calculation processing is declared. In step S1102, focus detection regions are set. As an example, 25 frames (5×5 frames) are set as regions for detecting stars in night sky mode in FIG. 2. The number of frames may be as small as one, or may be as many frames and as large in size as optionally set, as long as fitting within the screen.

In step S1103, the pair of A-image and B-image for focus detection are obtained from the imaging device 105 with regard to an optional frame set in step S1102. In step S1104, the A-image and B-image obtained in step S1103 are subjected to row-averaging processing in the vertical direction, to reduce the effects of sisal noise. Step S1105 is filtering processing where a predetermined frequency region component is extracted from the A-image and B-image averaged in step S1104.

In step S1106, the data subjected to filtering processing in step S1105 is subjected to correlation computation among image signals. This correlation computation is formed at each line following the row-averaging processing performed in step S1104. In step S1107, addition of the correlation COR that is the result of the computation in step S1106 is performed. In step S1108, the difference in correlation every other shift of the correlation COR calculated in step S1107 is calculated as amount of change of correlation ΔCOR. In step S1109, a zero-cross where the signal of the amount of change of correlation ΔCOR calculated in step S1108 changes is calculated, and the shift amount yielding this zero-cross, i.e., the amount of image displacement, is calculated.

In step S1110, determination is made regarding whether or not at least one or more zero-cross calculated in step S1108 exists. In a case where not even one zero-cross exists, NULL is set in step S1114, indicating that no defocus amount exists. In a case where at least one zero-cross exists, determination is made in step S1111 regarding whether or not multiple zero-crosses exist. In a case where two or more, i.e., multiple zero-crosses exist, a defocus amount is calculated where MaxDer, which is an indicator indicating the easiness of focus detection, is greatest is calculated in step S1112. In a case where only one zero-cross exists, the defocus amount is calculated for that zero-cross. The defocus amount calculating processing ends in step S1115.

Returning to FIG. 9, the defocus amount calculated in step S909 is compared with a first predetermined amount in step S910. In a case where the defocus amount is the first predetermined amount or more, the state variable this time is set to UP in step S911. Thereafter, the point-away calculation processing in step S907 is performed again.

In a case where the defocus amount is smaller than the first predetermined amount, the defocus amount is compared with a third predetermined amount in step S912. In a case where the defocus amount is smaller than the third predetermined amount, the state variable this time is set to DOWN in step S913. Thereafter, the point-away calculation processing in step S907 is performed again.

Returning to FIG. 10, description of steps S1001 through S1003 will be omitted here as they have already been described above. In step S1004, determination is made regarding whether or not the state variable for this time is UP. In a case where the state variable for this time is UP, the flow advances to step S1005, and determination is made regarding whether the state variable for the last time was cleared or UP. For the state variable for the last time to have been cleared means that this is the second time for performing point-away calculation processing. In a case where the state variable for the last time was cleared or UP, the flow advances to step S1008 where a second predetermined amount is calculated. The second predetermined amount is a value for bringing the point-away closer to the point-of-origin in stages, due to the point-away calculated last time having been too far from the point-of-origin. The second point-of-origin may be the difference between the first predetermined amount and the defocus amount, or may be a parameter decided beforehand in accordance with the configuration of the barrel, properties of members, and optical properties. In step S1011, a point-away that is closer to the point-of-origin by the second predetermined amount calculated in step S1008 is calculated. In a case where the state variable for the last time is UP in step S1005 but state variable for this time is DOWN, the point-away is recalculated in the opposite direction across the point-of-origin.

In the example in FIG. 5, this is a conceptual representation of having been performing calculation of defocus amount while bringing the point-away A closer to the point-of-origin in stages, but a region where variance width in defocus amount is great seems to have been entered, so defocus amount is calculated using the point-away B in the opposite direction across the point-of-origin. In a case where the state variable for this time is not UP in step S1004, determination is made in step S1006 whether or not the state variable for this time is DOWN. In a case where the state variable for this time is DOWN, determination is made in step S1007 whether the state variable for the last time was cleared or DOWN. For the state variable for the last time to have been cleared means that this is the second time for performing point-away calculation processing. In a case where the state variable for the last time was cleared or DOWN, the flow advances to step S1010 where a fourth predetermined amount is calculated. The fourth predetermined amount is a value for taking the point-away farther away from the point-of-origin in stages, due to the point-away calculated last time having been too close to the point-of-origin. The fourth predetermined amount may be the difference between the third predetermined amount and the defocus amount, or may be a parameter decided beforehand in accordance with the configuration of the barrel, properties of members, and optical properties.

In step S1012, a point-away that is distanced from the point-of-origin by the fourth predetermined amount calculated in step S1010 is calculated. In a case where the state variable for the last time is DOWN in step S1007 but state variable for this time is UP, the point-away is recalculated in the opposite direction across the point-of-origin. In the example in FIG. 5, this is a conceptual representation of having been performing calculation of defocus amount is large while taking the point-away B further away from the point-of-origin in stages, but a region where variance width in defocus amount seems to have been entered, so defocus amount is calculated using the point-away A in the opposite direction across the point-of-origin. The state variable for this time is saved in the state variable for last time in step S1013. Returning to FIG. 9, in step S908, the focus lens 104 is driven to the point-away recalculated in step S907.

The defocus amount is recalculated in step S909. In a case where the calculated defocus amount is smaller than the first predetermined amount and equal to or greater than the third predetermined amount, or is NULL, the state variable for this time is cleared in step S914. Step S915 is evaluation value scan processing.

Figure 12:
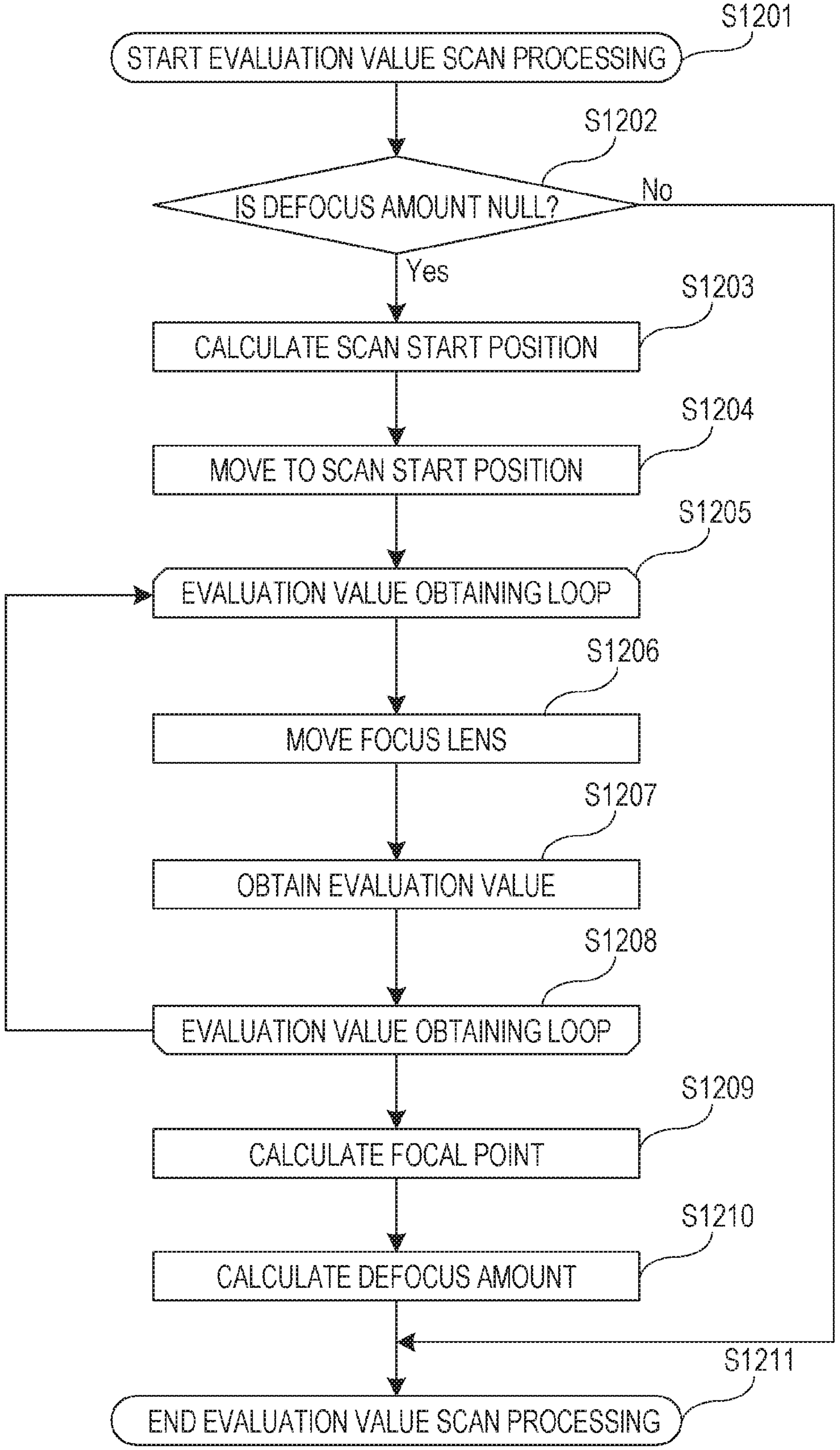
FIG. 12 is a flowchart illustrating evaluation value scan processing.

Details of the evaluation value scan processing will be described with reference to the flowchart in FIG. 12. Note that in a case where there is no portion to perform evaluation value scanning on, or a case where the defocus amount calculated earlier is NULL, the user is notified that no stars were detected.

In step S1201, starting of the evaluation value scan processing is declared. In step S1202, whether or not the defocus amount is NULL is determined. In a case where the defocus amount is NULL, calculation of a scan start position is performed in step S1203 using the point-away used last. There is a possibility that the results of assigning the point-away in the previous defocus amount calculation is causing autofocus hunting. Accordingly, the point-away used last, or a point that has been distanced to a depth obtained by weighting, by a predetermined value, the depth from the point-of-origin to the point-away, is used as the start point for scanning.

In step S1204, the focus lens 104 is moved to the scan start position calculated in step S1203. Step S1205 is the start of a loop for the evaluation value calculating unit 126 and scan control unit 128 to perform evaluation value obtaining, step S1208 is the end of the evaluation value obtaining loop, and the processing therebetween is repeatedly executed. In step S1206, the focus lens 104 is moved every predetermined interval within a scanning range. In step S1207, evaluation values are obtained at each point while continuously driving the focus lens 104.

In step S1209, the in-focus point that has the highest contrast is calculated from the evaluation value shape obtained from the evaluation value obtaining loop. In step S1210, the defocus amount is calculated from the in-focus point calculated in step S1209. In a case where the defocus amount was not NULL in the determination in step S1202, that value is applied as the defocus amount. In step S1211, end of the evaluation value scan processing is declared.

Returning to FIG. 9, in step S916, the focus lens 104 is driven to the defocus amount calculated in step S909 or step S915, i.e., the in-focus point. Step S917 is the end of focus adjustment processing.

As described above, in the present embodiment, correlation COR is computed by performing focal point detection at a point (point-away) away by a predetermined depth in the tar side direction and near side direction, with a focal position serving as a reference such as adjusted infinity as the point-of-origin. Accordingly, defocus amount with high reliability (little variance) can be calculated, so minute point light sources can be focused on with high accuracy.

Second Embodiment

In a second embodiment, a wide-range region of an imaging plane is divided into multiple small regions, regions where stars exist are detected, and the final defocus amount and reliability of the defocus amount are calculated from the correlation computation results in extracted regions. Note that the configuration of the digital camera, method of calculating the defocus amount in phase difference AF, and so forth, are the same as in the first embodiment, so description will be omitted.

Figure 13:
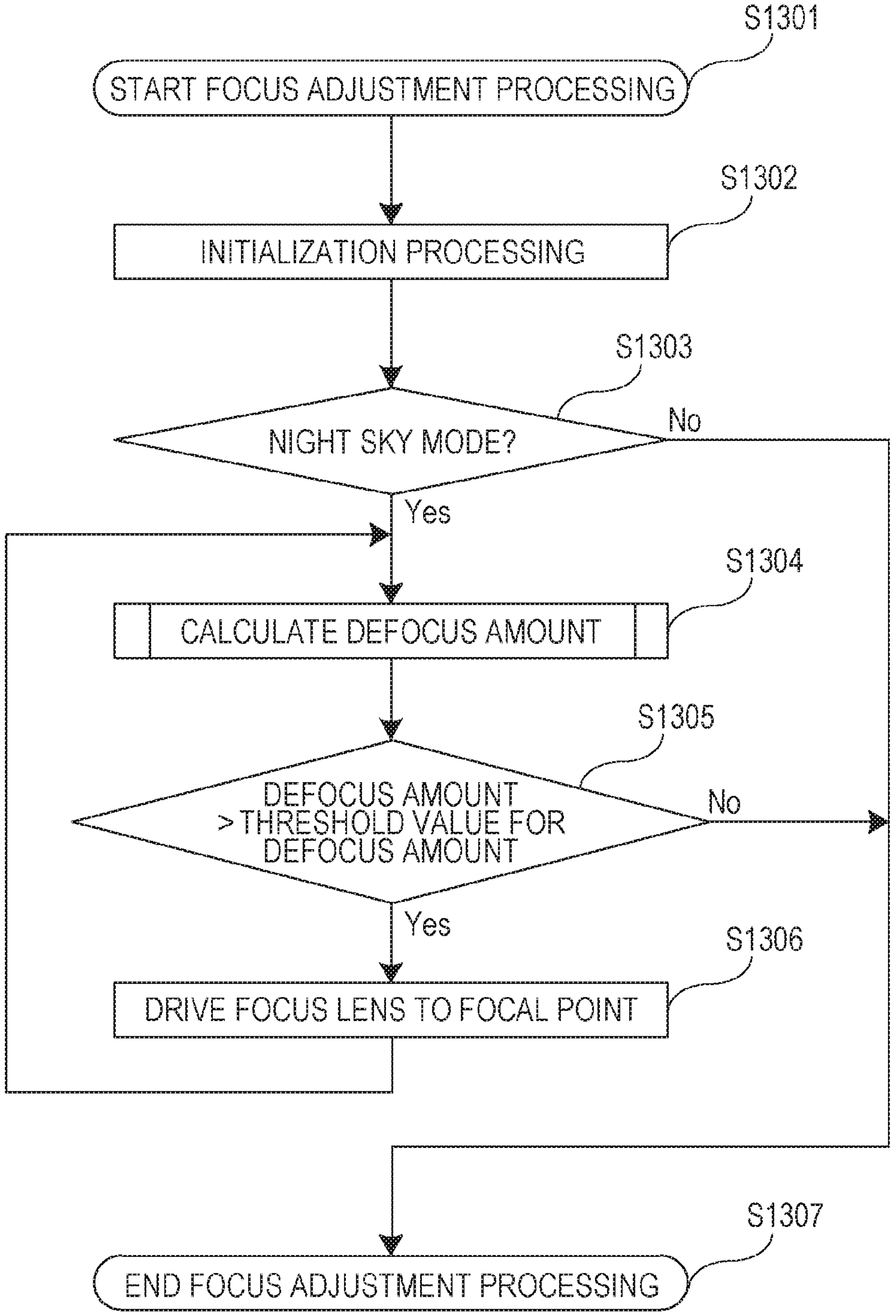
FIG. 13 is a flowchart illustrating focus adjustment processing.

The following is a description of the processing method according to the present embodiment, which will be made by way of reference to flowcharts. FIG. 13 is an overall processing flow of focus adjustment.

First, focus adjustment processing is started in step S1301, and in step S1302 initialization processing is performed. In the initialization processing, a conversion coefficient of converting an image displacement amount calculated by correlation computation into defocus amount is set, based on individual information of the imaging device 105 and aperture information of the diaphragm-shutter 103. Next, the flow advances to step S1303, and in a case where the user has not set the night sky mode, the flow advances to step S1307 and the focus adjustment processing ends. In a case where the user has set the night sky mode, the flow advances to step S1304, where the defocus amount is calculated. Details of the defocus amount calculation method will be described later. In step S1305, whether the defocus amount calculated in step S1304 is larger than a threshold value is determined. In a case where the defocus amount is greater than the threshold value in step S1305, the flow advances to step S1306 and the focus lens 104 is driven based on the defocus amount. After having driven the focus lens 104, the flow returns to step S1304 and the defocus amount is calculated, which is repeated until the defocus amount is equal to the threshold value or lower. In a case where the defocus amount is equal to the threshold value or lower in step S1305, the flow advances to step S1307, and the focus adjustment processing ends.

Figure 14:
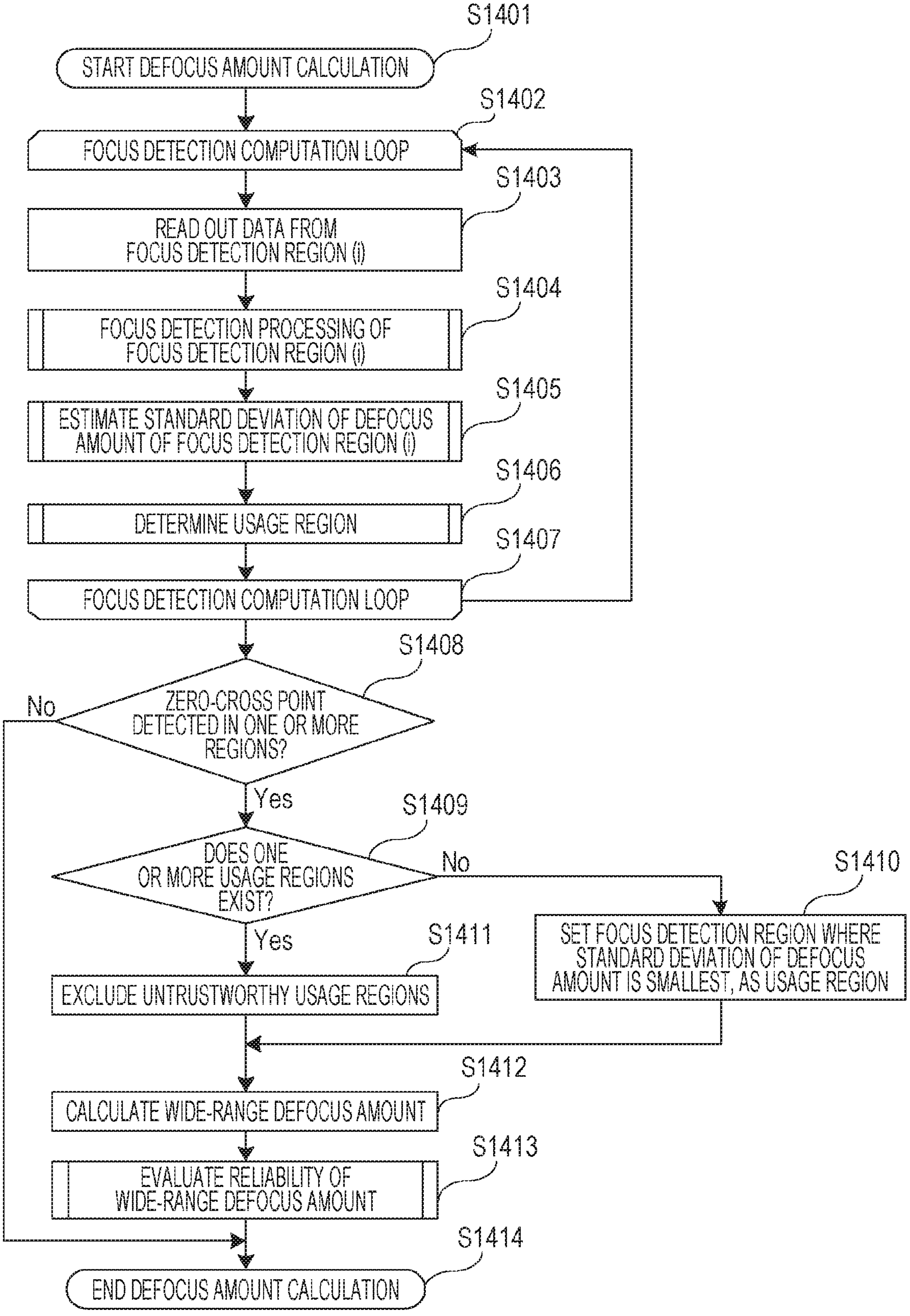
FIG. 14 is a flowchart illustrating defocus amount calculation processing.

The defocus amount calculation method of step S1304 will be described with reference to FIG. 14. Note that the defocus amount described here is the defocus amount used for ultimately driving the focus lens 104, and is a value obtained by integrating defocus amounts in multiple areas of the imaging plane.

The defocus amount calculation is started in step S1401, and focus detection computation is repeatedly performed from step S1402 through step S1407. The number of times that the processing from step S1402 through step S1407 is repeated is equal to the number of segments into which the focus detection region has been segmented into. Since 25 frames (5×5 frames) are set in the present embodiment as illustrated in FIG. 2, the focus adjustment processing is repeated 25 times. In step S1403, data of the i'th region out of the 25 regions (hereinafter written as "focus detection region (i)") is read out. In step S1404, focus detection processing is performed on the data of the focus detection region (i) obtained in step S1403. The flow of focus detection processing will be described later. Next, in step S1405, standard deviation of the defocus amount is estimated for the focus detection region (i), based on the information obtained in step S1404. The standard deviation of the defocus amount is used as an evaluation value for evaluating the reliability of the defocus amount, and for selecting regions where stars are present. Details of the method for estimating the standard deviation of the defocus amount in step S1405 will be described later.

Next, a usage region is determined in step S1406, based on information obtained in steps S1404 and S1405. A usage region is a region where a star is present in a night sky, so determination of usage regions is important processing in the present embodiment. The reasons why only region where stars are present are determined is as follows. First, the signal quantity of the night sky is small, and there is a need to apply a large gain to increase the signal quantity. This results in a greater noise component. Also, stars are small subjects, so a high-frequency filter is applied to calculate defocus amount more accurately when performing correlation computation. This makes it easier to pick up high-frequency noise. Particularly; there is a possibility for defocus amount calculated from noise correlation of the A-image and B-image to be output in regions where there is no subject. Accordingly, regions where stars are present need to be selected, as described above. Details of the method for determining usage regions will be described later.

After the processing from step S1402 through step S1407 is performed 25 times, the repeat loop is exited and the flow advances to step S1408. In a case where zero-cross has been detected in at least one or more focus detection regions out of the 25 times, the flow advances to step S1409, and in a case where not even one was detected, the flow advances to step S1414 and the processing ends, since no defocus amount was detected. In step S1409, determination is made regarding whether at least one or more usage region exists. If there are no usage regions, the flow advances to step S1410, where the focus detection region having the smallest standard deviation of the defocus amount calculated in step S1405 is used as a usage region, and the flow advances to step S1412. In a case where there are one or more usage regions in step S1409, the flow advances to step S1411. Focus detection regions determined to be usage regions in step S1406 are compared one against another in step S1411, the focus detection regions that do not satisfy conditions are excluded from being usage regions.

Specifically, out of the defocus amounts in $N_1$ focus detection regions determined to be usage regions in step S1406, focus detection regions are excluded that output defocus amounts greatly deviated based on the following determination expression (6)

$$\frac{1}{N_1}\sum_{j=1}^{N_1} Defocus[j] - \sigma_{Def} \le Defocus[j] \le \frac{1}{N_1}\sum_{j=1}^{N_1} Defocus[j] + \sigma_{Def} \quad (6)$$

where $\sigma_{Def}$ represents the standard deviation of the defocus amount in the $N_1$ focus detection regions determined to be usage regions in step S1406, and Defocus[j] represents the defocus amount of the j'th focus detection region out of the $N_1$ focus detection regions. Note that the exclusion determination in step S1411 is not restricted to determining defocus amounts as in Expression (6), and other evaluation values used in computation may be used to perform exclusion determination.

In step S1412, defocus amount in a wide-range region of the imaging plane is calculated based on the defocus amounts in the usage regions extracted in the processing up to step S1411. The defocus amount in the wide-range region is the average value of the defocus amounts in the usage regions. Hereinafter, the defocus amount calculated in step S1412 will be referred to as "wide-range average defocus amount". Now, assumption is made that if the stars are at an approximately infinite distance, and the focus lens 104 is driven to a correct position, all stars should be in focus. Accordingly, the defocus amount of the usage regions can be averaged. An arrangement may be made here, where instead of simply averaging for the wide-range defocus amount, weighting is performed in accordance with the reliability of each focus detection region and the image height in the focus detection regions, so as to calculate a final defocus amount with the defocus amount in a most reliable focus detection region being emphasized. In a case of weighting in accordance with image height, the weighting is increased the closer to the middle, since there are no optical restrictions. Conversely, weighting is reduced the farther away from middle, since it is conceivable that reliability is lower due to the effects of distortion and so forth. Next, the reliability of the wide-range average defocus amount calculated in step S1412 is evaluated in step S1413. The method of evaluating the reliability will be described later. Calculation of the defocus amount ends in step S1414.

The driving amount is adjusted in step S1306 in accordance with the defocus amount and reliability of defocus amount calculated in step S1304. For example, in a case where the reliability of the defocus amount is high, the calculated defocus amount is converted into focus lens driving amount without change, and driving is performed. Conversely, in a case where reliability of the defocus amount is low, the calculated defocus amount is multiplied by a negative gain, and then converted into focus lens driving amount, by which driving is performed.

Figure 15:
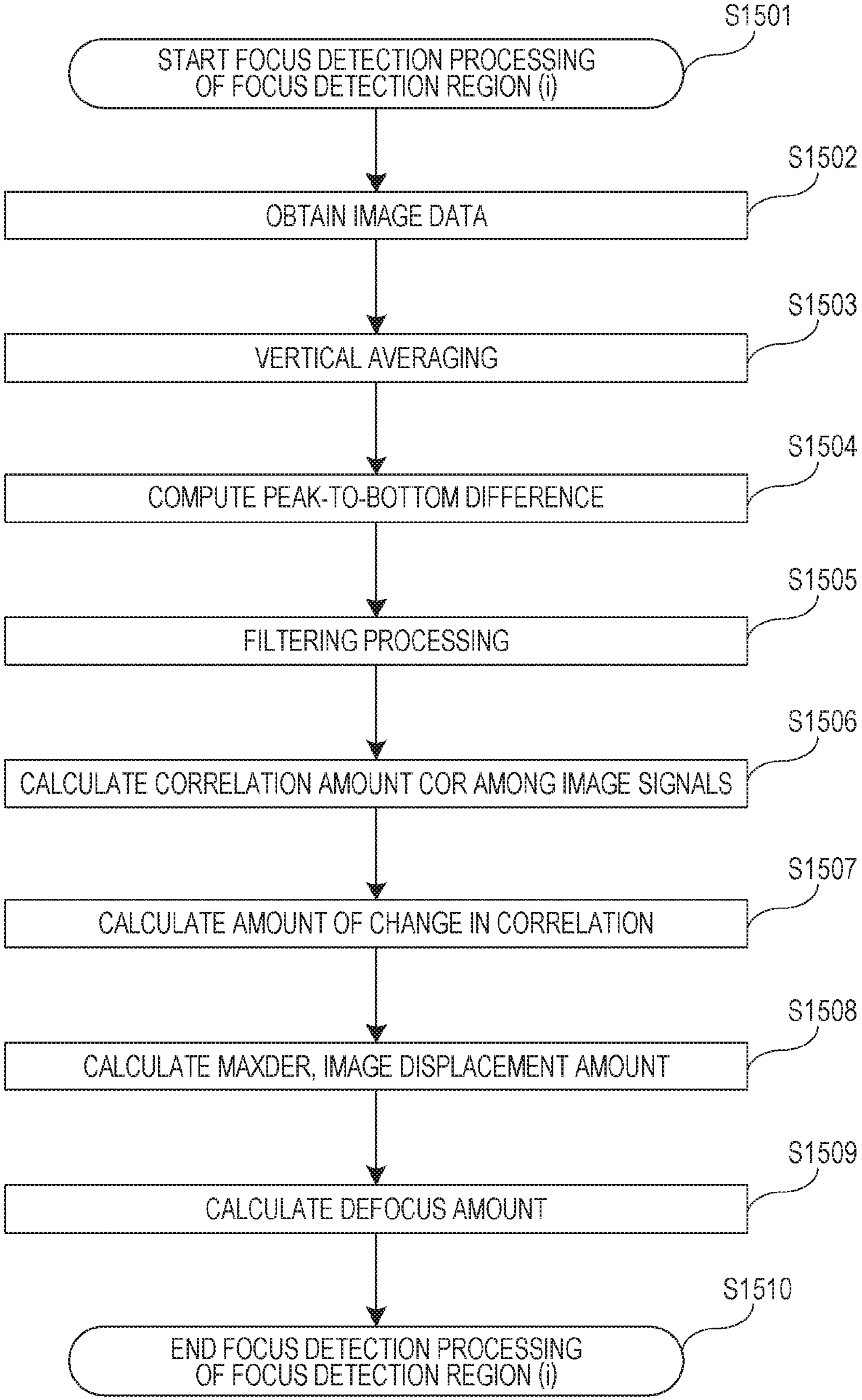
FIG. 15 is a flowchart illustrating focus detection processing.

Next, the method of carrying out the focus detection processing step S1404 of the segmented focus detection regions will be described with reference to FIG. 15. The processing is started in step S1501, and image data (A-image and B-image) within a focus detection region is obtained in step S1502. This image data is averaged in the vertical direction in step S1503. In step S1504, the difference between the peak (maximum value) and bottom (minimum value) of wavelength data after vertical averaging is calculated as a peak-to-bottom difference. The peak-to-bottom difference is used as an evaluation value for determining usage regions in step S1506. Next, in step S1505, the high-frequency component is extracted from the waveform data by subjecting the vertically averaged data to high-frequency filtering processing. In step S1506, the correlation COR of the image signal A and image signal B is calculated. The method of calculation is as described with reference to FIGS. 6A through 8B. The amount of change of correlation is calculated in step S1507 based on the correlation COR, and in step S1508, the MaxDer and amount of image displacement are calculated from the correlation COR and amount of change of correlation. In step S1509, the amount of image displacement is multiplied by a predetermined conversion coefficient, the defocus amount is calculated, and the processing ends in step S1510.

Figure 16:
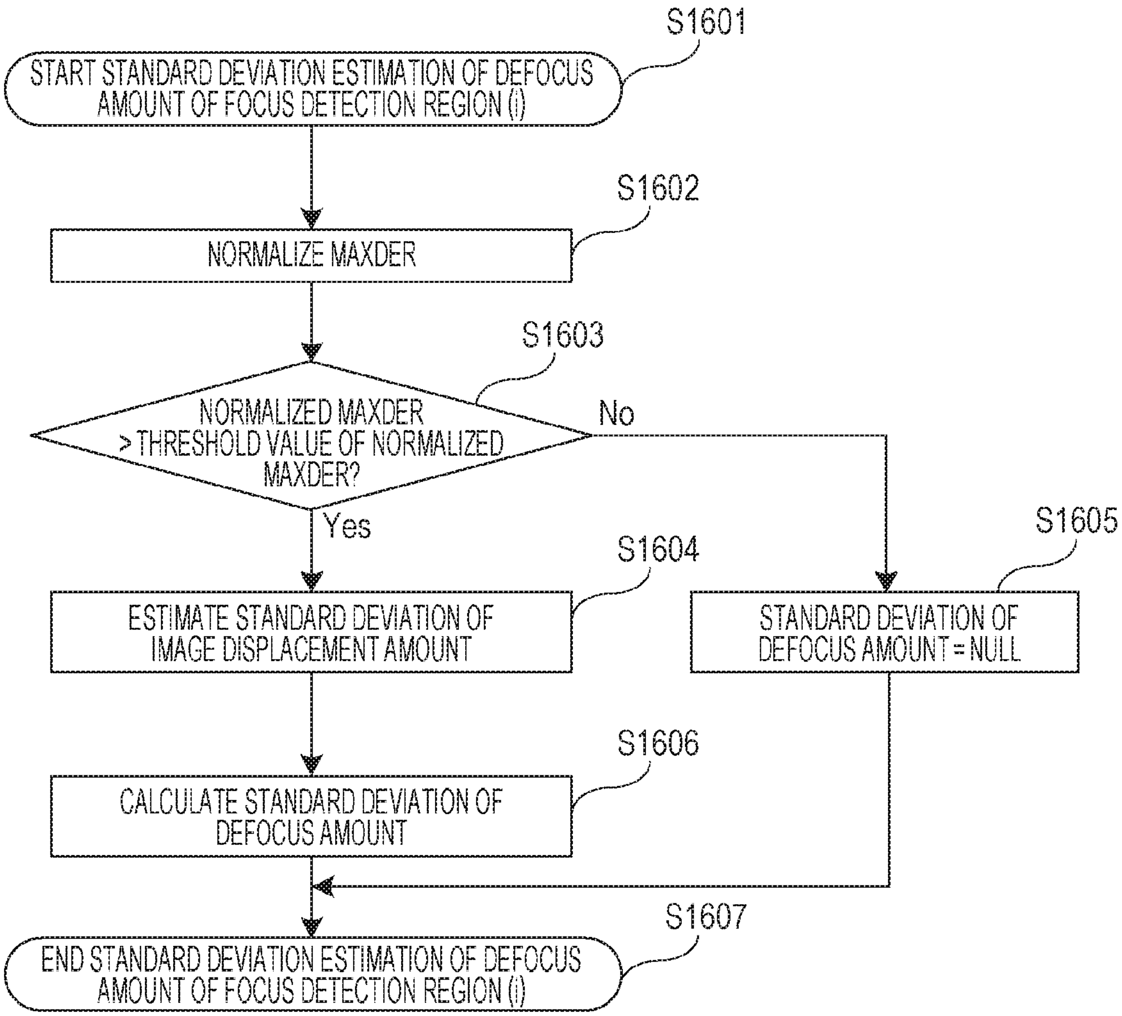
FIG. 16 is a flowchart illustrating standard deviation estimation processing.
Figure 17A:
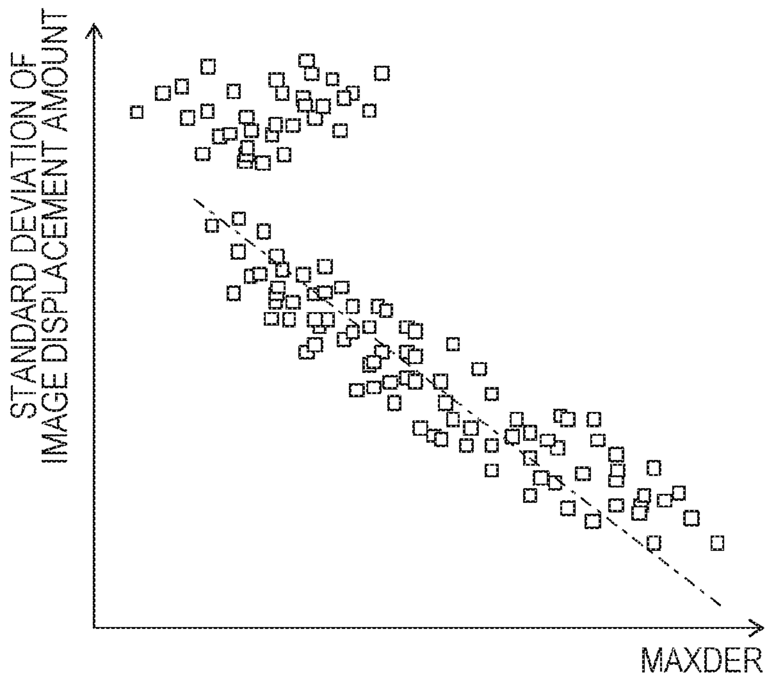
FIGS. 17A and 17B are diagrams illustrating correlation between standard deviation of image displacement, and maximum derivative (MaxDer).
Figure 17B:
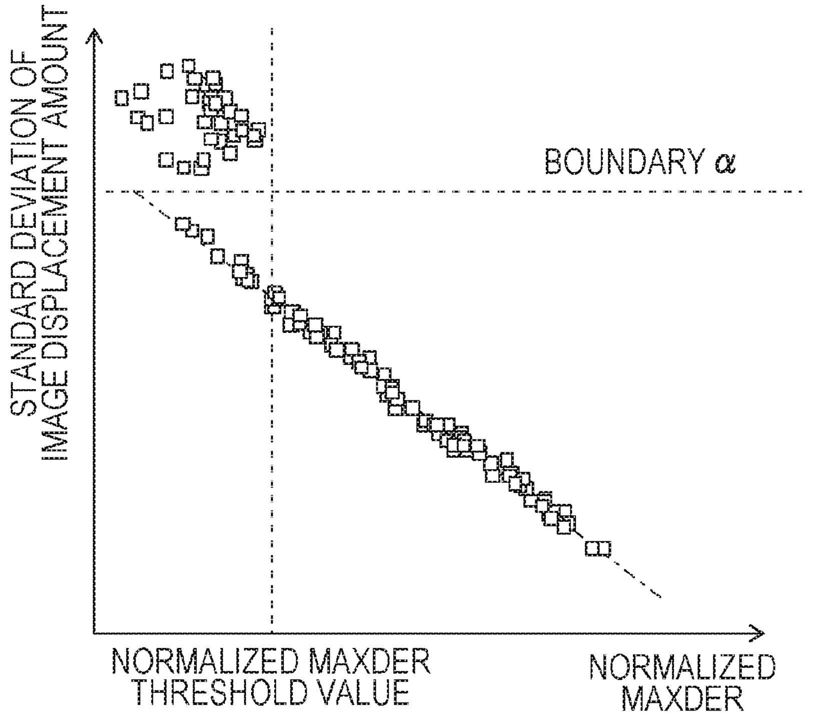

Next, the method of carrying out the step S1405 of estimating the standard deviation of the defocus amount for each segmented focus detection region will be described with reference to FIGS. 16 through 17B. First, it can be seen from FIG. 17A that there is a negative correlation between the standard deviation of the image displacement amount, and MaxDer. However, the degree of correlation is low, so the accuracy of estimating the standard deviation of image displacement amount from MaxDer is low. Accordingly, after starting processing in step S1601 in FIG. 16, MaxDer is normalized in step S1602. Normalization of MaxDer is processed in accordance with the frequency band of the filter used for correlation computation, gain adjustment parameter used at the CDS-AGC-AD converter 106, the number of rows vertically averaged in step S1503, and the contrast of the subject. The contrast of the subject is calculated by dividing the peak-to-bottom difference calculated in step S1504 by the peak value. Performing normalization realizes a higher correlation coefficient between the standard deviation of image displacement and MaxDer, as illustrated in FIG. 17B. In a case where the normalized MaxDer is below a threshold value in step S1603, the flow advances to step S1605, where the standard deviation of defocus amount is set to NULL. The reason is that no correlation is observed between the standard deviation of image displacement amount and the normalized MaxDer in a range above boundary a in FIG. 17B. The range above boundary a can be kept from being used by not using the range where the normalized MaxDer is at or below the threshold value. In step S1605, the standard deviation of defocus amount is determined to be incalculable, so the flow advances to step S1607 and processing ends. In a case where the normalized MaxDer is at the threshold value or higher in step S1603, the standard deviation of image displacement amount is estimated from the normalized MaxDer in step S1604, based on an approximation method of plot points in FIG. 17B that has been prepared beforehand. The standard deviation of defocus amount is then calculated in step S1606 by multiplying the standard deviation of image displacement amount by the same parameter as the conversion coefficient used in step S1509 to calculate the defocus amount. The flow then ends at step S1607.

Figure 18:
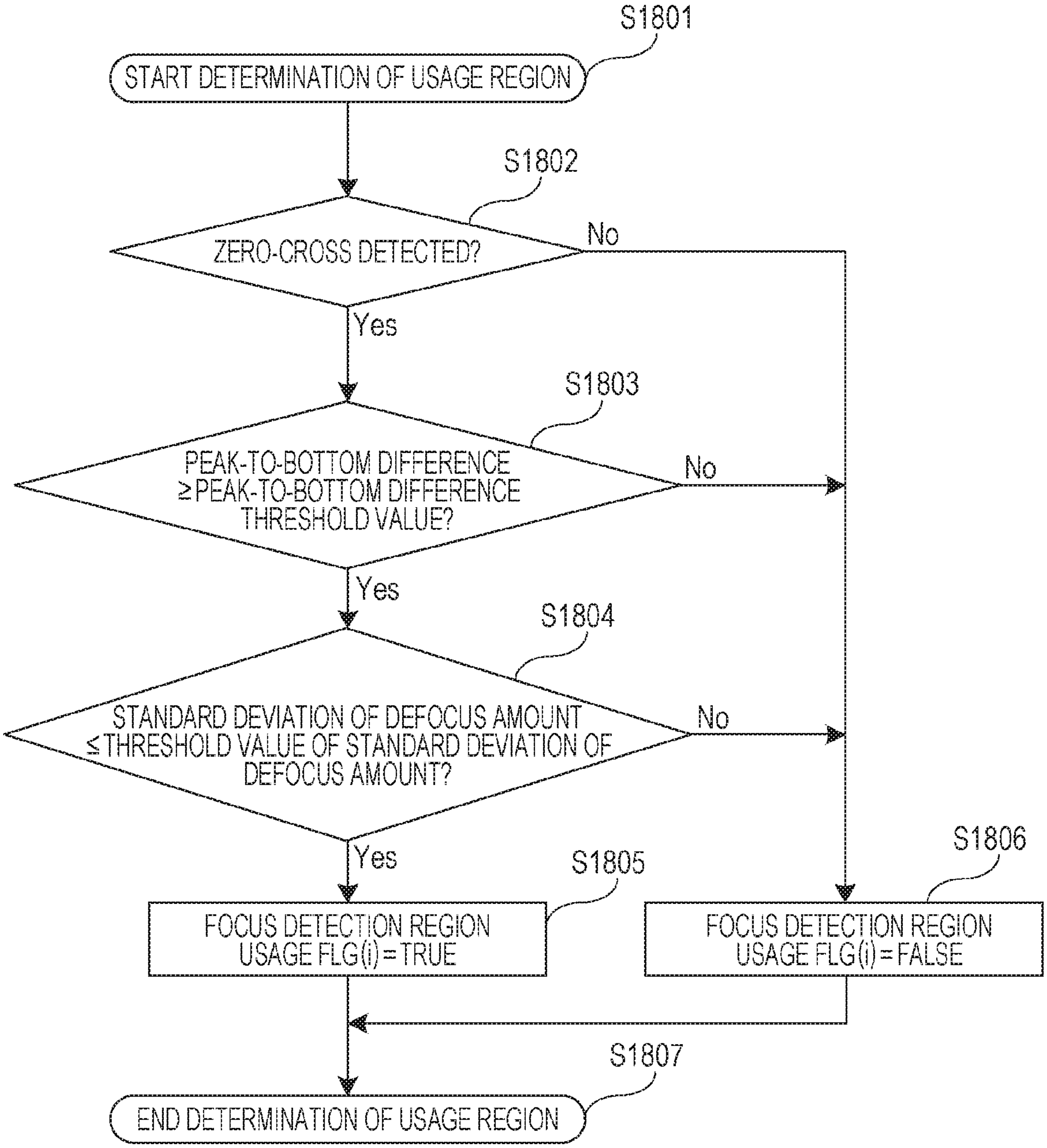
FIG. 18 is a flowchart illustrating determination processing of a usage region.

Next, the method of determining usage regions in step S1406 will be described with reference to FIG. 18. In step S1801 the processing starts, and determination processing is performed in steps S1802 through S1804. In step S1802, determination is made regarding whether or not zero-cross, where the amount of change in correlation becomes zero, has been detected. In a case where no zero-cross is detected, image displacement amount cannot be calculated, so the flow advances to step S1806 and this focus detection region is not taken to be a usage region. In step S1803, determination is made regarding whether the peak-to-bottom difference calculated in step S1504 is at a threshold value or above. In a case where the peak-to-bottom difference is smaller than the threshold value in a focus detection region, the flow advances to step S1806, having judged that there are no stars in this focus detection region or the brightness is insufficient to perform correlation computation. Next, in step S1804, whether or not the standard deviation of defocus amount estimated in step S1405 is equal to or below a threshold value is determined. If greater than the threshold value, the flow advances to step S1806, having judged that the variance in defocus amount in this focus detection region is great and that reliability of the defocus amount is low. In a case where all conditions from step S1802 through step S1804 are satisfied, this focus detection region can be taken as a usage region. Note that determination of usage regions is not restricted to steps S1802 through S1804, and that determination may be made using conversion coefficients for calculating defocus amount from image displacement amount or evaluation values used for correlation computation. Finally, the flow advances to step S1807 and the processing ends.

Figure 19:
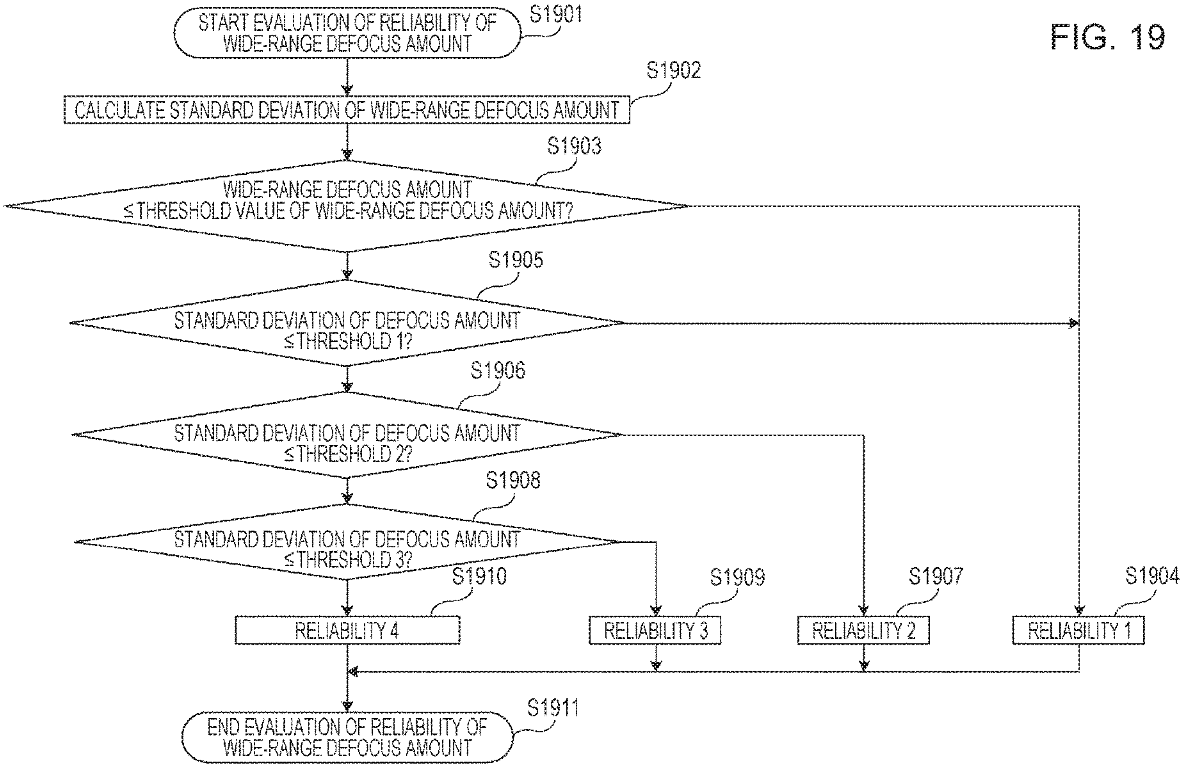
FIG. 19 is a flowchart illustrating evaluation processing of the reliability of defocus amount.

Next, the method for evaluating the reliability of the wide-range average defocus amount in step S1413 will be described with reference to FIG. 19. In the present embodiment, the reliability of defocus is expressed in four stages, being no reliability (reliability 1), direction of defocus acceptable (reliability 2), amount of defocus acceptable (reliability 3), and in-focus (reliability 4). Note that the number of stages of reliability may be changed in accordance with the method of driving the focus lens 104, the mode, and so forth.

After having started processing in step S1901, WideDefocusσ, which is the standard deviation of defocus amount for the wide-range region, is calculated in step S1902 based on Expression (7)

$$WideDefocus\sigma = \frac{1}{N_2}\sum_{k=1}^{N_2} Defocus[k] \times \frac{1}{\sqrt{N_2}} \tag{7}$$

where $N_2$ represents the number of usage regions extracted in step S1411, and Defocusσ[k] represents the standard deviation of defocus amount in the k'th focus detection region out of the $N_2$ focus detection regions. The reason for multiplying by $1/\sqrt{N_2}$ at the end is to improve the S/N ratio in accordance with the square root of the number of added regions.

Next, determination is made in step S1903 regarding whether or not the wide-range average defocus amount calculated in step S1412 is at a threshold value or below. This threshold value is set to an extremely large value, and is used in night sky shooting for processing to exclude focus made on subjects other than stars. In a case where the threshold value is exceeded in step S1903, the flow advances to step S1904 and reliability 1 is set for the reliability of defocus. In a case where the wide-range average defocus amount is at the threshold value or below in step S1903, the reliability is decided in step S1905 and thereafter with regard to the magnitude of the wide-range defocus amount standard deviation calculated in step S1902. In a case where the wide-range defocus amount standard deviation is greater than a threshold 1 in step S1905, the flow advances to step S1904 and reliability 1 is set, while if equal to or below threshold 1, the flow advances to step S1906. In a case where the wide-range defocus amount standard deviation is greater than a threshold 2 in step S1906, the flow advances to step S1907 and reliability 2 is set, while if equal to or below threshold 2, the flow advances to step S1908. In a case where the wide-range defocus amount standard deviation is greater than a threshold 3 in step S1908, the flow advances to step S1909 and reliability 3 is set, while if equal to or below threshold 3, the flow advances to step S1910 and reliability 4 is set. Reliability of the defocus amount is thus evaluated by the above-described method, and the processing ends in step S1911.

Multiple regions are set on an imaging plane for a night sky, and defocus amount and the reliability of defocus amount are calculated by using only trustworthy regions in the present embodiment, as described above. Thus, defocus amount can be calculated with high accuracy even for stars with low brightness by performing calculation in this way.

Third Embodiment

Figure 20A:
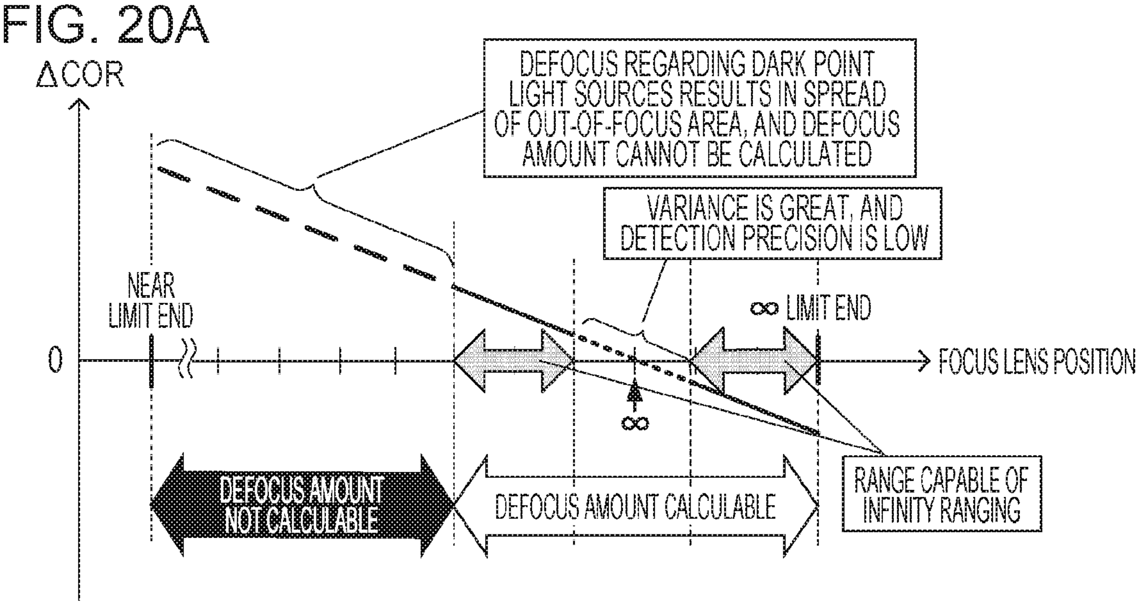
FIG. 20A is a diagram illustrating defocus amount of point light source subject when in phase difference AF.

FIG. 20A is a diagram for describing properties in a case of detecting defocus amount by an image plane phase-difference focus detecting unit, with a dim point light source at infinite distance. The vertical axis is the amount of change of correlation ΔCOR expressed by Expression (2), and the horizontal axis is the position of the focus lens. The focus position and the value of the amount of change of correlation ΔCOR are in a linear relation, indicating that the point of zero-cross with the horizontal axis is the in-focus position. In the case of FIG. 20A, the zero-cross point with the horizontal axis is infinite distance. However, in a case where the subject is a dim light source, if the focus lens greatly deviates from the in-focus position, the out-of-focus greatly spreads and the subject is lost in the background, so the linearity in the region between the in-focus position and the amount of change of correlation ΔCOR is lost, so the defocus amount cannot be calculated.

On the other hand, near and at the zero-cross point, the dim light source is smallest in area on the image plane, and the count of pixels making up the point image is also the smallest. Accordingly, clear phase difference is not readily obtained by performing correlation computation between the A-image and B-image, variance error increases in the calculated defocus amount, and accuracy tends to be low. That is to say, in a case of performing highly accurate AF by imaging plate phase-difference on a dim point light source subject, focus detection needs to be performed in a focus lens position range where the defocus amount is calculable, excluding around and at the zero-cross point. Hereinafter, this focus lens position range will be referred to as "infinity-focus-detectable range".

Now, it is self-evident that the infinity position of the focus lens is near the point of zero-cross of the amount of change of correlation ΔCOR. Accordingly, if information of the infinity position of the focus lens can be obtained beforehand, the focus lens can be moved to the infinity-focus-detectable range with this infinity position as a reference, and focal point detection can be facilitated.

Figure 20B:
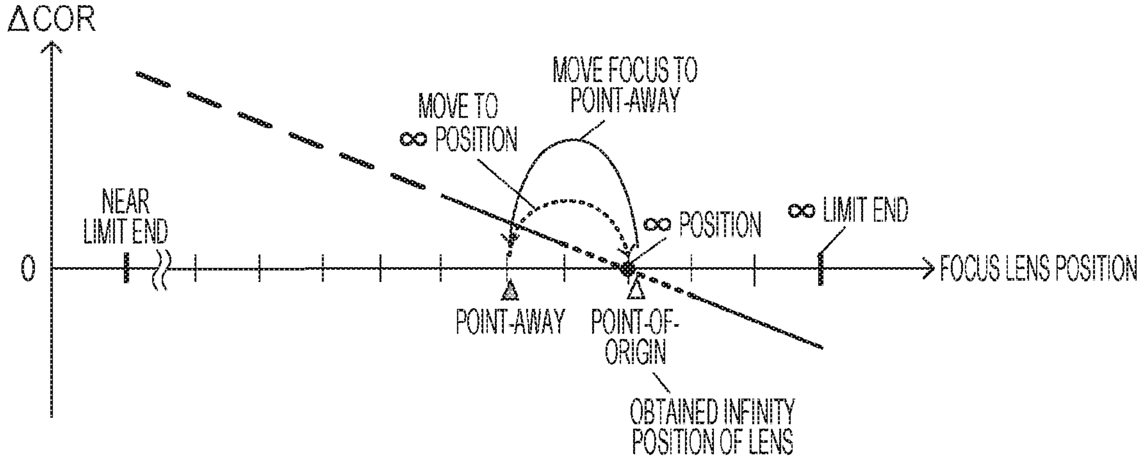
FIGS. 20B and 20C are diagrams illustrating focus detection processing in an imaging apparatus of which the infinity distance position is unknown.

FIG. 20B is a diagram for describing an example for detecting the in-focus position of a dim light source with an imaging apparatus capable of obtaining the infinity position of the focus lens. Here, the obtained infinity position can be set as the point-of-origin, and a point-away can be set a predetermined distance away from the point-of-origin within the infinity-focus-detectable range. Accordingly, the infinity position of the focus lens can be detected with high accuracy, by calculating the defocus amount at an appropriate point-away.

However, in the case of an imaging apparatus regarding which the infinity position of the focus lens cannot be obtained, a focus position where the defocus amount of the dire point light source subject can be obtained needs to be searched for, leading to problems such as linger focal point detection time, lower accuracy in focus detection, and so forth. Accordingly, the present embodiment proposes a method for detecting the infinity position of a focus lens with high accuracy while reducing focus detection time, even with an imaging apparatus regarding which the infinity position of the focus lens cannot be obtained. The contents thereof will be described below.

Figure 20C:
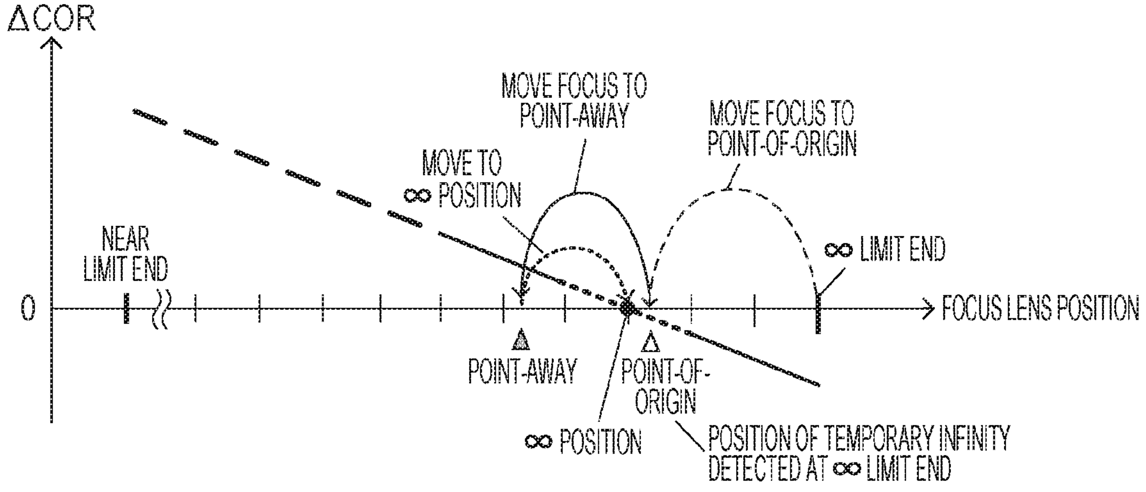

FIG. 20C is a diagram for describing an example of detecting the focus position of a dim point light source in a case where the infinity position of the focus lens is unknown. First, the focus lens is moved to a control end in the infinity distance direction of the focus lens. The defocus amount is then calculated at the position of the control end, and a temporary infinity position is detected. The control end in the infinity distance direction of the focus lens in this description includes cases of being a movable end decided by a physical mechanical member, and cases of a position where a drivable range is restricted by software.

This temporary infinity position is taken as the point-of-origin described in FIG. 20B, the focus lens is moved to the point-of-origin position, a point-away is set a predetermined distance away therefrom in the infinity-focus-detectable range, and thereafter the focus lens is moved to the point-away, and the defocus amount is calculated. Accordingly, the defocus amount can be calculated at an appropriate point-away, and the infinity point of the focus lens can be detected with high accuracy.

Figure 21:
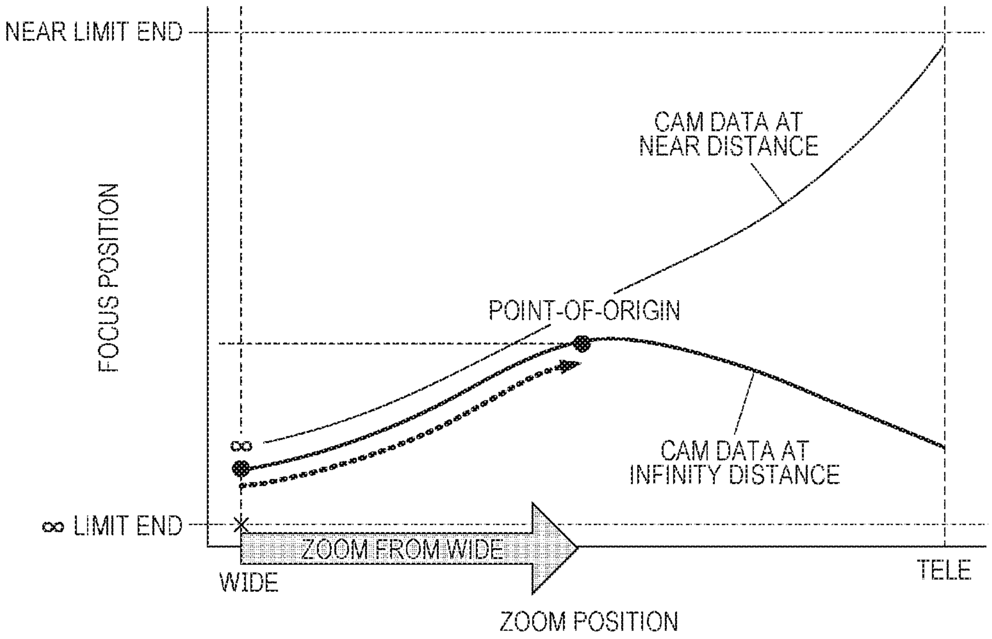
FIG. 21 is a diagram illustrating the relation between a focal lens and zoom lens cam track.

Next, description will be made regarding processing where, in a case of having detected the infinity position of the focus lens by performing image plane phase-difference focus detection with a dim point light source as a subject and then having performed a zoom operation, focus detection is performed on the same subject again. FIG. 21 is a diagram illustrating an example of focus cam data of a zoom lens.

Figure 22A:
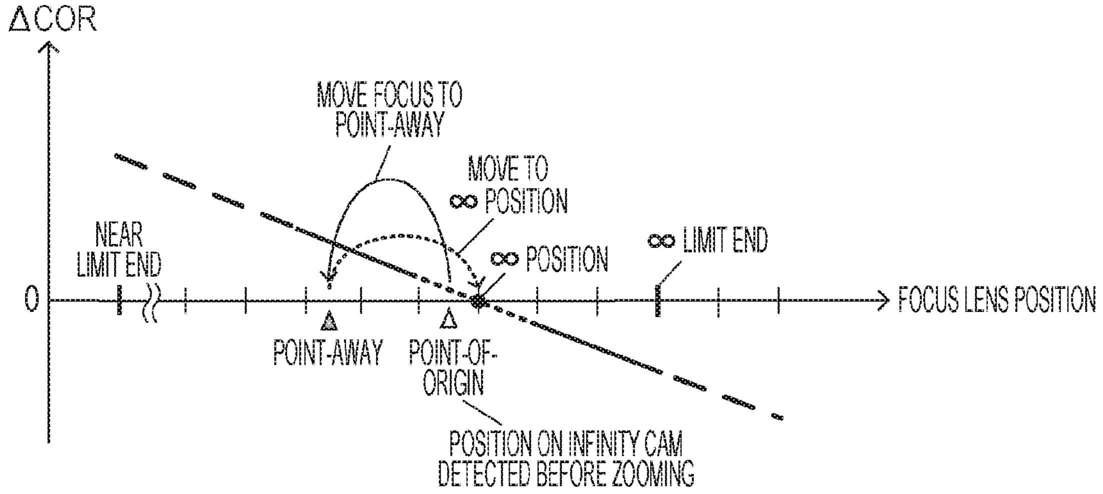
FIGS. 22A through 22C are diagrams illustrating an example processing of a point light source subject when in phase difference AF.

A case is illustrated here where the infinity position when at the wide side is at a position toward the near side as compared to the infinity limit end of the focus lens. When the zoom is gradually moved from the wide side toward the tele side, the focus lens also moves in accordance with the zoom position, while maintaining an in-focus state by tracking the cam data from the infinity position at the wide side. The cam data here may be an arrangement where the focus lens moves cooperatively with zooming by a mechanical configuration, or may be an arrangement where the position of the focus lens is controlled cooperatively with the zoom position by software. In a case of having performed focus detection on a dim light source subject, following which a zoom operation is performed, and then performing focus detection in the same subject again, the position of the focus lens that has moved over the cam data cooperatively with the zooming as illustrated in FIG. 22A is taken as the point-of-origin described in FIG. 20B. The focus lens is moved to the point-of-origin, a point-away is set a predetermined distance away therefrom in the infinity-focus-detectable range, following which thereafter the focus lens is moved to the point-away, and the defocus amount can be calculated.

Figure 22B:
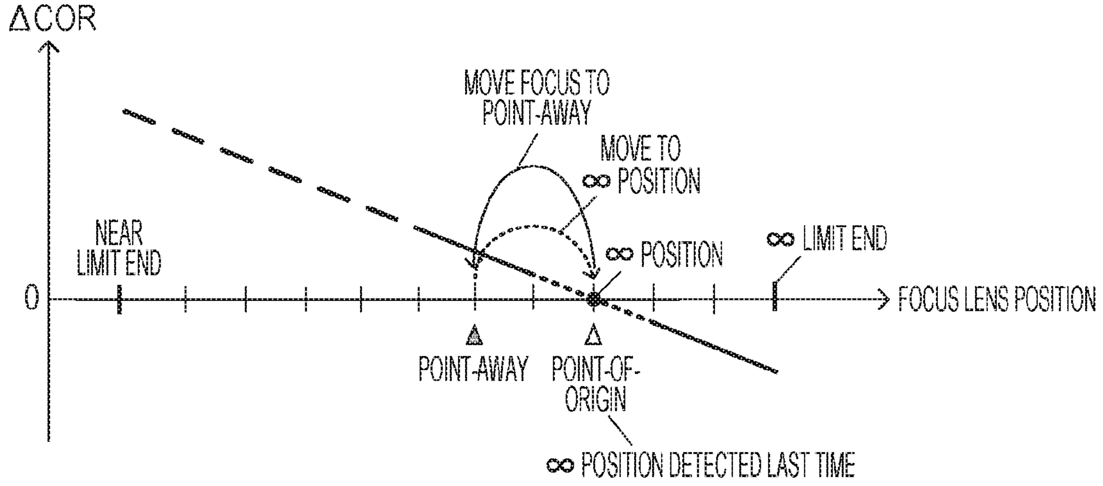

Processing when having detected the infinity position of the focus lens by performing image plane phase-difference focus detection with a dim point light source as a subject, and thereafter performing focus detection on the same subject again, will be described with reference to FIG. 22B. It is not unusual to perform focus detection with a dim point light source as a subject, and then repeatedly perform focus detection on the same subject if the focus detection results are not as expected. In this case, the focus lens position where focus detection was performed on the dim point light source subject the previous time is taken as the point-of-origin described in FIG. 20B, as illustrated in FIG. 22B. The focus lens is moved to the point-of-origin, a point-away is set a predetermined distance away therefrom in the infinity-focus-detectable range, following which thereafter the focus lens is moved to the point-away, and the defocus amount can be calculated. In cases where focus detection is performed on the same subject the third and subsequent times as well, processing is repeated with the focus detection result from the previous time as the point-of-origin.

Figure 22C:
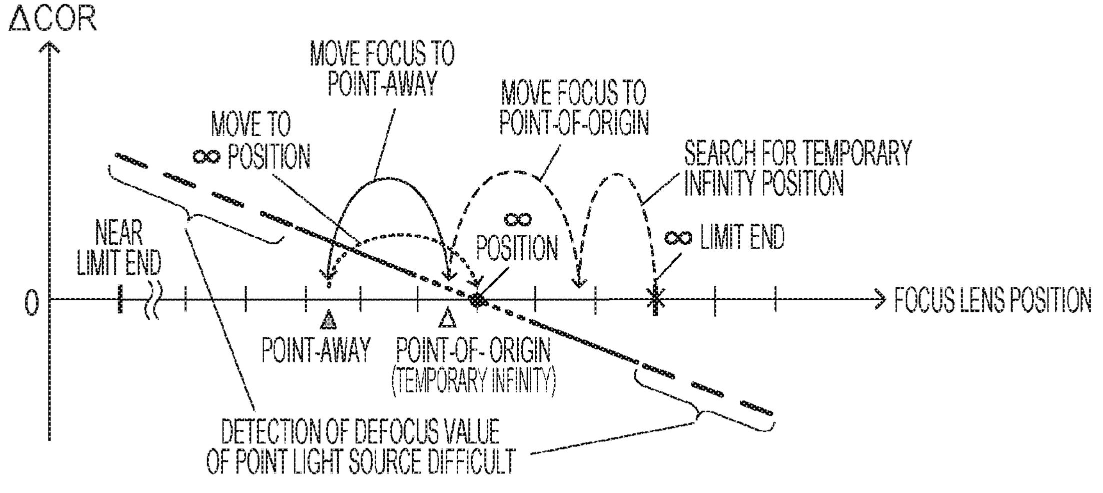

Description has been made above regarding how to decide a point-of-origin of detecting the focus position of a dim point light source subject in a case where the infinity position of the focus lens is unknown. However, cases can be conceived where a temporary infinity position cannot be detected even if the focus lens is moved to the infinity limit end and defocus amount is calculated, as illustrated in FIG. 22C. In such a case, a search is performed for the temporary infinity position.

The focus lens is moved from the infinity limit in the infinity distance direction by a predetermined distance, and the defocus amount is calculated at this position. If the temporary infinity position can be detected here, the point-of-origin can be decided. If the temporary infinity position cannot be detected here, the focus lens is moved by a predetermined distance again, and this processing is repeated until the temporary infinity position is detected. The predetermined distance here is a shorter distance than the infinity-focus-detectable range.

Figure 23:
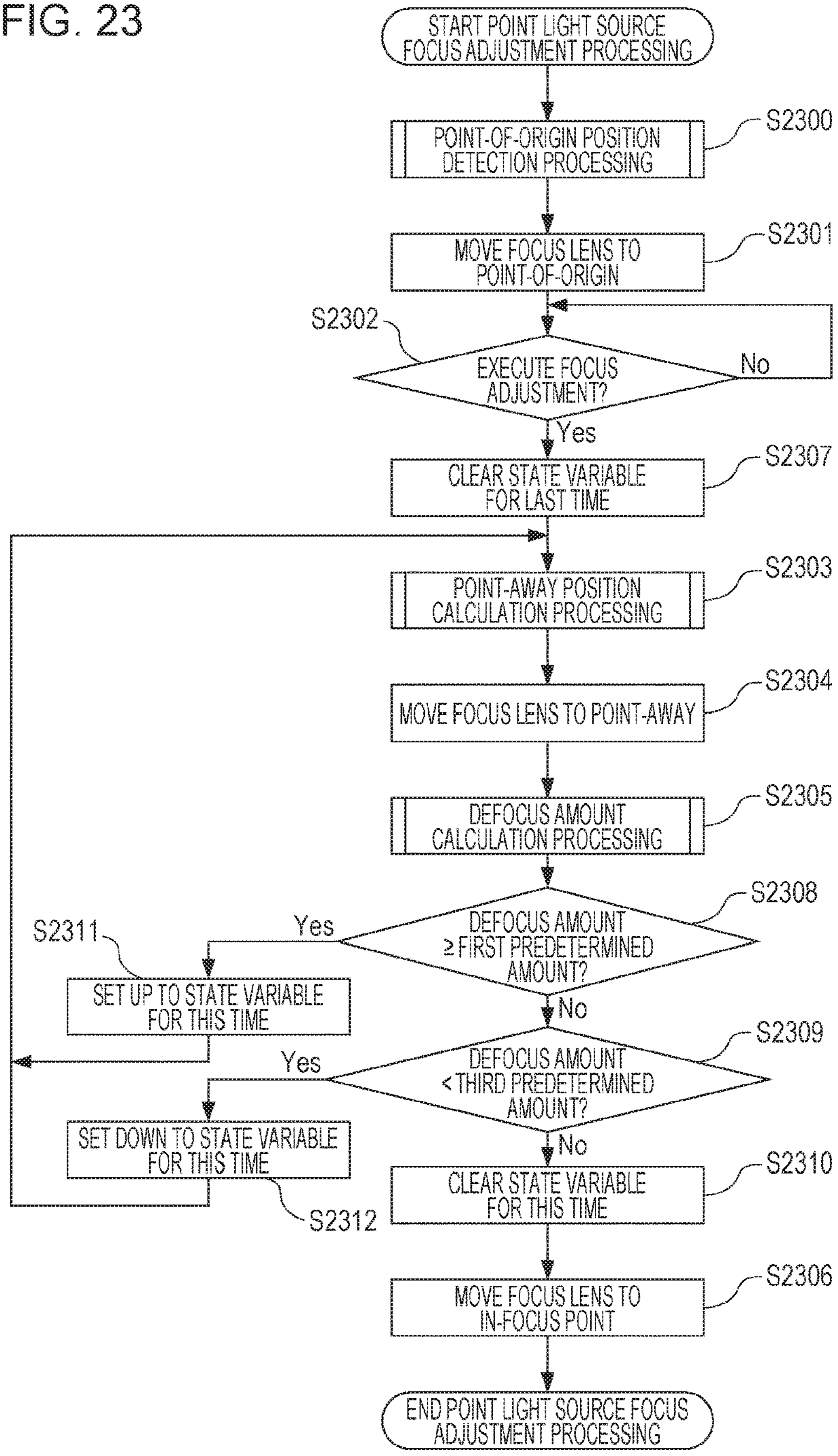
FIG. 23 is a flowchart illustrating focus adjustment processing for a point light source subject.

FIG. 23 is a flowchart for describing the flow of focus adjustment processing for a point light source.

Figure 24:
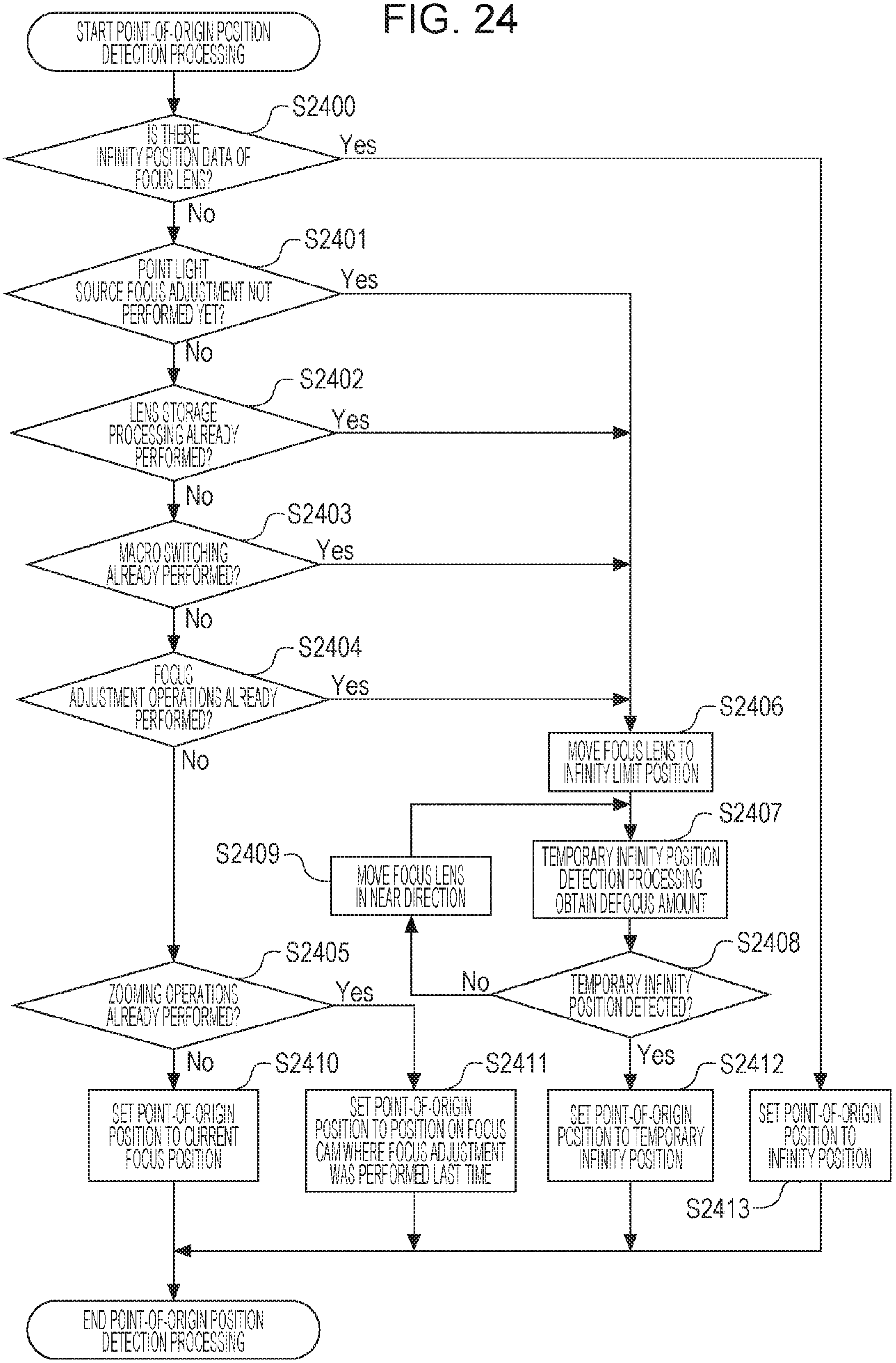
FIG. 24 is a flowchart illustrating point-of-origin calculation processing.

In step S2300, point-of-origin detection processing is performed, and the focus lens 104 is moved to the detected point-of-origin (step S2301). Details of the point-of-origin detection processing will be described with reference to the flowchart in FIG. 24.

In step S2400, determination is made regarding whether infinity position data of the focus lens can be obtained. In a case where infinity position data of the focus lens can be obtained (Yes in step S2400), the infinity position of the focus lens is set to the point-of-origin (step S2413), and the point-of-origin detection processing ends. In a case where infinity position data of the focus lens cannot be obtained (No in step S2400), the flow advances to the subsequent determination.

In step S2401, whether focus adjustment processing of the point light source has already been performed is determined. In a case where focus adjustment processing of the point light source has not been performed yet (Yes in step S2401), the focus lens is moved to the infinity limit position (step S2406), and the defocus amount is obtained (step S2407).

If the defocus amount can be obtained here, detection of the temporary infinity position ends (Yes in step S2408), the temporary infinity position is set as the point-of-origin of the focus lens (step S2412), and the point-of-origin detection processing ends. However, if the temporary infinity position cannot be detected (No in step S2408), the focus lens is moved toward the near side by a predetermined amount (step S2409), and the flow returns to the temporary infinity position detection processing (step S2407) and processing is repeated.

In a case where focusing processing of the point light source has already been performed (No in step S2401), the flow advances to the subsequent determination.

In step S2402, determination is made regarding whether or not lens storage processing has been performed. In a case where lens storage processing has been performed (Yes in step S2402), the flow advances to the processing of step S2406 and thereafter, described above. In a case where lens storage processing has not been performed (No in step S2402), the flow advances to the subsequent determination. In step S2403, determination is made regarding whether macro switching operations of the lens have already been performed. In a case where macro switching operations of the lens has already been performed (Yes in step S2403), the flow advances to the above-described processing of step S2406 and thereafter.

In a case where macro switching operations of the lens has not been performed yet (No in step S2403), the flow advances to the subsequent determination. In step S2404, determination is made whether operations have been performed that would change the focus position, such as AF, MF, moving to a preset focus position, or the like. In a case where an operation that would change the focus position has been performed (Yes in step S2404), the flow advances to the above-described processing of step S2406 and thereafter. In a case where an operation that would change the focus position has not been performed (No in step S2404), the flow advances to the subsequent determination.

In step S2405, determination is made whether zooming operations have already been performed. In a case where no zooming operation has been performed (No in step S2405), the focus position detected in the already-performed point light source focusing processing is set to the point-of-origin (step S2410), and the point-of-origin detection processing ends. In a case where a zooming operation has already been performed (Yes in step S2405), the subject distance for the focus position detected in the already-performed point light source focusing processing is calculated. A position cooperatively zoomed to, by following the focus cam data equivalent to the subject distance, is set to the point-of-origin (step S2411), and the point-of-origin detection processing ends.

Returning to FIG. 23, whether or not there has been an execution instruction for focus adjustment is determined in step S2302. In a case where there has been no execution instruction for focus adjustment (No in step S2302), monitoring is continued until there is an execution instruction. In a case where there has been an execution instruction for focus adjustment (Yes in step S2302), the state variable for last time is cleared in the subsequent step S2307. Now, a state variable is a variable that stores a state regarding whether the defocus amount calculated at a later-described point-away is larger or smaller than a predetermined value. A state variable from the previous time is, in a case of having narrowed the defocus amount to a desired amount, storing the previous state of the state variable, in order to use the state from the previous time. The flow then advances to point-away calculation processing which is the subsequent processing (step S2303).

Figure 10:
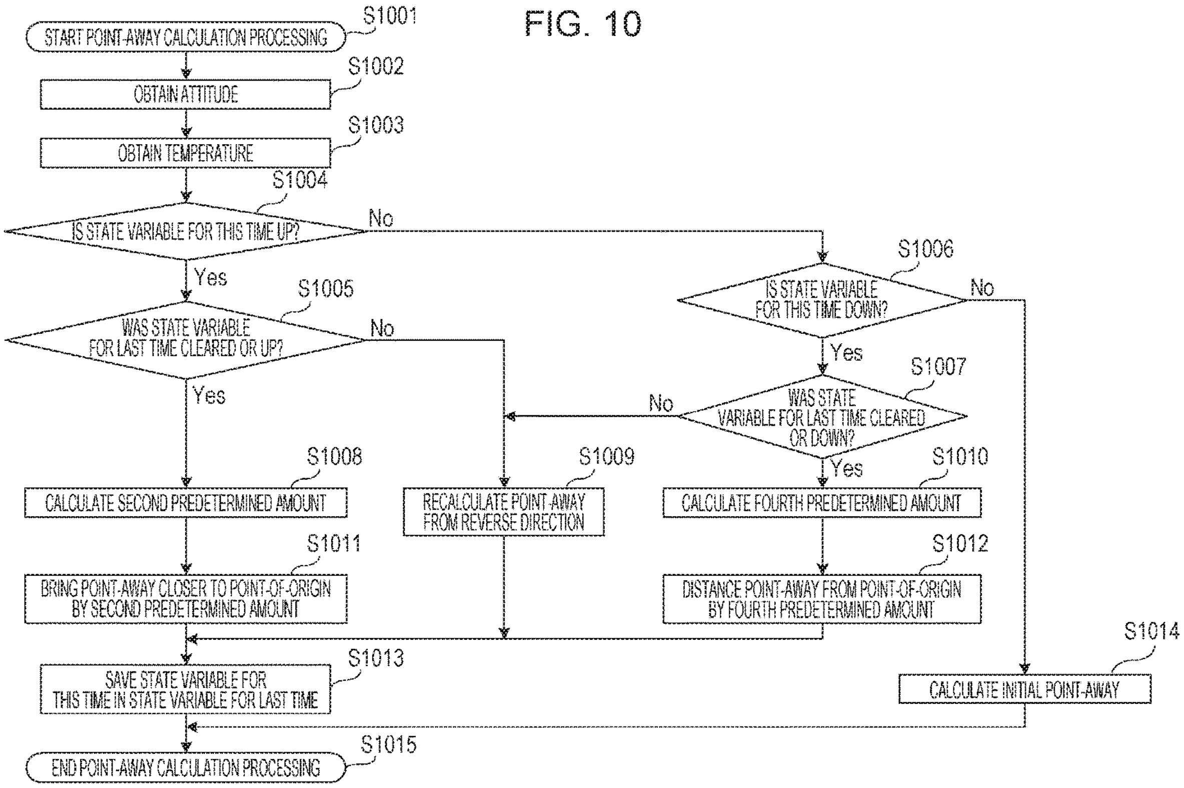
FIG. 10 is a flowchart illustrating point-away calculation processing.

The details of point-away calculation processing are the same as the flowchart in FIG. 10, so description will be omitted.

Returning to FIG. 23, the focus lens 104 is driven to the point-away calculated in step S2303 (step S2304). Defocus amount calculation processing is then performed (step S2305).

Figure 11:
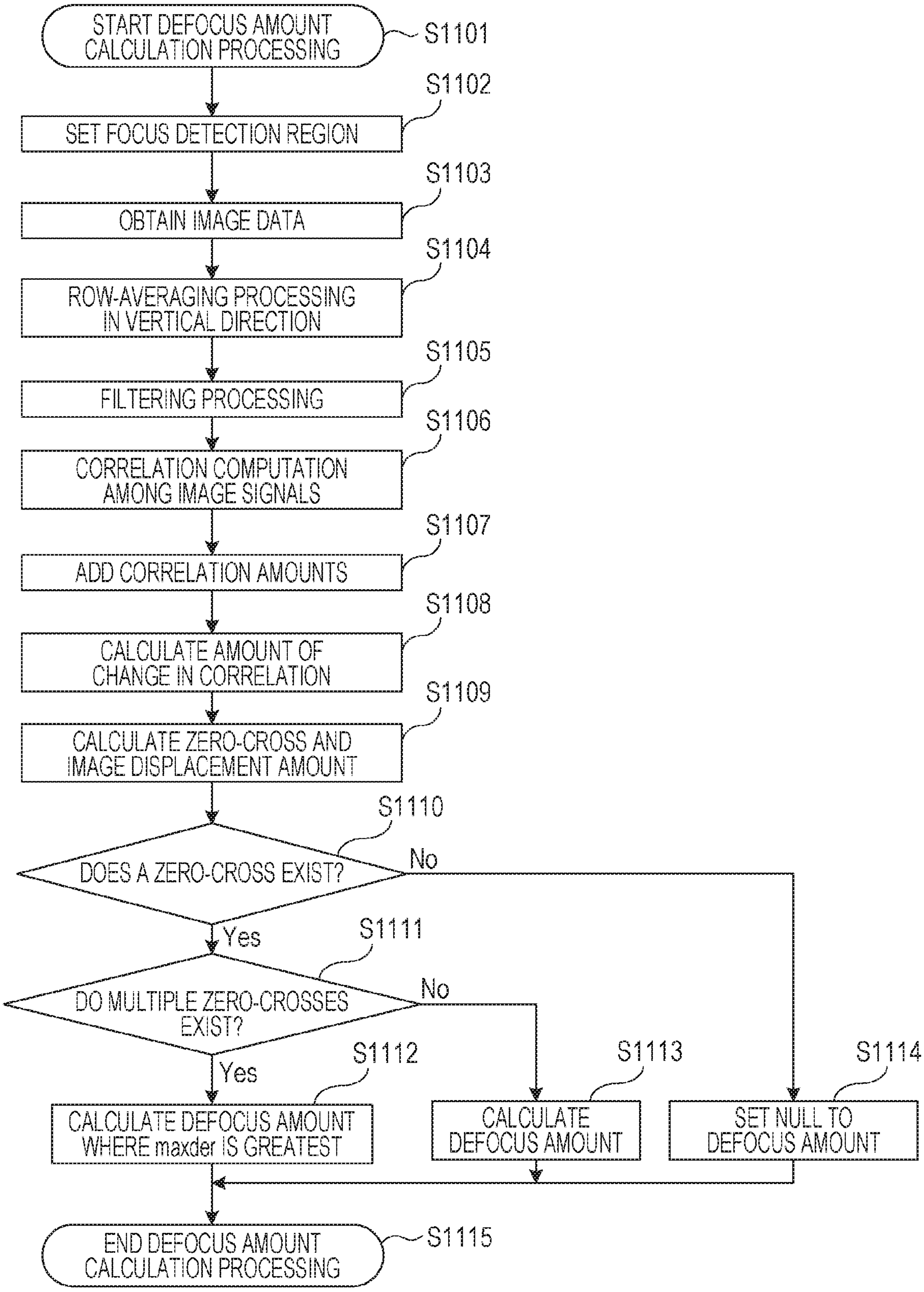
FIG. 11 is a flowchart illustrating defocus amount calculation processing.

The details of defocus amount calculation processing are the same as the flowchart in FIG. 11, so description will be omitted.

Returning to FIG. 3, in step S2308, the defocus amount calculated in step S2305 is compared with the first predetermined amount. In a case where the defocus amount is the first predetermined amount or greater, UP is set to the state variable for this time in step S2311. Thereafter, the point-away calculation processing of step S2303 is performed again. In a case where the defocus amount is smaller than the first predetermined amount, the defocus amount is compared with the third predetermined amount in step S2309. In a case where the defocus amount is smaller than the third predetermined amount, DOWN is set to the state variable for this time in step S2312. Thereafter, the point-away calculation processing of step S2303 is performed again.

In step S2304, the focus lens 104 is driven to the point-away recalculated in step S2303. The defocus amount is then recalculated in step S2305. In a case where the calculated defocus amount is smaller than the first predetermined amount and equal to or greater than the third predetermined amount, or is NULL, the state variable for this time is cleared in step S2310.

The focus position is detected based on the defocus amount calculated by the defocus amount calculation processing (step S2305), the focus lens 104 is moved to the focus position (step S2306), and the focusing processing for the point light source ends.

As described above, even if of the infinity position of the focus lens of the imaging apparatus cannot be obtained, imaging plane phase difference AF is preformed with a dim pint light source as a subject in the present embodiment. Description has been made regarding a shooting sequence enabling the infinity position of the focus lens to be detected with high accuracy while reducing the focus detection time when doing so.

Description has been made in the present embodiment regarding focus detection of a dim point light subject at the point-away alone, without detecting the personal authentication at the point-of-origin position. However, in a case where a point light source subject large enough to obtain sufficient focus detection accuracy for detecting the defocus amount at the point-of-origin is included, the focus position may be detected at the point-of-origin.

Also, while description has been made that the defocus amount is detected at the infinity limit end of the focus lens, and a temporary infinity position is detected, but in a case where judgment is made from the correlation computation results that reliability is high, the position may be taken as the focus position instead of a temporary infinity position, and subsequent processing may be omitted. Further, it is needless to say that the infinity-focus-detectable range may be set to a desired range by focal length, number of pixels of the image sensor, the brightness of the attached lens, and so forth, not just the brightness or size of the point light source.

Fourth Embodiment

In a fourth embodiment, whether or not a subject exists is determined in accordance with luminance information of a focus detection region in a state where the focus lens is at a position distanced from a reference focus position by a predetermined depth, and the defocus amount of the focus detection region where a subject exists is used. Note that the configuration of the digital camera, method of calculating the defocus amount in phase difference AF, and so forth, are the same as in the first embodiment, so description will be omitted.

FIG. 25A illustrates an example of 25 frames (5×5 frames) being set as focus detection regions. No. 1 large frame at the upper left through No. 25 large frame at the lower right have been set. Non-detection regions (dark portions) are situated between the large frames, and the defocus amount of subjects in the non-detection regions cannot be calculated. One pair of image signals (called A-image and B-image) for focus detection are obtained from the imaging device 105, with regard to an optional large frame. The obtained pair of signals are subjected to row averaging in the vertical direction, to reduce the effects of signal noise. Next, filtering processing to extract signal components of a predefined frequency range from the vertically-averaged signals is performed. Next, the correlation is computed between image signals subjected to filtering processing (also called correlation computation).

FIG. 25B illustrates a case where there is a large bright star in a large frame. For example, in a case where there is a star with a small number of visual magnitude within a large frame, the luminance value of the image signals is high, and is not lost in dark portions other than the star even after row-averaging in vertical direction. As a result, correlation of the start image can be precisely calculated.

FIG. 25C illustrates a case where there are small dim stars in a large frame. For example, in a case where there is a star with a large number of visual magnitude within a large frame, the luminance value of the image signals is low, and may be lost in dark portions other than the stars after row-averaging in the vertical direction. As a result, correlation of the start image cannot be precisely calculated.

Accordingly, the large frame is segmented in the vertical direction into strips, as illustrated in FIG. 25D. For example, a large frame is segmented into seven small frames, called No. 1 small frame through No. 7 small frame. The fact that the small dim starts in No. 3 small frame and No. 6 small frame is determined from the luminance information of the small frames, and in the small frames where stars exists, the stars are not lost in dark portions other than the stars even after row-averaging in the vertical direction, due to the effects of segmenting.

Next, an example demonstrating how focus detection computation can be performed on small dim stars due to the effects of segmenting, will be described by way of specific numerical values. FIG. 26A illustrates the peak-to-bottom differences of specific luminance values of the A-image and B-image in the large frame corresponding to FIG. 25C, and the defocus amount of the large frame. FIG. 26B illustrates the peak-to-bottom differences of specific luminance values of the A-image and B-image in the seven segmented small frames corresponding to FIG. 25D, and the defocus amount of the large frame. Looking at the peak-to-bottom differences of luminance values of the A-image and B-image in the small frames in FIG. 26B, the values of No. 3 small frame and No. 6 small frame where there are small dim stars are higher than in the other small frames.

Accordingly, small frames with stars can be detected by setting the threshold value to 500, for example, and 1.0, which is the average of the defocus amounts 1.02 and 0.98 of the No. 3 small frame and No. 6 small frame, is the defocus amount of the stars present in the large frame. However, in FIG. 26A, the rows with stars are lost in dark portions other than the stars due to the effects of row-averaging, so correlation of the start image cannot be precisely calculated.

Figure 27A:
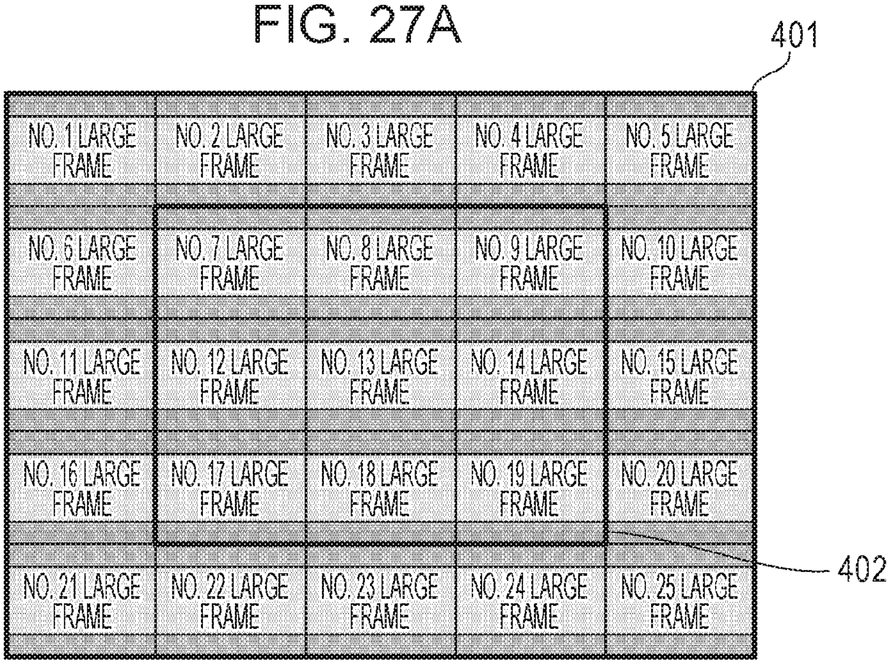
FIGS. 27A through 27C are diagrams illustrating setting examples of focus detection regions.
Figure 27B:
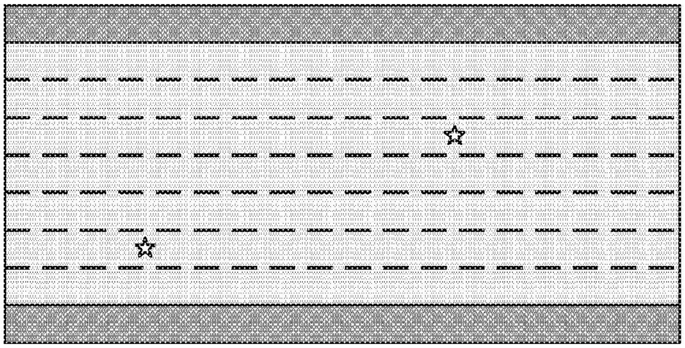
Figure 27C:
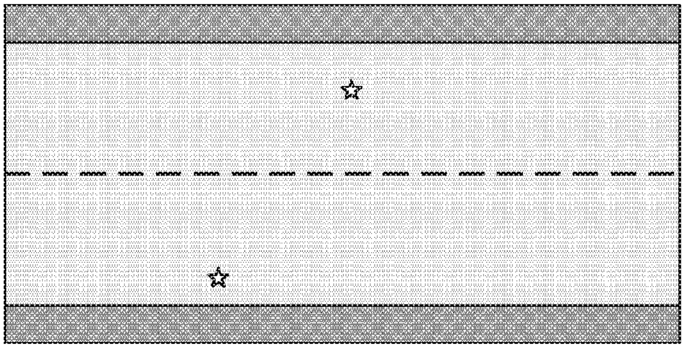

Next, an arrangement of changing the number of segments in accordance with the large frame will be described. FIG. 27A has 25 frames (5×5 frames) set as focus detection regions, in the same way as FIG. 25A. An outer frame 401 is visible to the photographer, but the boundaries of the large frames, and a non-detection region are not. Generally, photographers will often situate stars, which are the subjects, within a frame 402 at the middle of the screen. Accordingly, the load of correlation computation can be reduced by increasing the number of segments at the middle of the screen as illustrated in FIG. 27B, while reducing the number of segments at the peripheral portions of the screen, as illustrated in FIG. 27C.

Figure 28A:
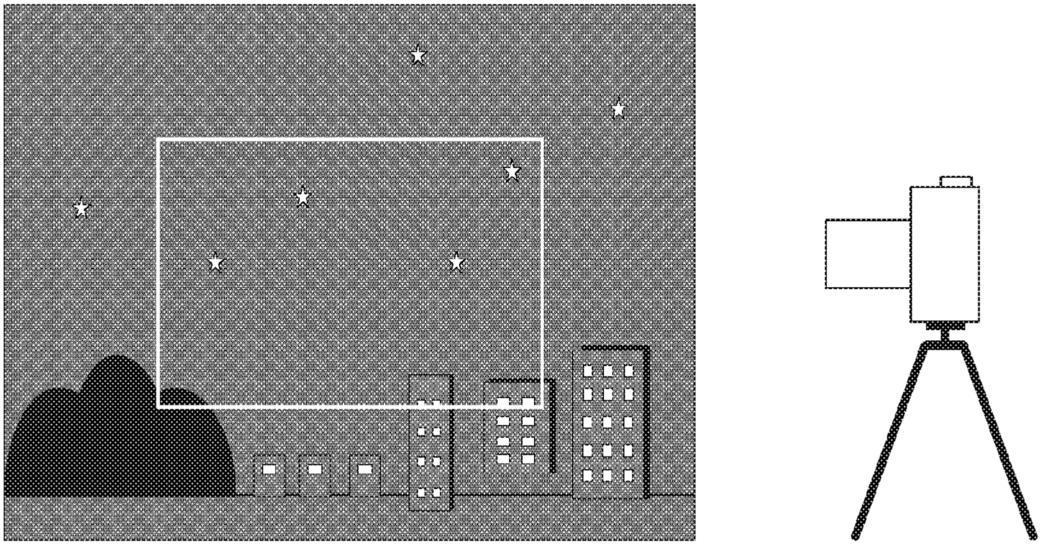
FIGS. 28A and 28B are diagrams illustrating the relation between the attitude of the imaging apparatus and the scene.

FIG. 28A illustrates a composition shot in a state with the imaging apparatus directed near the horizontal direction. City lights often enter the frame when the imaging apparatus is directed near the horizontal direction, and bright stars are relatively dim in comparison, so detection accuracy may drop. Such cases are handled by increasing the number of segments of large frames when near the horizontal direction, thereby suppressing deterioration of detection accuracy.

Figure 28B:
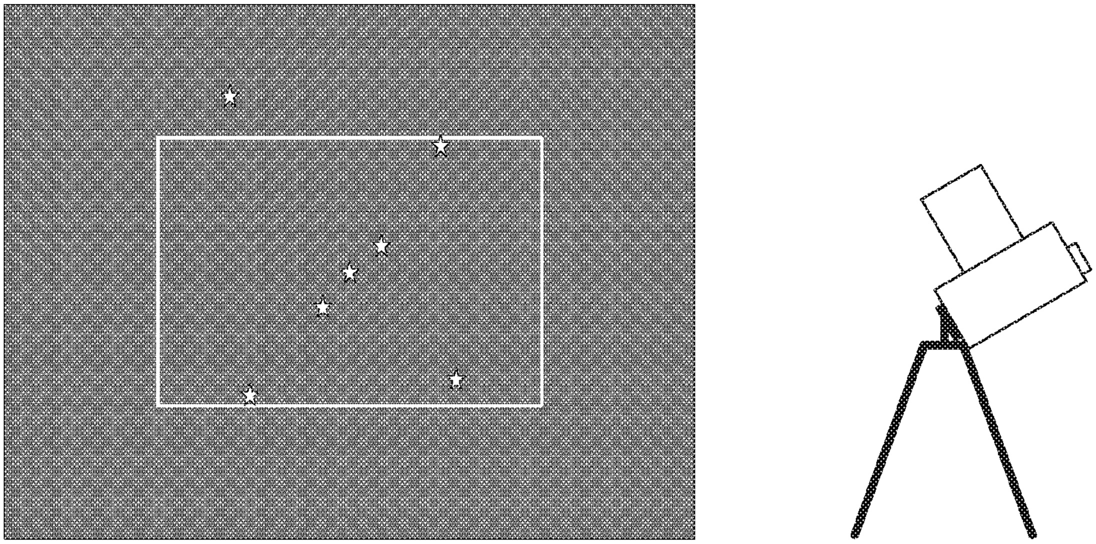

FIG. 28B illustrates a composition shot in a state with the imaging apparatus directed near the zenith direction. City lights seldom enter the frame when the imaging apparatus is directed near the zenith direction, and starlight can be accurately detected. Accordingly, the number of segments of large frames when near the zenith direction is reduced, thereby reducing the load of correlation computation.

The luminance deviation percentage calculating unit 135 calculates the deviation percentage for the peak-to-bottom differences of luminance of the image signals (A-image and B-image). The deviation percentage indicates how different the luminances of the A-image and B-image are from each other.

Figure 29:
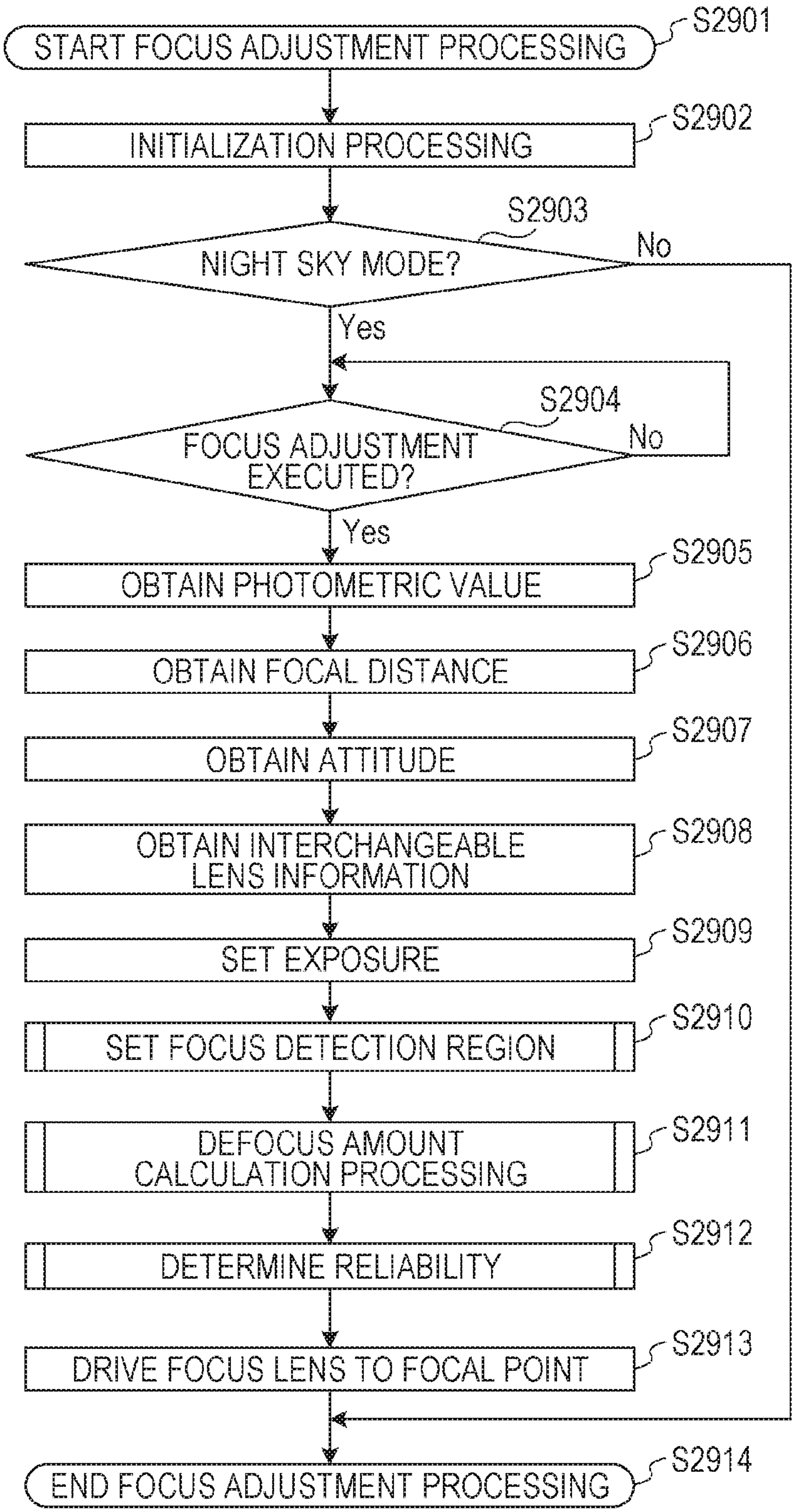
FIG. 29 is a flowchart illustrating focus adjustment processing.

FIG. 29 is a flowchart describing focusing processing. The focusing processing starts in step S2901. Initialization processing is performed in step S2902, and initialization in general, such as initialization of variable used by the imaging apparatus and so forth, being performed. In step S2903, whether or not the shooting mode is night sky mode is determined. In a case where the user has selected the night sky mode as the shooting mode using the operating unit 116, the flow advances to the subsequent step S2904, and determination is made regarding whether or not the user has performed focusing in the night sky shooting mode using the operating unit 116. The point-of-origin adjusted for each individual imaging apparatus can shift due to temperature change, attitude change, and change over time, as described earlier.

Accordingly, the user may execute focus adjustment every now and then while shooting stars, that are at an almost unchanged distance from the imaging apparatus. In a case where focus adjustment is not performed, monitoring is performed until focus adjustment is performed. In step S2905, the subject and scene luminance detected from the luminance signal calculating unit 125 is obtained as photometric values.

In step S2906, the zoom control unit 132 obtains the focal length from the currently-controlled zoom lens position. In step S2907, the attitude of the imaging apparatus is obtained by the attitude detecting unit 117. As a specific example, whether imaging apparatus is directed in the horizontal direction, or directed toward the zenith direction which is upwards, can be obtained by detecting the tilt angle of the imaging apparatus by an acceleration sensor.

In step S2908, the interchangeable lens information obtaining unit 134 obtains information such as focal length, F-number, etc., that is optical properties information, for the lens unit. In step S2909, exposure settings regarding the photometric value are made. The exposure settings here are specialized for focusing the night sky mode. Unlike exposure in normal shooting, exposure appropriate for calculating defocus amount is set. Accordingly, overexposure (pixel saturation) can occur during focusing in the night sky mode, at subject brightnesses where overexposure (pixel saturation) would not occur in normal shooting.

Step S2910 is processing for setting focus detection regions. Detailed description will be made with reference to the flowcharts in FIGS. 30-1 through 30-6. First, a case of performing segmentation of focus detection regions at all times when in the night sky mode will be described with reference to FIG. 30-1. The setting of focus detection regions starts in step S3001. Step S3002 starts a loop processing for each large frame, and the loop processing ends in step S3004. In the case of the focus detection regions in FIG. 25A, the loop is performed 25 times, which is the same as the number of large frames, but the number of large frames may be optional.

In step S3003, the large frame is segmented into seven small frames in the vertical direction. Although the number of segments is described as being seven here, the same as the example in FIG. 25D, the number may be optional, as long as the number of segments does not exceed the number of pixels in the vertical direction. Setting of focus detection regions ends in step S3005.

Next, a case of performing segmentation of focus detection regions when the photometric values of the scene are a predetermined value or higher will be described with reference to FIG. 30-2. Photometric values of a predetermined value or higher means that the scene is bright, and in a case that the effect of city lights is great, the detection accuracy of stars that are small and dim tends to deteriorate. In step S3006, determination is made regarding whether or not a photometric value obtained beforehand is a predetermined value or higher.

If the predetermined value or higher, determination is made in step S3007 regarding whether or not the current number of segments is less than seven. If less than seven, segmentation into seven is performed in step S3003, and if seven or more, the number of segments is changed so as to be increased in step S3008. A value representing the increase in count of segments when increasing the number of segments is a value decided beforehand as a parameter.

Next, a case of performing segmentation of focus detection regions when the focal length of the zoom lens is below a predetermined value will be described with reference to FIG. 30-3. When the focal length of the zoom lens is below a predetermined value, this indicates that the field angle is at the wide-angle side, where detection accuracy tends to drop since the stars appear smaller.

In step S3009, determination is made regarding whether or not the focal length obtained beforehand is smaller than a predetermined value. The processing following determination is the same as with the case of the photometric value described above.

Next, a case of performing segmentation of focus detection regions when the attitude of the imaging apparatus is near the horizontal direction will be described with reference to FIG. 30-4. When the attitude of the imaging apparatus is near the horizontal direction, the detection accuracy of stars that are dim and small tends to drop, since there is a higher possibility that there are city lights at the lower portion of the image, as compared with near the zenith direction.

In step S3010, determination is made regarding whether or not the attitude of the imaging apparatus obtained beforehand is near the horizontal direction. The processing following determination is the same as with the case of the photometric value described above.

Next, a case of changing the number of segments of focus detection regions between the middle portion of the field angle and the peripheral portion will be described with reference to FIG. 30-5. The photographer generally will situate the starts which are the subject at the middle portion of the field angle. Accordingly, segmentation into seven is performed in step S3011 in a case where the Nos. of the large frames are 7, 8, 9, 12, 13, 14, 17, 18, and 19. As for the other large frames, segmentation into two is performed in step S3012. Now, this segmentation into two is not restrictive, and may be any value as long as smaller than seven. Also, the Nos. of the large frames listed above are only exemplary, and may be just No. 13, for example. The processing following determination is the same as with the case of the photometric value described above.

Next, a case of performing segmentation of focus detection regions when the f-number, which is one of optical information of the exchangeable lens, is a predetermined value or higher, will be described with reference to FIG. 30-6. An f-number of a predetermined value or higher means that the lens is dark, and the detection accuracy of stars tends to deteriorate since the amount of light that the lens can take in is small. In step S3013, determination is made regarding whether or not the f-number of the exchangeable lens is equal to or above a predetermined value. The processing following determination is the same as with the case of the photometric value described above.

Note that the defocus amount calculation in step S2911 is the steps in FIG. 11 with step S1102 excluded, so description will be omitted.

Figure 31:
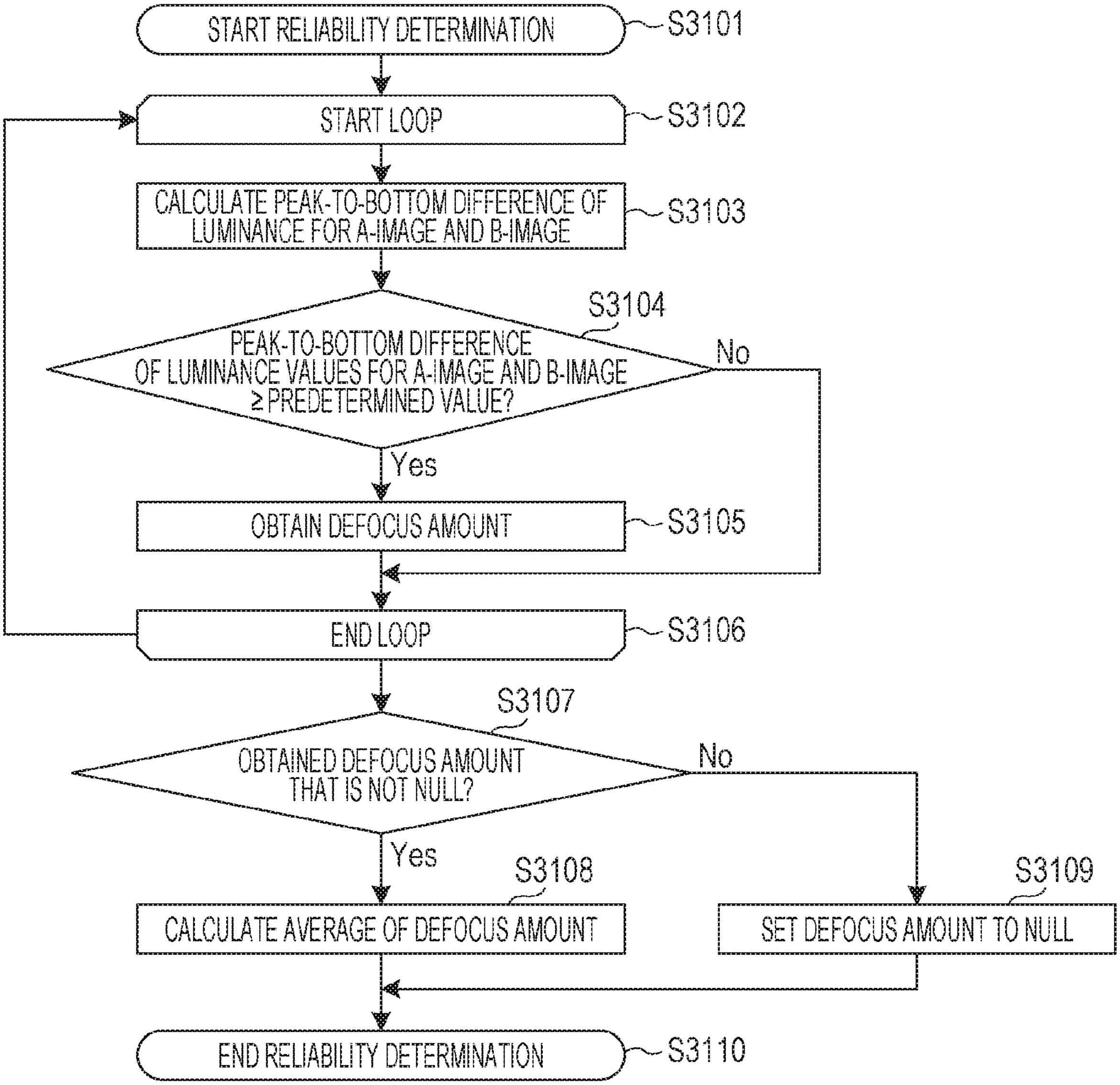
FIG. 31 is a flowchart illustrating reliability determination processing.

The reliability determination in step S2912 will be described with reference to the flowchart in FIG. 31.

The reliability determination starts in step S3101. Steps S3102 and S3106 are the start and end of a loop. The number of times for the loop is the same as the number of times in the defocus amount calculation processing. In step S3103, the peak value and bottom value of luminance values of the A-image and B-image data are obtained, and peak-to-bottom difference is calculated.

In step S3104, the peak-to-bottom difference of luminance value calculated in step S3103 is compared with a predetermined value. In a case where the peak-to-bottom difference is the predetermined value or greater, this means that a star has been detected in that frame. The defocus amount calculated for this frame beforehand is obtained in step S3105. Comparison is performed regarding all frames, and whether or not at least one defocus amount that is not NULL has been obtained, is determined in step S3107.

In a case where defocus amounts have been obtained, in step S3108 the average value of these defocus amounts is calculated, and taken as a final defocus amount. In a case where a defocus amount cannot be obtained, the final defocus amount is set to NULL in step S3109. The reliability determination ends in step S3110.

In step S2913, the focus lens 104 is moved by the final defocus amount, i.e., to the in-focus point. The focusing processing ends in step S2914.

According to the present embodiment, highly-accurate focusing can be performed on minute point light sources in phase difference AF.

Fifth Embodiment

In a fifth embodiment, after performing first defocus amount calculation, the focus detection region is moved, in a case where there is a non-detection region between multiple focus detection regions in a predetermined mode. Second defocus amount calculation is performed, and the average value of the first and second defocus amounts is taken as the defocus amount of the subject. Note that the configuration of the digital camera, method of calculating the defocus amount in phase difference AF, and so forth, are the same as in the first embodiment, so description will be omitted.

Figure 32A:
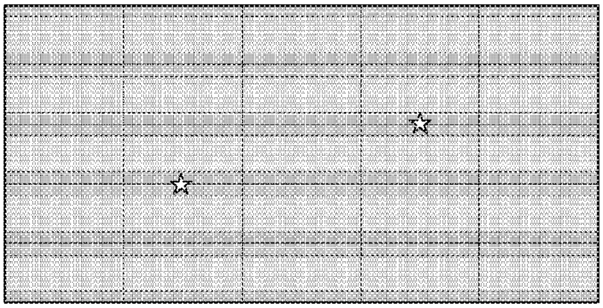
FIGS. 32A and 32B are diagrams (part 1) illustrating focus detection regions according to a fifth embodiment.

FIG. 32A illustrates an example of 25 frames (5×5 frames) having been set as focus detection regions. No. 1 large frame at the upper left through No. 25 large frame at the lower right have been set. Non-detection regions (dark portions) are situated between the large frames, and the defocus amount of subjects in the non-detection regions cannot be calculated. An outer frame of the large frames is visible to the photographer, but the boundaries of the large frames, and the non-detection regions are not. Although the non-detection regions are arrayed in the horizontal direction in FIG. 32A, there may be cases where the non-detection regions are arrayed in the vertical direction.

In a case with a normal subject (person, building, vehicle, etc.), there are no effects of the non-detection regions between the large frames, but in a case where the subjects are minute and the absolute number thereof is small, the subject may be in a non-detection region, depending on the composition. As an example, there are cases where focus cannot be adjusted in a case where here are only a few dim stars visible in the night sky.

Figure 32B:
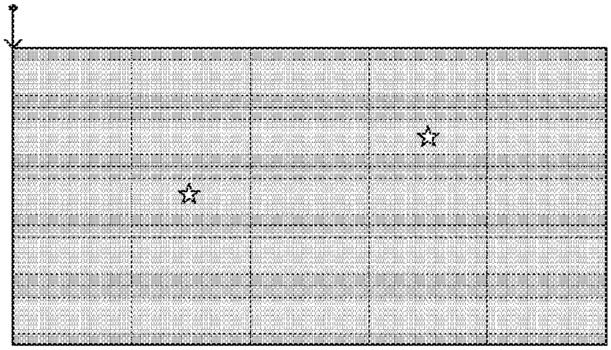

In order to deal with this, FIG. 32B illustrates an example where the focus detection regions have been shifted downwards. Shifting by an amount equivalent to the non-detection regions results in stars that were in the non-detection regions being relocated into detection regions. Accordingly, stars that could not be detected in the first focusing can be detected after shifting. The first detection will be referred to as "first round", and the subsequent as "second round").

In the second round of detection, the pair of image signals (A-image and B-image) are obtained from the imaging device 105 for focus detection, with regard to optional large frames. The obtained pair of signals are subjected to row averaging in the vertical direction, to reduce the effects of signal noise.

Next, filtering processing to extract signal components of a predefined frequency range from the vertically-averaged signals is performed. Subsequently, the correlation is computed between image signals subjected to filtering processing (also called correlation computation).

Figure 33A:
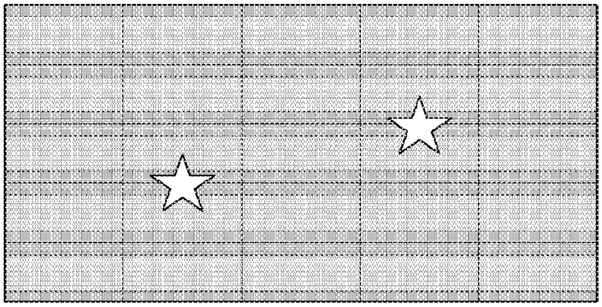
FIGS. 33A and 33B are diagrams (part 2) illustrating focus detection regions according to the fifth embodiment.

Next, description will be made regarding a case where the focal length is at the telephoto side. FIG. 33A illustrates an example of 25 frames (5×5 frames) having been set as focus detection regions, the same as in FIG. 32A, with non-detection regions therebetween. The difference with FIG. 32A is that zooming to the telephoto side has been performed.

Figure 33B:
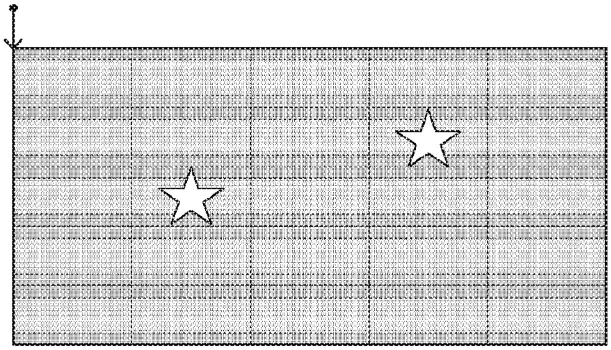

Due to having zoomed to the telephoto side, stars that appeared to be small at the wide-angle side are displayed enlarged, as shown in FIG. 33A. Accordingly, the stars are not lost in the non-detection regions, so even if shifting of the focus detection regions is performed in FIG. 33B, the situation changes little from before shifting. Accordingly, the second round can be omitted to reduce correlation calculation load, when at the telephoto side by a predetermined power or more.

Figures 1, 34:
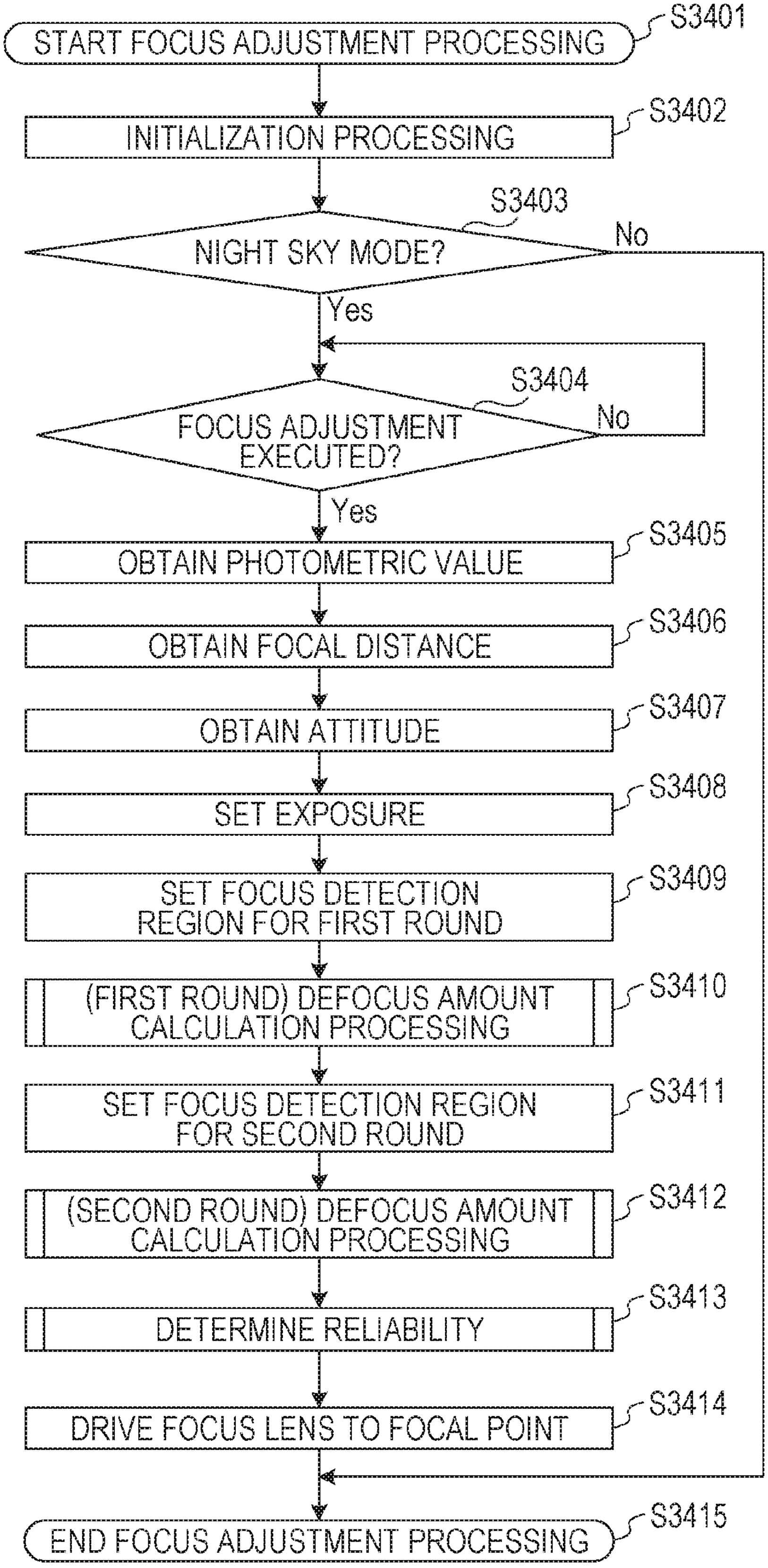
Figures 2, 34:
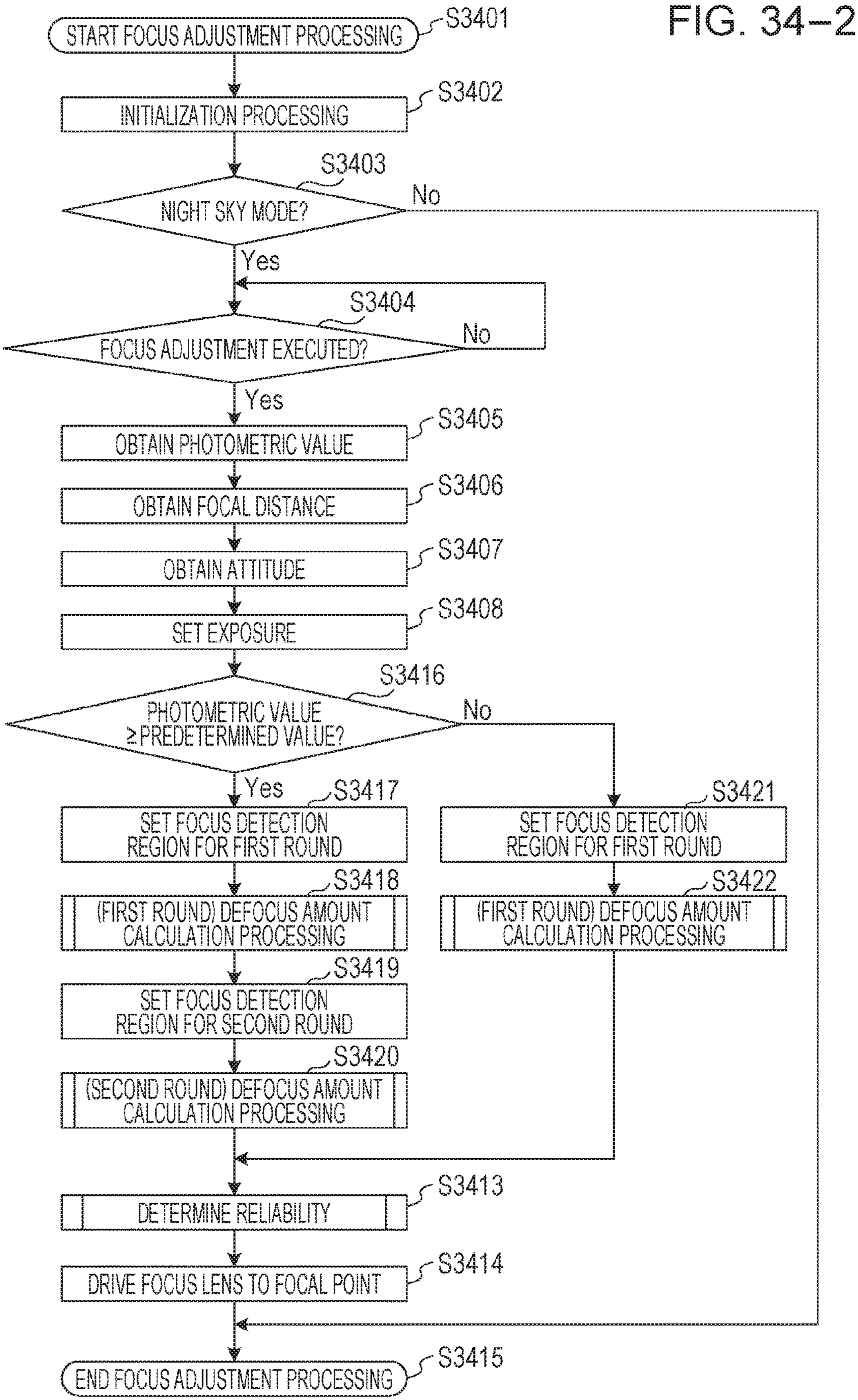
Figures 3, 34:
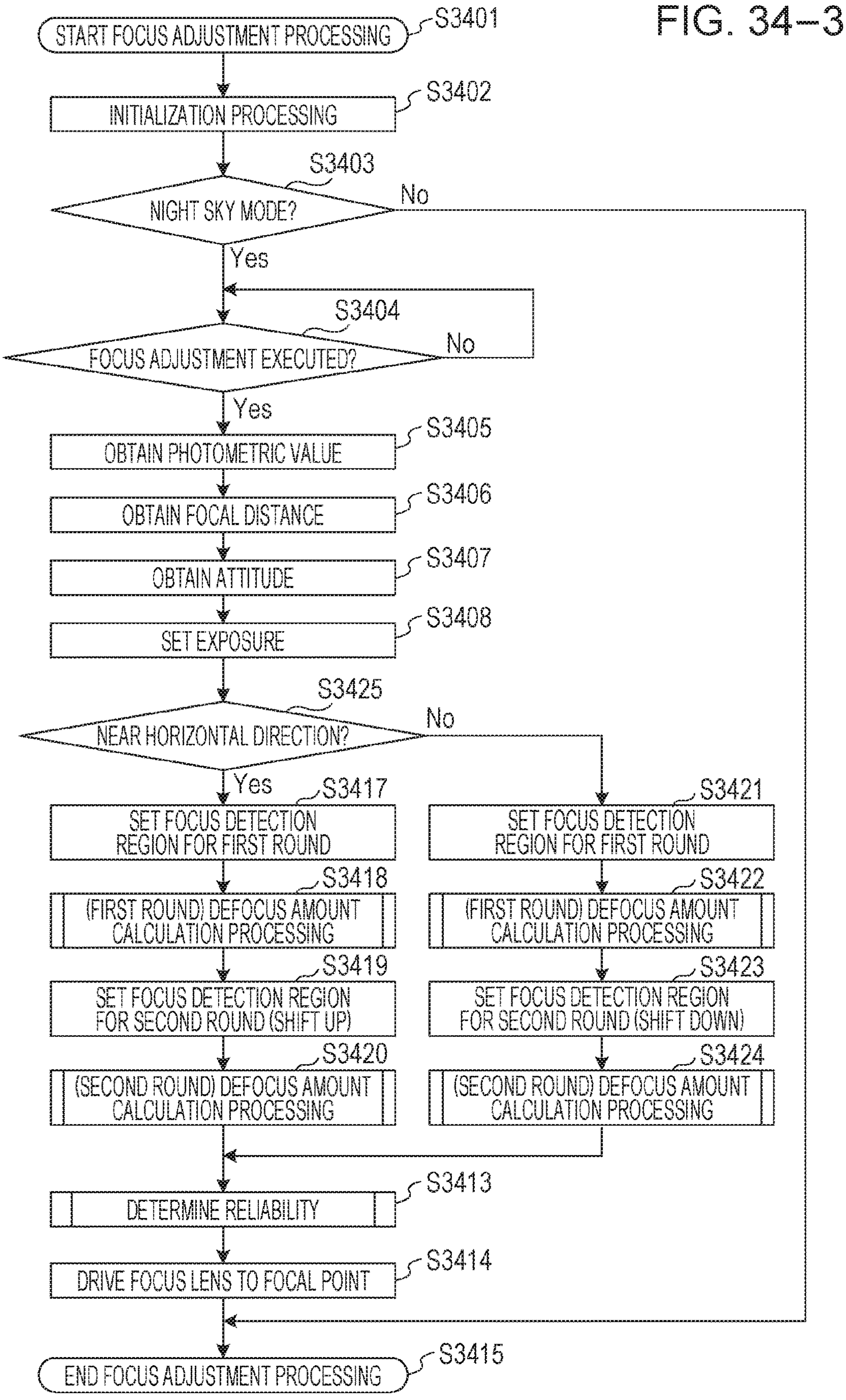

FIGS. 34-1 through 34-3 are flowcharts describing focusing processing according to the present embodiment. FIG. 34-1 is a flowchart for describing a case of moving the focus detection regions at all times when in the night sky shooting mode.

Step S3401 starts the focusing processing. Initialization processing is performed in step S3402, with initialization in general, such as initialization of variable used by the imaging apparatus and so forth, being performed.

In step S3403, whether or not the shooting mode is night sky mode is determined. In a case where the user has selected the night sky mode as the shooting mode using the operating unit 116, the flow advances to the subsequent step S3404, and determination is made regarding whether or not the user has performed focusing in the night sky shooting mode using the operating unit 116. The point-of-origin adjusted for each individual imaging apparatus can shift due to temperature change, attitude change, and change over time, as described earlier. Accordingly, the user may execute focus adjustment every now and then while shooting stars, that are at an almost unchanged distance from the imaging apparatus.

In a case where focus adjustment is not performed, monitoring is performed until focus adjustment is performed. In step S3405, the subject and scene luminance detected from the luminance signal calculating unit 125 is obtained as photometric values. In step S3406, the zoom control unit 132 obtains the focal length from the currently-controlled zoom lens position.

In step S3407, the attitude of the imaging apparatus is obtained by the attitude detecting unit 117. As a specific example, whether the infinity-distance subject is directed in the horizontal direction, or directed toward the zenith direction which is upwards, can be obtained by detecting the tilt angle of the imaging apparatus by an acceleration sensor.

In step S3408, exposure settings regarding the photometric value are made. The exposure settings here are specialized for focusing in the night sky mode. Unlike exposure in normal shooting, exposure appropriate for calculating defocus amount is set. Accordingly, overexposure (pixel saturation) can occur during focusing in the night sky mode, at subject brightnesses where overexposure (pixel saturation) would not occur in normal shooting.

In step S3409, the first round of setting focus detection regions is performed. Step S3410 is the (first round of) defocus amount calculation processing. The defocus amount calculation processing will be described in detail later.

In step S3411, the second round of setting focus detection regions is performed. In the second round, the focus detection regions are shifted in a direction to cover the non-detection regions. Step S3412 is the (second round of) defocus amount calculation processing. This defocus amount calculation processing will also be described in detail later.

Step S3413 is reliability determination. Details of reliability determination will be described later. In step S3414, the focus lens 104 is moved by the final defocus amount, i.e., to the in-focus point. The focusing processing ends in step S3415.

Next, processing of switching between whether or not to perform the second round in accordance with the photometric value of the scene will be described with reference to FIG. 34-2. Steps up to step S3408, and step S3413 and thereafter are the same as in FIG. 34-1, so description will be omitted. Determination is made in step S3416 regarding whether or not the photometric value obtained beforehand is a predetermined value or higher. Photometric values of a predetermined value or higher means that the scene is bright, and in a case that the effect of city lights is great, the detection accuracy of stars that are small and dim tends to deteriorate. Accordingly, if the photometric values of the current scene are a predetermined value or higher, the flow advances to step S3417, and the focus detection regions are moved.

In step S3417, the first round of setting focus detection regions is performed. Step S3418 is the (first round of) defocus amount calculation processing. Next, in step S3419, the second round of setting focus detection regions is performed. At this time, the focus detection regions are shifted in a direction where the non-detection regions of the focus detection regions set in the first round will be detected. Step S3420 is the (second round of) defocus amount calculation processing.

When the photometric values are below a predetermined value, the overall scene is dark, so there tends to be a greater number of stars visible in the screen. If so, cases where stars are present only in the non-detecting regions will be extremely rare. In such situations, only the first round of computation is performed, to reduce the computation load. In step S3421, the first round of setting focus detection regions is performed. Step S3422 is the (first round of) defocus amount calculation processing. Although description has been made in FIG. 34-2 that whether or not to perform the second round is switched in accordance with the photometric values of the scene, an arrangement may be made instead where whether or not to perform the second round is switched in accordance with the focal length. In step S3416, determination is made regarding whether or not a focal length obtained beforehand is smaller than a predetermined value. When the focal length of the zoom lens is below a predetermined value, this indicates that the field angle is at the wide-angle side, where detection accuracy tends to drop since the stars appear smaller. Accordingly, when the focal length is smaller than the predetermined value, the focus detection regions are moved. That is to say, when the focal length is smaller than the predetermined value, the flow advances to step S3417, and if the predetermined value or larger, to step S3421. Step S3417 and thereafter is the same as the description above.

Next, processing of changing the direction of shifting the focus detection regions in accordance with the attitude of the imaging apparatus will be described with reference to FIG. 34-3. Steps up to step S3408, and step S3413 and thereafter are the same as in FIG. 34-1, so description will be omitted.

In step S3425, determination is made regarding whether or not the attitude of the imaging apparatus obtained beforehand is near the horizontal direction. If near the horizontal direction, the first round of setting focus detection regions is performed. Step S3418 is the (first round of) defocus amount calculation processing.

Step S3419 is the second round of setting focus detection regions, where the focus detection regions set in the first round are shifted in an upward direction to cover the non-detection regions. When the attitude of the imaging apparatus is near the horizontal direction, the detection accuracy of stars that are faint and small tends to drop, since city lights often enter the frames. Accordingly, in a case of being near to horizontal, detection of the second round is preferably performed after shifting upwards to avoid the effects of city lights as much as possible. Step S3420 is the (second round of) defocus amount calculation processing. If not near the horizontal direction, the focus detection regions are set in the first round in step S3421.

Step S3422 is the (first round of) defocus amount calculation processing. Step S3423 is the second round of setting focus detection regions, where the focus detection regions set in the first round are shifted in a downward direction to cover the non-detection regions. When the attitude of the imaging apparatus is near the zenith direction, there is less chance of city lights enter the frames, but there is a great chance of an airplane passing through the screen, and starlight may not be able to be detected in a precise manner. Accordingly, in a case of being near to the zenith direction, detection of the second round is preferably performed after shifting downwards to avoid the effects of airplanes as much as possible. Step S3424 is the (second round of) defocus amount calculation processing.

According to the present embodiment, highly-accurate focusing can be performed on minute point light sources in phase difference AF.

Sixth Embodiment

In a sixth embodiment, a threshold value is set for the deviation range with regard to a predetermined mode, and a value obtained by averaging the defocus amount of all focus detection regions where the deviation percentage is below the threshold value is taken as the defocus amount of the subject. Note that the configuration of the digital camera, method of calculating the defocus amount in phase difference AF, and so forth, are the same as in the fourth embodiment, so description will be omitted.

FIG. 35A illustrates an example of 25 frames (5×5 frames) having been set as focus detection regions. No. 1 large frame at the upper left through No. 25 large frame at the lower right have been set. Non-detection regions (dark portions) are situated between the large frames, and the defocus amount of subjects in the non-detection regions cannot be calculated. The pair of image signals (A-image and B-image) are obtained from the imaging device 105 for focus detection, with regard to optional large frames. The obtained pair of signals are subjected to row averaging in the vertical direction, to reduce the effects of signal noise.

Next, filtering processing to extract signal components of a predefined frequency range from the vertically-averaged signals is performed. Subsequently, the correlation computed between image signals subjected to filtering processing (also called correlation computation).

The luminance deviation percentage calculating unit 135 calculates the deviation percentage for the peak-to-bottom differences of luminance of the image signals (A-image and B-image). The deviation percentage indicates how different the luminances of the A-image and B-image are from each other.

$$AvePB = \frac{|PB(A) + PB(B)|}{2} \tag{8}$$

$$\text{deviation rate (\%)} = \frac{|PB(A) - AvePB|}{AvePB} \times 100 \tag{9}$$

In Expression (8), the average value AvePB of the peak-to-bottom difference PB(A) of luminance of the A-image and the peak-to-bottom difference PB(B) of luminance of the B-image is calculated. In Expression (9), the deviation percentage indicating how different the luminance values of the A-image and B-image are from each other is calculated using the average value AvePB calculated by Expression (8).

FIG. 35B is an enlarged view of the No. 12 large frame in FIG. 35A. In the No. 12 large frame, there is an extremely bright star at the upper portion, and a somewhat bright star at the lower portion. FIG. 35C illustrates the relation between the luminance values of stars in FIG. 35B and the deviation percentage thereof.

As one example, the peak-to-bottom difference of luminance of the A-image for the extremely bright star at the upper portion is 2264, and the peak-to-bottom difference of luminance for the B-image is 4015. At this time, the deviation percentage is 27.9%, from Expressions (8) and (9). Conversely, the peak-to-bottom difference of luminance for the A-image regarding the somewhat bright star is 1536, and the peak-to-bottom difference of luminance for the B-image is 1794. At this time, the deviation percentage is 7.7%, from Expressions (8) and (9).

In a case where a star is extremely bright, there may be partial saturation, and there are causes where phase difference is not accurately obtained due to the effects thereof. A threshold value for deviation percentage where there is no effect on phase difference is set as a parameter, and in a case of determining that the deviation percentage is smaller than 15% for example, or that the defocus amount is reliable, the defocus amount at the upper portion of the No. 12 large frames is not used, and the defocus amount at the lower portion is used.

FIG. 36A is a diagram illustrating the relation between the peak-to-bottom difference of luminance of the A-image and B-image in the small frames when a large frame has been segmented into seven small frames, and the deviation percentage thereof. The peak-to-bottom difference is great in the No. 3 small frame and No. 6 small frame as compared to other dark portions, since there are stars in these small frames. In the example, the deviation percentages for the No. 3 small frame and No. 6 small frame are 15.8% and 12.2%, respectively. Conversely, FIG. 36B is a diagram illustrating the relation between the peak-to-bottom difference of luminance of the A-image and B-image in the upper small frame and lower small frame when the large frame in FIG. 36A has been segmented into two small frames, and the deviation percentage thereof. The peak-to-bottom differences of each of the A-image and B-image is averaged due to the effects of dark operations, and are smaller as compared to FIG. 36A. Accordingly, the deviation percentages are smaller, at 9.0% and 7.5%, respectively.

FIG. 37A is a diagram illustrating the relation between the peak-to-bottom difference of luminance of the A-image and B-image in the small frames when a large frame has been segmented into seven small frames, and the deviation percentage thereof. FIG. 37B is a diagram illustrating the relation between the peak-to-bottom difference of luminance of the A-image and B-image when FIG. 37A has been zoomed to the telephoto side. The star appears large in FIG. 37B in comparison with FIG. 37A, so stars or the like appearing extremely bright may be partially saturate. In this example, the star is in the No. 3 small frame, No. 4 small frame, and No. 5 small frame, with the deviation percentage being 31.8%, which is particularly high.

Extremely bright stars tend to partially saturate at the telephoto side, so there is a need to set the threshold value for the deviation percentage of luminance value to a greater value as compared with the wide-angle side. However, the No. 4 small frame is thought to be low in reliability of defocus amount due to the effects of saturation, and accordingly the No. 4 small frame is excluded, so a threshold value around 20% is appropriate.

Figures 1, 30:
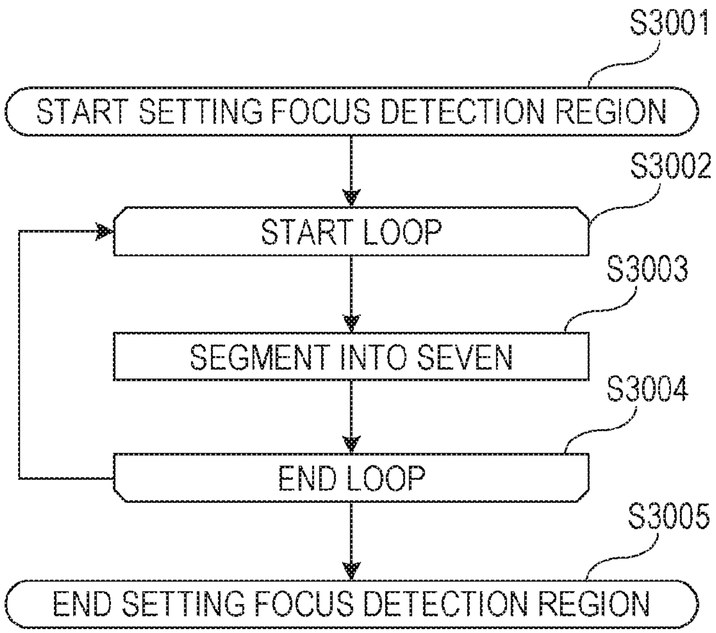
Figures 2, 30:
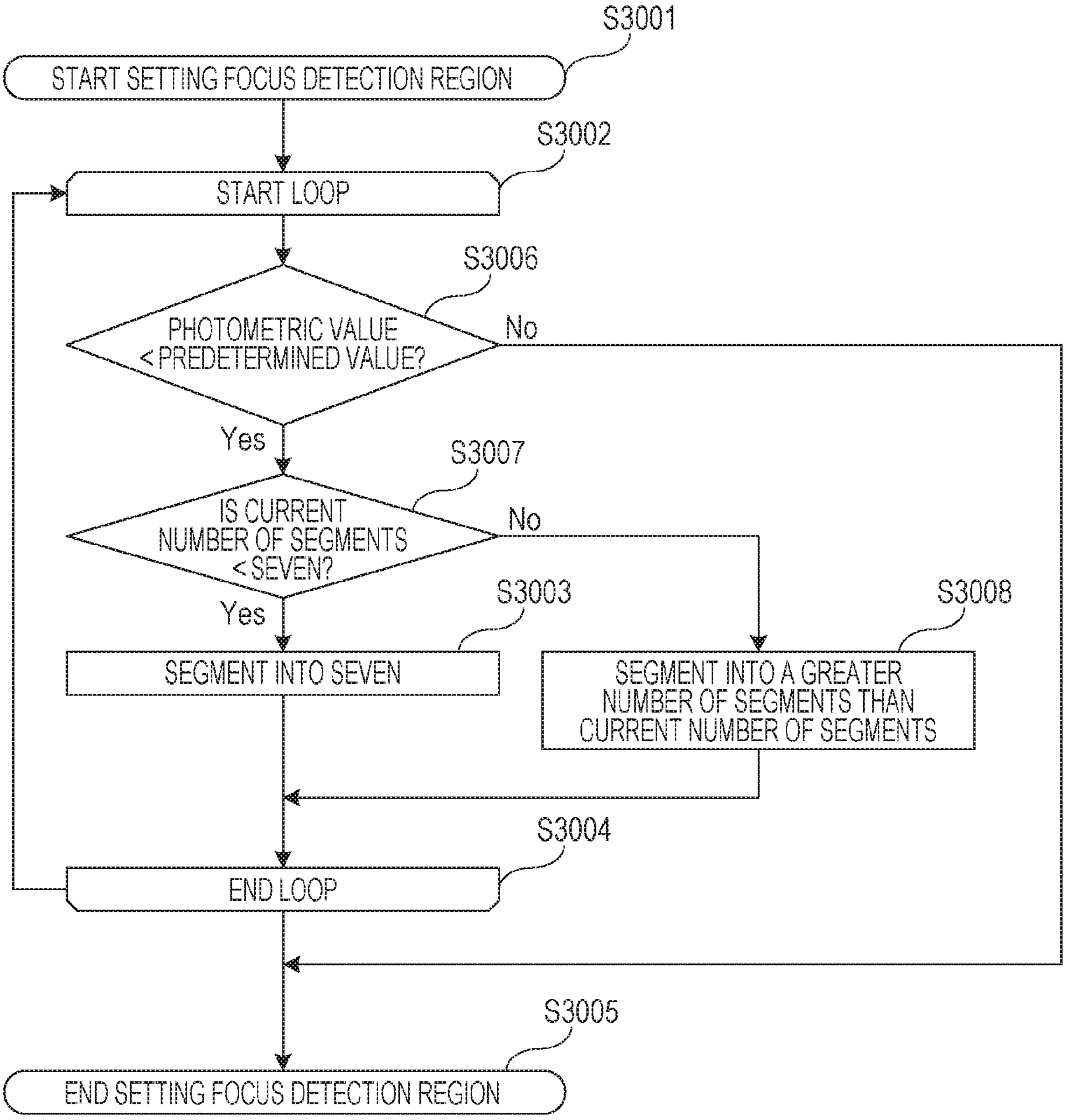
Figures 3, 30:
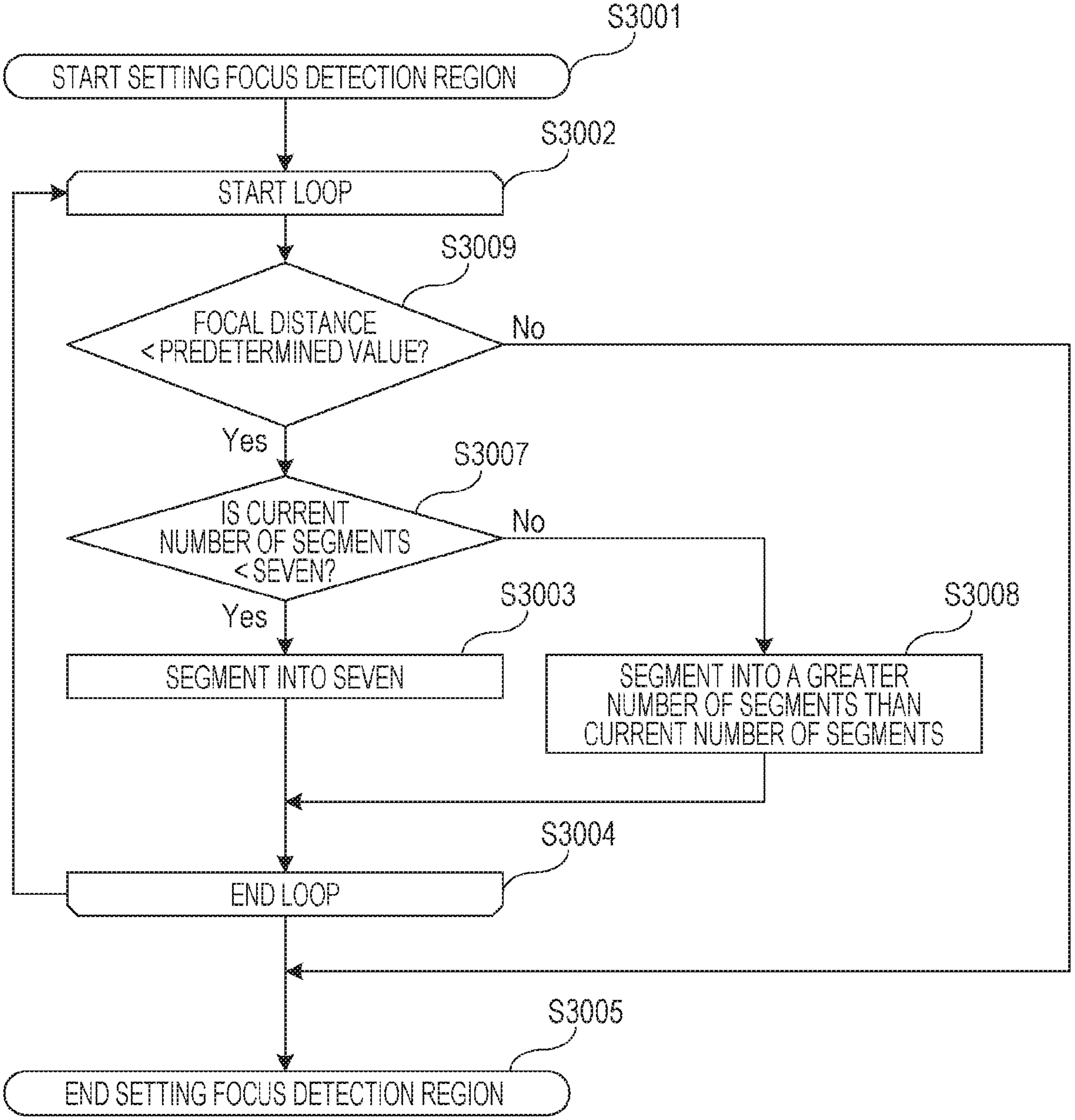
Figures 4, 30:
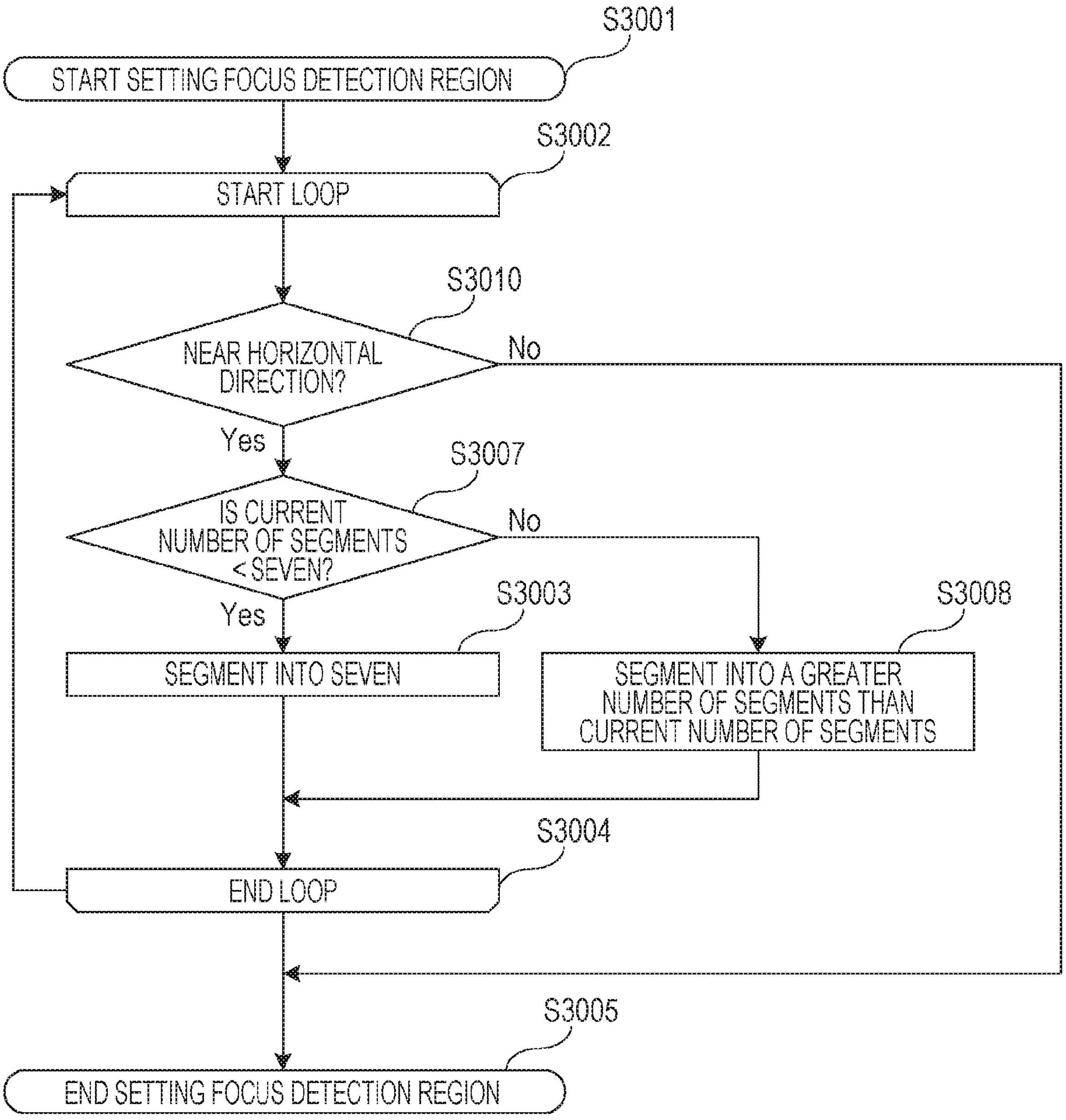
Figures 5, 30:
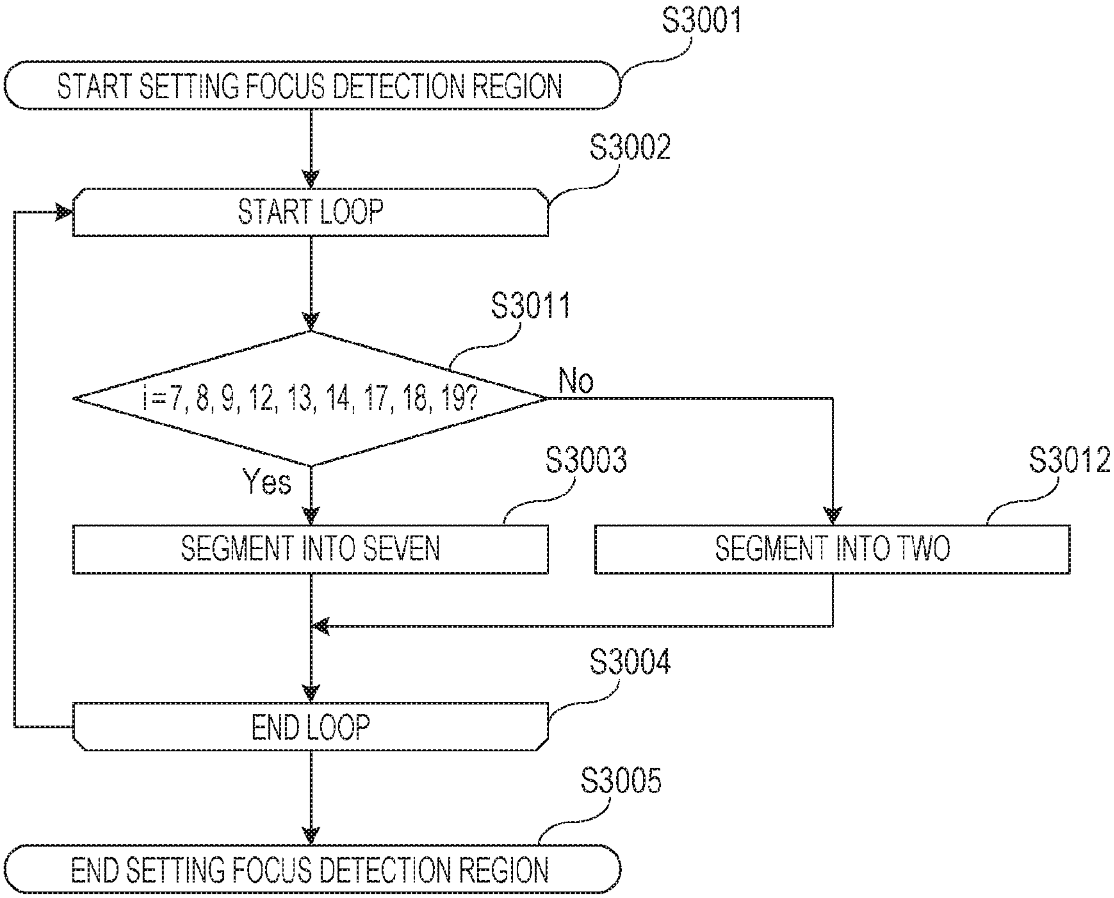
Figures 6, 30:
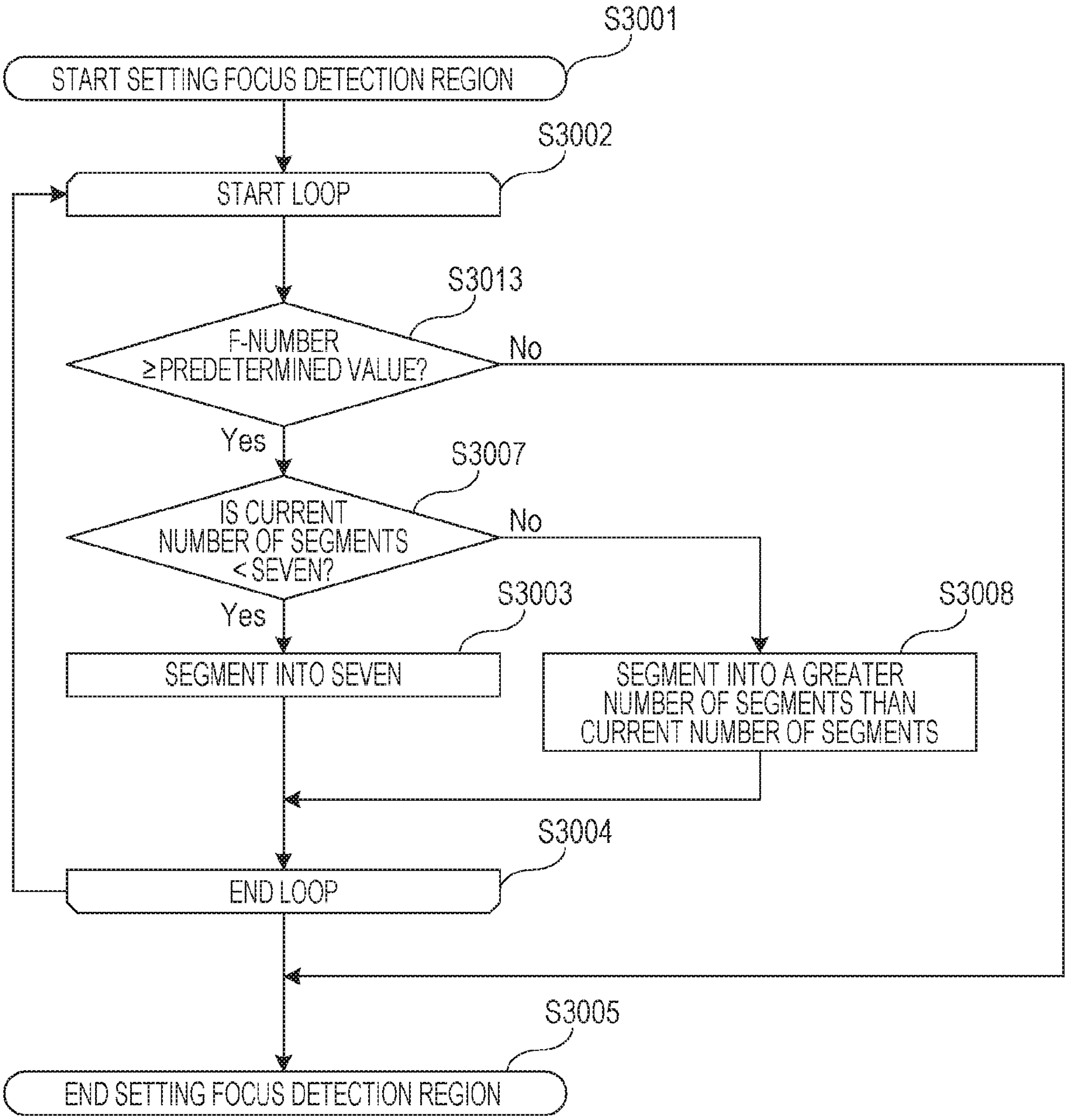

Processing of setting focus detection regions in the present embodiment (details of step S2910) is processing where saving the number of segments in memory has been added to the steps in FIG. 30-1. More specifically, in the following description, segmentation of focus detection regions is always performed when in the night sky shooting mode. After having performed the loop processing of steps S3001 through S3004, the number of segments is saved in memory, to be used in later-described reliability determination. The setting of focus detection regions ends in step S3004.

Next, processing for performing reliability determination in the present embodiment (details of step S2912) will be described with reference to FIG. 38.

Step S3801 is the start of reliability determination. Steps S3802 and S3808 are the start and end of the deviation percentage determination loop.

In step S3803, the peak values and bottom values of the A-image and B-image data are obtained, and peak-to-bottom differences are calculated. In step S3804, the peak-to-bottom differences of the luminance values calculated in step S3803 are compared with a predetermined value. In a case where the peak-to-bottom differences are the predetermined value or greater, this means that a star has been detected for that frame, so next, the deviation percentage of the A-image and B-image is calculated in step S3805. In a case where the peak-to-bottom differences of luminance value are smaller than the predetermined value, this means that the frame only includes dark portions, so there is no need to calculate deviation percentage.

In step S3806, determination is made regarding whether or not the deviation percentage of luminance value calculated in step S3805 is smaller than the threshold value. If below the threshold value, the star extracted in that frame has a reliable luminance value, so the defocus amount calculated beforehand in step S3807 is obtained.

Deviation percentage determination is made for the luminance values of all frames, and determination is made in step S3809 regarding whether or not at least one defocus amount that is not NULL has been obtained. In a case where defocus amounts have been obtained, in step S3810 the average value of these defocus amounts is calculated, and taken as a final defocus amount. In a case where a defocus amount cannot be obtained, the final defocus amount is set to NULL in step S3811. The reliability determination ends in step S3812.

Figure 38:
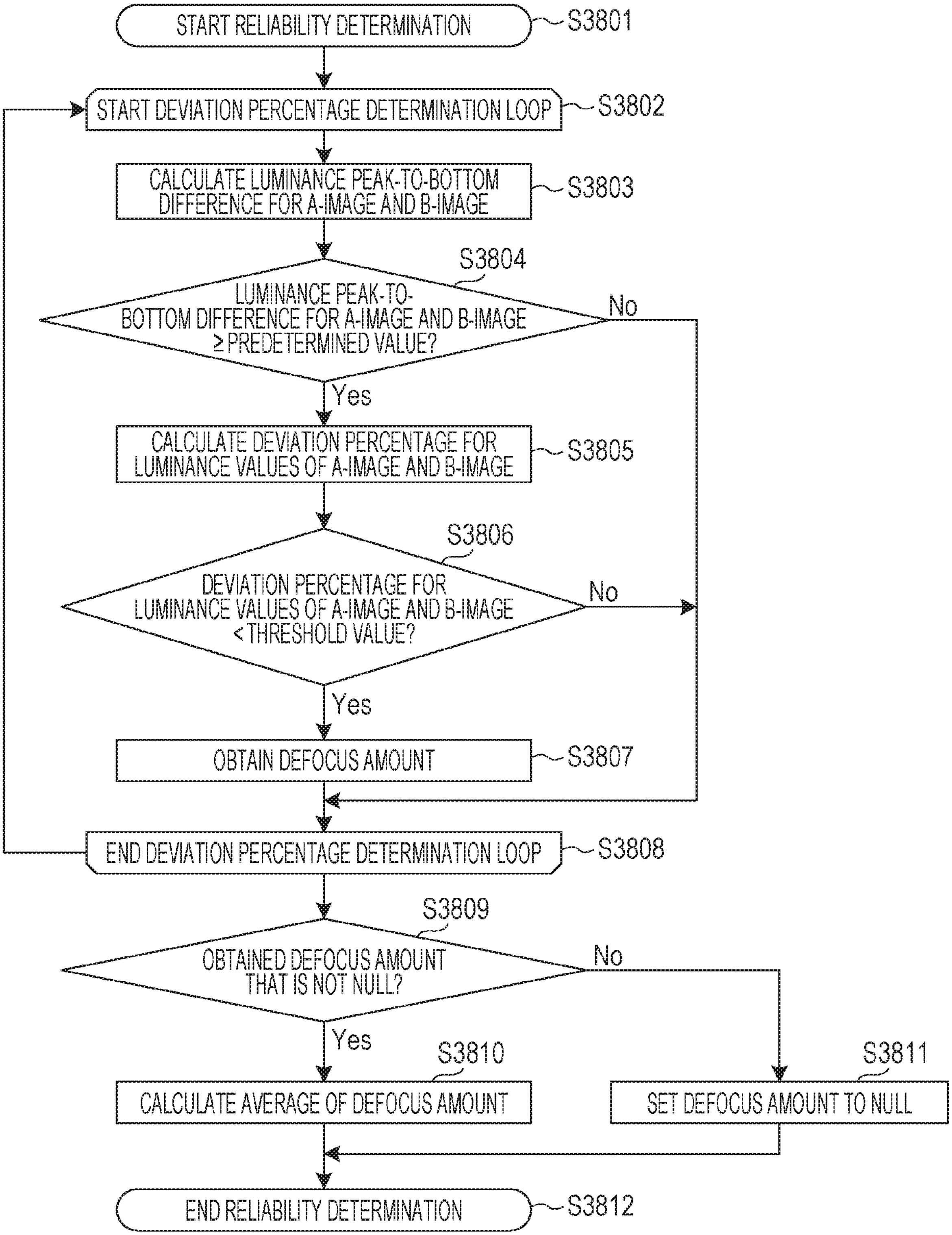
FIG. 38 is a flowchart illustrating reliability determination according to the sixth embodiment.
Figure 39:
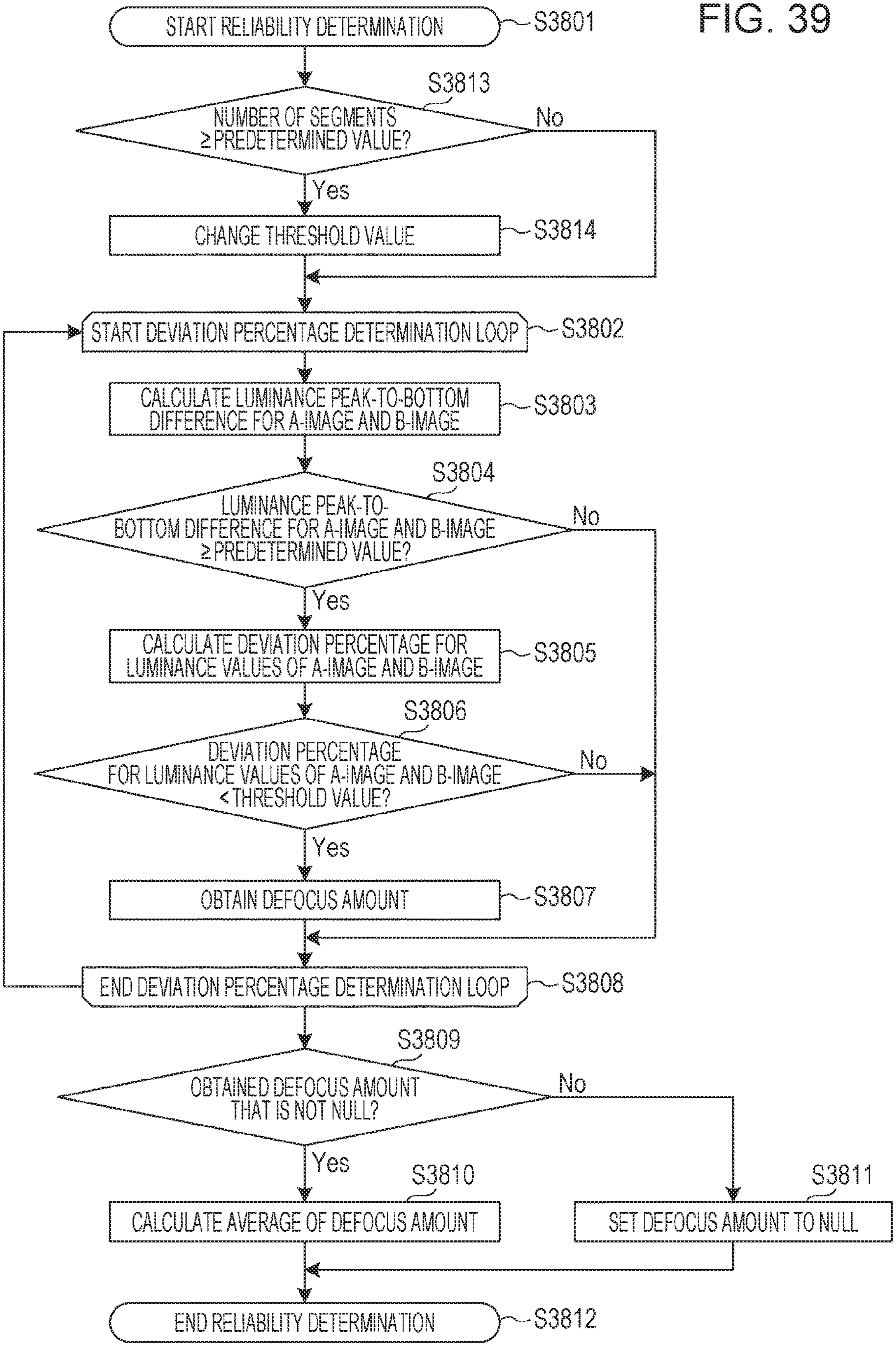
FIG. 39 is a flowchart illustrating a modification of the reliability determination in FIG. 38.

FIG. 39 is a flowchart where changing the threshold value in the reliability determination in FIG. 38 in accordance with predetermined conditions has been added.

In step S3813, determination is made regarding whether or not the number of segments is a predetermined value or grater. If the predetermined value or greater, the threshold value used for deviation percentage determination of luminance values is changed to a greater value than now in step S3814. If the number of segments is smaller than the predetermined value, the threshold value is not changed. Step S3802 and hereafter is the same as that described above, so description will be omitted.

Note that while description has been made above regarding a case of changing the threshold value to be larger when the number of segments of focus detection regions is a predetermined number or more, but an arrangement may be made where the threshold value is changed to be larger when the focal length is a predetermined value or greater. In this case, step S3813 is replaced with determination of whether the focal length is a predetermined value or greater. If the focal length is a predetermined value or greater, i.e., if at the telephoto side, bright stars may partially be saturated, so the threshold value used for deviation percentage of luminance values is changed to a greater value than now in step S3814. If the focal length is smaller than the predetermined value, the threshold value is not changed.

An arrangement may be made where the threshold value is changed to be larger when the attitude of the imaging apparatus is near the zenith direction. In this case, step S3813 is replaced with determination of whether the attitude of the imaging apparatus is near the zenith direction. If the attitude of the imaging apparatus is near the zenith direction, there is less effect from city lights, and accordingly bright stars may partially be saturated, so the threshold value used for deviation percentage of luminance values is changed to a greater value than now in step S3814. If the attitude of the imaging apparatus is near the horizontal direction, the threshold value is not changed.

An arrangement may be made where the threshold value is changed to be larger when the f-number of the exchangeable lens is smaller than a predetermined value. In this case, step S3813 is replaced with determination of whether the f-number is smaller than a predetermined value. If the f-number of the exchangeable lens is smaller than a predetermined value, this means a bright lens. There are many cases where a lens being able to take in a great amount of light leads to bright stars being partially saturated, so the threshold value used for deviation percentage of luminance values is changed to a greater value than now in step S3814. If the f-number is smaller than the predetermined value, the threshold value is not changed.

According to the above-described embodiments, highly-accurate focusing can be performed by phase difference AF, even in scenes where there are minute point light sources, such as a night sky.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188936, filed Sep. 28, 2017, and No. 2017-188937, filed Sep. 28, 2017, which are hereby incorporated by reference herein in their entirety.

What is claimed is:

1. An imaging apparatus comprising:

an imaging unit having a plurality of pixels capable of performing photoelectric conversion of light fluxes that have passed through different pupil regions of an imaging optical system including a focus lens, and outputting a pair of image signals;

a calculating unit configured to calculate a defocus amount based on an output signal from the pixels;

a control unit configured to control driving of the focus lens and perform focus control based on the calculation results of the calculating unit; and a storage unit configured to store a focus position beforehand, the focus position stored beforehand serving as a reference focus position for a predetermined subject, wherein the calculating unit performs focus detection calculation in a state where the focus lens is at a position away from the reference focus position stored in the storage unit by a predetermined depth, wherein the position away by a predetermined depth is a depth obtained by adding a depth of the focus position shifting due to temperature change and attitude change, or the depth thereof integrated with a predetermined weighting coefficient.

2. The imaging apparatus according to claim 1, wherein the predetermined subject is a point light source.

3. The imaging apparatus according to claim 1, wherein the focus position serving as the reference focus position stored in the storage unit is an in-focus position of an infinity-distance subject.

4. The imaging apparatus according to claim 1, wherein, in a case where a defocus amount calculated at the position away by the predetermined depth is a first predetermined amount or greater, the focus lens is driven in a direction toward the reference focus position by a second predetermined amount, following which defocus amount calculation is performed.

5. The imaging apparatus according to claim 1, wherein, in a case where a defocus amount calculated at the position away by the predetermined depth is smaller than a third predetermined amount, the focus lens is driven in a direction away from the reference focus position by a fourth predetermined amount, following which defocus amount calculation is performed.

6. The imaging apparatus according to claim 5, wherein, in a case where a defocus amount calculated at the position away by the predetermined depth is the first predetermined amount or greater and the recalculated defocus amount is smaller than the third predetermined amount, or wherein a defocus amount calculated at the position away by the predetermined depth is smaller than the third predetermined amount and the recalculated defocus amount is greater than the first predetermined amount, the focus lens is driven to a position a predetermined depth away in an opposite direction from the reference focus position, following which the defocus amount is recalculated, and combined with the initially calculated defocus amount, thereby calculating a final defocus amount from multiple defocus amounts.

7. The imaging apparatus according to claim 1, further comprising:

a setting unit configured to set multiple focus detection regions, wherein the calculating unit determines whether or not a subject is present in accordance with luminance information in the focus detection regions, in a state where the focus lens is at a position away by a predetermined depth from a focus position serving as a reference that is stored in the storage unit, and calculates the defocus amount using a defocus amount in the focus detection region where the subject is present.

8. The imaging apparatus according to claim 7, wherein the calculating unit performs calculation of the defocus amount in a night sky shooting mode.

9. The imaging apparatus according to claim 7, wherein the luminance information is a peak-to-bottom difference of luminance values of the image signals.

10. The imaging apparatus according to claim 7, wherein, in a case where a non-detection region exists in the multiple focus detection regions in a state where the focus lens is at a position away by a predetermined depth from a focus position serving as a reference stored in the storage unit, the calculating unit performs first defocus amount calculation and thereafter moves the focus detection regions, performs second defocus amount calculation, and calculates the defocus amount based on the first and second defocus amounts.

11. The imaging apparatus according to claim 7, wherein, in a state where the focus lens is at a position away by a predetermined depth for a focus position serving as a reference stored in the storage unit, the calculating unit calculates a deviation percentage of the pair of image signals, and calculates the defocus amount of focus detection regions of which the deviation percentage is smaller than a threshold value.

12. An imaging apparatus, comprising:

an imaging unit having a plurality of pixels capable of performing photoelectric conversion of light fluxes that have passed through different pupil regions of an imaging optical system including a focus lens, and outputting a pair of image signals;

a calculating unit configured to calculate a defocus amount based on an output signal from the pixels;

a control unit configured to control driving of the focus lens and perform focus control based on the calculation results of the calculating unit; and a storage unit configured to store a focus position beforehand, the focus position stored beforehand serving as a reference focus position for a predetermined subject, wherein the calculating unit performs focus detection calculation in a state where the focus lens is at a position away from the reference focus position stored in the storage unit by a predetermined depth, a temperature detecting unit configured to detect temperature of the imaging apparatus; and an attitude detecting unit configured to detect attitude of the imaging apparatus, wherein the position away by a predetermined depth is a depth obtained by adding depth of the focus position shifting due to temperature change obtained by the temperature detecting unit and attitude change obtained due by the attitude detecting unit, or the depth thereof integrated with a predetermined weighting coefficient.

13. A control method of an imaging apparatus having a plurality of pixels capable of performing photoelectric conversion of light fluxes that have passed through different pupil regions of an imaging optical system including a focus lens, and outputting a pair of image signals, the control method comprising:

obtaining the image signals by calculation, performing phase-difference focus detection computation, and calculating a defocus amount based on an output signal from the pixels;

controlling driving of the focus lens and performing focus control based on the calculation results of the calculating unit, wherein focus detection computation is performed in a state where the focus lens is at a position away by a predetermined depth from a focus position serving as a reference that is stored beforehand, wherein the position away by a predetermined depth is a depth obtained by adding a depth of the focus position shifting due to temperature change and attitude change, or the depth thereof integrated with a predetermined weighting coefficient.

* * * * *